(12) United States Patent
Takeuchi et al.

(10) Patent No.: US 6,768,846 B2
(45) Date of Patent: Jul. 27, 2004

(54) DISPLAY DEVICE AND METHOD FOR PRODUCING THE SAME

(75) Inventors: Yukihisa Takeuchi, Nishikamo-Gun (JP); Tsutomu Nanataki, Toyoake (JP); Natsumi Shimogawa, Nagoya (JP); Takayoshi Akao, Kasugai (JP); Kazuhiro Yamamoto, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 34 days.

(21) Appl. No.: 09/749,244

(22) Filed: Dec. 27, 2000

(65) Prior Publication Data

US 2001/0024555 A1 Sep. 27, 2001

(30) Foreign Application Priority Data

Dec. 27, 1999 (JP) .......................................... 11-371826

(51) Int. Cl.$^7$ ................................................. G02B 6/04
(52) U.S. Cl. ...................................................... 385/120
(58) Field of Search ........................... 385/120, 31, 57, 385/25, 42, 40, 41, 48, 46, 901, 16–19; 359/222–224

(56) References Cited

U.S. PATENT DOCUMENTS

| | | | |
|---|---|---|---|
| 4,113,360 A | 9/1978 | Baur et al. | |
| 5,210,455 A | 5/1993 | Takeuchi et al. | |
| 5,600,197 A | 2/1997 | Takeuchi et al. | |
| 5,636,072 A | 6/1997 | Shibata et al. | |
| 5,771,321 A | * 6/1998 | Stern ......................... | 385/31 |
| 5,774,257 A | 6/1998 | Shibata et al. | |
| 5,862,275 A | 1/1999 | Takeuchi et al. | |
| 5,953,469 A | 9/1999 | Zhou | |
| 6,028,978 A | 2/2000 | Takeuchi et al. | |
| 6,091,182 A | 7/2000 | Takeuchi et al. | |
| 6,108,479 A | 8/2000 | Takeuchi et al. | |
| 6,211,853 B1 | 4/2001 | Takeuchi et al. | |
| 6,281,868 B1 | 8/2001 | Takeuchi et al. | |
| 6,323,833 B1 | 11/2001 | Takeuchi et al. | |
| 6,381,381 B1 | 4/2002 | Takeda et al. | |
| 6,470,115 B1 | 10/2002 | Yonekubo | |

FOREIGN PATENT DOCUMENTS

| | | | | |
|---|---|---|---|---|
| EP | 0 675 477 A1 | 10/1995 | | |
| EP | 0 408 305 B1 | 3/1996 | | |
| JP | 54-142089 | 5/1979 | | |
| JP | 406148604 | * 5/1994 | .................. | 430/20 |
| JP | 7-287176 | 10/1995 | | |
| JP | 11-014916 | * 1/1999 | ........... | G02B/26/08 |
| JP | 11-072721 | 3/1999 | | |
| JP | 11-202222 | 7/1999 | | |

OTHER PUBLICATIONS

U.S. patent application Ser. No. 10/163,212, Takeuchi et al., filed Jun. 5, 2002.

(List continued on next page.)

Primary Examiner—Jean F. Duverne
(74) Attorney, Agent, or Firm—Burr & Brown

(57) ABSTRACT

An adhesion-suppressing agent is added or applied to a picture element assembly precursor which is a precursor of a picture element assembly. Accordingly, when the hardening is performed while allowing the picture element assembly precursor to make pressed contact with an optical waveguide plate, the picture element assembly precursor is prevented from adhesion to the optical waveguide plate. Further, the gap between the picture element assembly and the optical waveguide plate is narrowed by allowing the adhesion-suppressing agent to intervene. Therefore, when a display device is in the light emission state, the picture element assembly reliably makes pressed contact with the optical waveguide plate. Further, owing to the adhesion-suppressing agent, the mutual adhesion between the picture element assembly and the optical waveguide plate is remarkably suppressed when the display device is used. Preferred examples of the adhesion-suppressing agent include silicone-based substances.

14 Claims, 41 Drawing Sheets

OTHER PUBLICATIONS

U.S. patent application Ser. No. 09/749,265, Takeuchi et al., filed Dec. 27, 2000.

U.S. patent application Ser. No. 10/230,869, Yukihisa et al., filed Aug. 29, 2002.

U.S. patent application Ser. No. 10/167,841, Takeuchi et al., filed Jun. 12, 2002.

Kazuo Anzai, "Preparation of Electronic Materials by Electrophoretic Deposition," General Institute of Toshiba Corporation, Denki Kagaku 53, No. 1, 1985, pp 63–68.

Atsushi Goto, et al., "$PbZrO_3/PbTiO_3$ Composite Ceramics Fabricated by Electrophoretic Deposition," Tokyo Metropolitan University, Tokyo Medical and Dental University, Proceedings of First Symposium on Higher–Order Ceramic Formation Method Based on Electrophoresis, 1998, pp 5–6.

Kimihiro Yamashita, "Hybridization of Ceramics by Electrophoretic Deposition," Institute for Medical and Dental Engineering, Tokyo Medical and Dental University, Proceedings of First Symposium on Higher–Order Ceramic Formation Method Based on Electrophoresis, 1998, pp 23–24.

U.S. patent application Ser. No. 09/341,151, Takeuchi et al., filed Jul. 1, 1999.

U.S. patent application Ser. No. 09/749,252, Takeuchi et al., filed Dec. 27, 2000.

U.S. patent application Ser. No. 10/163,212, Takeuchi et al., filed Jun. 5, 2002.

* cited by examiner

FIG. 21

(OPTICAL WAVEGUIDE PLATE)

- FORM LIGHT-SHIELDING LAYER ON SURFACE OF OPTICAL WAVEGUIDE PLATE — SB51
- REMOVE ORGANIC MATTERS FROM SURFACE OF OPTICAL WAVEGUIDE PLATE — SB52

(SUBSTRATE)

- PROVIDE PILLAR-SHAPED MEMBER IN UPSTANDING MANNER ON SUBSTRATE TO CAUSE MUTUAL JOINING WITH RESPECT TO SUBSTRATE BY MEANS OF SINTERING TO FORM CROSSPIECE — SA51
- FORM PICTURE ELEMENT ASSEMBLY PRECURSOR ON ACTUATOR ELEMENT OF SUBSTRATE — SA52
- APPLY ADHESION-SUPPRESSING AGENT TO UPPER END OF PICTURE ELEMENT ASSEMBLY PRECURSOR — SA53
- APPLY FILLER-CONTAINING ADHESIVE TO UPPER END OF CROSSPIECE — SA54

- PLACE OPTICAL WAVEGUIDE PLATE (LIGHT-SHIELDING LAYER) ON CROSSPIECE — SC51
- HARDEN FILLER-CONTAINING ADHESIVE TO JOIN CROSSPIECE AND OPTICAL WAVEGUIDE PLATE

- HARDEN PICTURE ELEMENT ASSEMBLY PRECURSOR TO FORM PICTURE ELEMENT ASSEMBLY — SC52

DISPLAY DEVICE

DISPLAY DEVICE AND METHOD FOR PRODUCING THE SAME

BACKGROUND OF THE INVENTION

1. Field of the Invention

The present invention relates to a display device and a method for producing the same. In particular, the present invention relates to a display device which involves no fear of any incomplete light off state, and a method for producing the same.

2. Description of the Related Art

FIG. 38 shows an example of a large screen display in which a plurality of display devices are arranged on an optical waveguide plate. The large screen display 100 has, for example, such features that it is of the direct vision type, it is of the thin type, it has a high luminance, and it has a wide angle of visibility. A plurality of display devices 10 as described later on are arranged in the vertical direction and in the lateral direction respectively on a first surface (back surface) of the large optical waveguide plate 102 which is composed of, for example, glass or acrylic to construct the large screen display of the thin type. In addition to the ordinary display having an oblong configuration, it is possible to form screens having a variety of shapes including, for example, those having a rectangular configuration with a longer horizontal length, those having a rectangular configuration with a longer vertical length, and those having a circular configuration, by arbitrarily changing the arrangement of the display devices 10. It is also possible to form a curved surface display by previously curving the optical waveguide plate.

FIG. 39 shows a schematic cross section of the display device 10. The display device 10 comprises an actuator substrate 12, an optical waveguide plate 14, and a plurality of crosspieces 16 allowed to intervene between the both. The optical waveguide plate 14 and the crosspieces 16 are joined to one another by the aid of an adhesive 17. The actuator substrate 12 has an actuator element 18 which is displaceable toward the actuator substrate 12 or toward the optical waveguide plate 14 at a position surrounded by the plurality of crosspieces 16. A unit dot 22 is constructed by the actuator element 18 and a picture element assembly 20 which is provided on the actuator element 18. As described later on, the display device 10 is provided with a plurality of unit dots 22.

The unit dot 22 is specifically constructed as follows. That is, a hollow space 24 is formed at the inside of the actuator substrate 12 corresponding to the position at which the actuator element 18 is provided. Therefore, the portion of the actuator substrate 12, at which the actuator element 18 is provided, has a thin wall thickness as compared with the other portions (the portion will be hereinafter referred to as "thin-walled section" 12a).

The actuator element 18 comprises a shape-retaining layer 26 which is composed of a piezoelectric/electrostrictive material or an anti-ferroelectric material, a column electrode 28 which is provided on the lower surface of the shape-retaining layer 26, and a row electrode 30 which is formed over a range from the side surface to the upper surface of the shape-retaining layer 26 with a through-hole 13 provided through the actuator substrate 12 from the lower surface of the actuator substrate 12.

The picture element assembly 20, which is formed on the actuator element 18, is a laminate comprising a white scattering element layer 32, a color filter layer 34, and a transparent layer 36. As described later on, when the picture element assembly 20 abuts against the optical waveguide plate 14, the light 38, which is guided through the inside of the optical waveguide plate 14, is reflected. In this process, the light 38 is colored to have a color corresponding to a color of the color filter layer 34, and the light 38 is emitted to the outside of the optical waveguide plate 14. Accordingly, the unit dot 22 emits light with the color corresponding to the color filter layer 34.

Therefore, when the color of the color filter layer 34 is varied for each of the unit dots 22 so that the light emission is obtained with the red color for a certain unit dot 22, the green color for another unit dot 22, and the blue color for still another unit dot 22, then the entire display device 10 is provided with the three primary colors of light. Therefore, the display device 10 is capable of emitting all colors. In the following description, a group, in which one or more unit dots 22 for causing red light emission, is referred to as "red dot", and it is designated by reference numeral 22R. Similarly, groups, in which one or more unit dots for causing green light emission and blue light emission, are referred to as "green dot" (designated by reference numeral 22G) and "blue dot" (designated by reference numeral 22B) respectively.

In general, as shown in FIG. 40, the red dot 22R, the green dot 22G, and the blue dot 22B are arranged in an aligned manner. A picture element (pixel) 40 is constructed by them. The display device 10 comprises a plurality of such picture elements 40, and it displays a variety of colors depending on the light emission states of the red dot 22R, the green dot 22G, and the blue dot 22B. As a result, an image is displayed on the large optical waveguide plate 102 of the large screen display 100.

In the display device 10 constructed as described above, as shown in FIG. 39, when the upper end surface of the picture element assembly 20 (transparent layer 36) abuts against the optical waveguide plate 14, then the light 38, which is guided through the inside of the optical waveguide plate 14, is transmitted through the transparent layer 36 and the color filter layer 34, and then it is reflected by the white scattering element layer 32. The light is emitted as the scattered light 42 to the outside of the optical waveguide plate 14. As a result, the display device 10 causes light emission with the color corresponding to the color filter layer 34.

When the voltage is applied between the column electrode 28 and the row electrode 30, for example, if the column electrode 28 is the positive electrode, then the electric field, which is directed from the column electrode 28 to the row electrode 30, is generated. As a result, the polarization is induced in the shape-retaining layer 26, and the strain, which is directed to the column electrode 28, is generated in the shape-retaining layer 26. As shown in FIG. 41, the strain cause bending deformation of the actuator element 18. The entire actuator element 18 is displaced downwardly, and the upper end surface of the picture element assembly 20 is separated from the optical waveguide plate 14. In this situation, the light 38 is not reflected by the picture element assembly 20, and it is guided through the inside of the optical waveguide plate 14. Therefore, the light 38 is not emitted to the outside of the optical waveguide plate 14. That is, in this situation, the display device 10 is in the light off state.

When the applied voltage is changed so that the difference in electric potential between the both electrodes 28, 30 is decreased, the strain of the shape-retaining layer 26 is removed in accordance with a hysteresis manner. That is, the strain of the shape-retaining layer 26 is scarcely removed at the beginning at which the difference in electric potential between the column electrode 28 and the row electrode 30 is initially decreased. When the difference in electric potential is further decreased, the strain is quickly removed. Finally, the upper end surface of the picture element assembly 20 abuts against the optical waveguide plate 14 again, and thus the display device 10 is in the light emission state (see FIG. 39).

As clearly understood from the above, the luminance and the light emission color of the display device 10 can be adjusted by adjusting the difference in electric potential between the column electrode 28 and the row electrode 30. Further, it is possible to switch the display device 10 from the light emission state to the light off state, or from the light off state to the light emission state.

The light emission state or the light off state of the display device 10 is entirely displayed on another surface (principal surface) different from the surface of the large optical waveguide plate 102 on which the display devices 10 are arranged. That is, the principal surface functions as the display screen of the large screen display 100.

The display device 10 is produced, for example, as follows. At first, a plurality of segment plates composed of fully stabilized zirconium oxide or the like are placed on a flat plate composed of fully stabilized zirconium oxide or the like. Further, a thin-walled flat plate composed of fully stabilized zirconium oxide or the like is placed on the segment plates.

The sintering treatment is applied in this state to join these components to one another. Thus, the actuator substrate 12, which has the hollow space 24 and the thin-walled section 12a, is obtained. The through-hole 12b, which extends from the lower surface of the actuator substrate 12 to the hollow space 24, is previously provided before the sintering treatment. Accordingly, it is possible to suppress any deformation of the substrate 12 which would be otherwise caused by the sintering treatment, because of the following reason. That is, even when the gas in the gap to be formed into the hollow space 24 is expanded during the application of the sintering treatment, the amount of the gas corresponding to the expansion is discharged to the outside through the through-hole 12b.

The through-hole 13 is formed by mutually superimposing through-holes which are previously provided through the flat plate, the segment plate, and the thin-walled flat plate respectively, or by providing the through-hole through the substrate 12 after the sintering treatment.

Subsequently, the column electrode 28, the shape-retaining layer 26, and the row electrode 30 are formed in this order by means of the film formation method including, for example, the photolithography method, the screen printing method, the dipping method, the application method, the electrophoresis method, the ion beam method, the sputtering method, the vacuum vapor deposition method, the ion plating method, the chemical vapor deposition (CVD) method, and the plating. Thus, the actuator element 18 is provided on the actuator substrate 12.

Subsequently, a precursor of the crosspiece 16 is formed so that the actuator element 18 is surrounded thereby. That is, a thermosetting resin is deposited on the actuator substrate 12 so that the actuator element 18 is surrounded thereby. The adhesive 17 is applied to the upper end surface of the precursor of the crosspiece 16.

Subsequently, a precursor of the white scattering element layer 32, a precursor of the color filter layer 34, and a precursor of the transparent layer 36 are formed in this order on the actuator element 18. Accordingly, a precursor of the picture element assembly 20 is obtained. The respective precursors can be also formed by means of the film formation method as described above.

Subsequently, the optical waveguide plate 14 is placed on the upper end surface of the precursor of the crosspiece 16 and the precursor of the picture element assembly 20. The pressure is applied from both of the upper surface of the optical waveguide plate 14 and the lower surface of the substrate 12.

The entire body is subjected to the heat treatment in this state to simultaneously harden the precursor of the crosspiece 16, the adhesive 17, and the picture element assembly 20. In accordance with the hardening, the crosspiece 16 and the picture element assembly 20 are formed. Further, the crosspiece 16 is joined to the optical waveguide plate 14 by the aid of the adhesive 17, and the picture element assembly 20 is joined onto the actuator element 18. Thus, the unit dot 22 (display device 10) is consequently completed.

When the display device 10 is produced as described above, a fear arises such that the upper end surface of the precursor of the picture element assembly 20 adheres to the optical waveguide plate 14 when the optical waveguide plate 14 and the substrate 12 are pressed. If the hardening treatment is performed for the picture element assembly precursor in this state, the picture element assembly 20 is not sufficiently separated from the optical waveguide plate 14 in some cases, even when the display device 10 is allowed to be in the light off state by displacing the actuator element 18 toward the substrate 12.

If such a situation takes place, a part of the light 38, which is guided through the optical waveguide plate 14, is reflected and/or scattered by the picture element assembly 20. That is, a slight amount of light is released to the outside of the display device 10, resulting in such an inconvenience that the light off state of the display device 10 is incomplete.

In order to solve such a problem, the optical waveguide plate 14 may be placed after hardening the precursor of the picture element assembly 20. However, if the display device 10 is produced as described above, the picture element assembly 20 is slightly contracted as compared with the precursor thereof. Therefore, when the display device 10 is allowed to be in the light emission state, the picture element assembly 20 does not make tight contact with the optical waveguide plate 14 in a sufficient manner. For this reason, a desired luminance is not obtained in some cases.

In view of the above, a technique has been also suggested, in which a light-transmissive liquid is allowed to intervene between the picture element assembly 20 and the optical waveguide plate 14 so that the tight contact performance between the both is improved by allowing the light-transmissive liquid to make contact with the both. However, in this case, the tight contact performance is excessively improved. As a result, the operation to separate the picture element assembly 20 from the optical waveguide plate 14 is slow, and the light emission and the light off of the display device 10 do not follow the image signal.

SUMMARY OF THE INVENTION

The present invention has been made in order to solve the problem as described above, an object of which is to provide a display device and a method for producing the display device in which the tight contact performance between an optical waveguide plate and a picture element assembly is improved, and the picture element assembly is separated from the optical waveguide plate reliably and quickly.

In order to achieve the object described above, the present inventors have conceived that an adhesion-suppressing agent is applied or added to the picture element assembly 20 to suppress the adhesion between the picture element assembly 20 and the optical waveguide plate 14. The present inventors initially directed the attention to a releasing agent to be used in the casting operation, because of the following reason. That is, the releasing agent facilitates the release of a cast product from a mold by suppressing the adhesion of the cast product to the mold.

Although the releasing agent prevents the cast product (metal) from the adhesion to the mold (metal), the releasing agent not necessarily prevents the adhesion between the glass or the like (optical waveguide plate 14) and the cured resin (picture element assembly 20). Actually, according to the investigation made by the present inventors, no effect to suppress the adhesion was obtained at all by using a fluorine compound resin commercially available as the releasing agent.

Further, the adhesion-suppressing agent to be used must allow the light 38 to come into the picture element assembly 20 at a high efficiency when the display device 10 is allowed to be in the light emission state. If the adhesion-suppressing agent reflects the light 38, the luminance of the display device 10 is decreased. That is, it is impossible to allow the display device 10 to emit light at a desired luminance.

As clearly understood from the above, it is necessary for the adhesion-suppressing agent that the picture element assembly 20 and the optical waveguide plate 14 are prevented from adhesion when the display device 10 is used, and the light 38 is successfully allowed to come into the picture element assembly 20 at a high efficiency.

In view of the above, the present inventors have made diligent investigations repeatedly for the substance which prevents the adhesion between the picture element assembly 20 and the optical waveguide plate 14 and which allows the light to come into the picture element assembly 20 at a high efficiency. Thus, the present invention has been completed.

That is, according to the present invention, there is provided a display device comprising a substrate having an actuator element, an optical waveguide plate, a crosspiece allowed to intervene between the optical waveguide plate and the substrate for surrounding the actuator element, and a picture element assembly joined onto the actuator element; wherein the picture element assembly has an adhesion-suppressing agent at least at a portion opposed to the optical waveguide plate.

Accordingly, it is possible to remarkably suppress the adhesion of the picture element assembly precursor to the optical waveguide plate when the picture element assembly precursor abuts against the optical waveguide plate. Therefore, when the actuator element is displaced, then the picture element assembly is reliably separated from the optical waveguide plate, and the display device is in the light off state.

The adhesion-suppressing agent may be applied to at least the portion of the picture element assembly opposed to the optical waveguide plate, or it may be added to the picture element assembly. In this arrangement, the adhesion-suppressing agent is preferably added in an amount of 0.01 to 50% by weight, and more preferably 0.1 to 10% by weight. When the amount of addition is within the range as described above, then it is possible to prevent the precursor of the picture element assembly from adhesion to the optical waveguide plate, and it is possible to obtain the picture element assembly involving neither cracks nor hollow cavities. It is also preferable that the adhesion-suppressing agent seeps out to at least the portion of the picture element assembly opposed to the optical waveguide plate.

It is possible to use a silicone-based substance for the adhesion-suppressing agent. In this arrangement, those usable as the silicone-based substance include silicone oil and/or silicone grease and a mixture principally containing at least any one of them. It is preferable that the adhesion-suppressing agent has a refractive index of 1.30 to 1.70, because of the following reason. That is, it is possible to allow the light to come from the optical waveguide plate into the picture element assembly at a high efficiency. More preferably, the refractive index is 1.38 to 1.55, because of the following reason. That is, such a refractive index is close to the refractive index of transparent glass or acrylic which can be utilized as the optical waveguide plate inexpensively and conveniently. Therefore, it is possible to allow the light to come from the optical waveguide plate into the picture element assembly at a higher efficiency.

It is also preferable that the adhesion-suppressing agent is applied to at least a portion of the optical waveguide plate opposed to the picture element assembly.

According to another aspect of the present invention, there is provided a method for producing a display device comprising a substrate having an actuator element, an optical waveguide plate, a crosspiece allowed to intervene between the optical waveguide plate and the substrate for surrounding the actuator element, and a picture element assembly joined onto the actuator element; the method comprising a step of preparing a precursor by adding an adhesion-suppressing agent and other additives to a constitutive material for the picture element assembly; a step of patterning the precursor; and a step of allowing the adhesion-suppressing agent to seep out to at least a portion of the picture element assembly opposed to the optical waveguide plate by aging the precursor.

In this process, it is also preferable that the step of allowing the adhesion-suppressing agent to seep out is performed by applying vibration.

According to still another aspect of the present invention, there is provided a method for producing a display device comprising a substrate having an actuator element, an optical waveguide plate, a crosspiece allowed to intervene between the optical waveguide plate and the substrate for surrounding the actuator element, and a picture element assembly joined onto the actuator element;

the method comprising a step of washing an adhesion-suppressing agent seeped out from the picture element assembly and/or a step of applying the adhesion-suppressing agent to at least a portion of the picture element assembly opposed to the optical waveguide plate.

In this process, the step of applying the adhesion-suppressing agent may be performed such that the adhesion-suppressing agent is applied to at least the portion of the picture element assembly opposed to the optical waveguide plate after washing the adhesion-suppressing agent seeped out from the picture element assembly, or simultaneously with the washing.

It is preferable that the washing step is performed by washing the adhesion-suppressing agent with a highly volatile liquid. It is also preferable that the step of applying the adhesion-suppressing agent is performed by injecting a mixture liquid obtained by mixing or dissolving the adhesion-suppressing agent in a solvent such as a highly volatile liquid.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 21 shows a flow chart illustrating a fifth production method;

DESCRIPTION OF THE PREFERRED EMBODIMENTS

Figure 1:
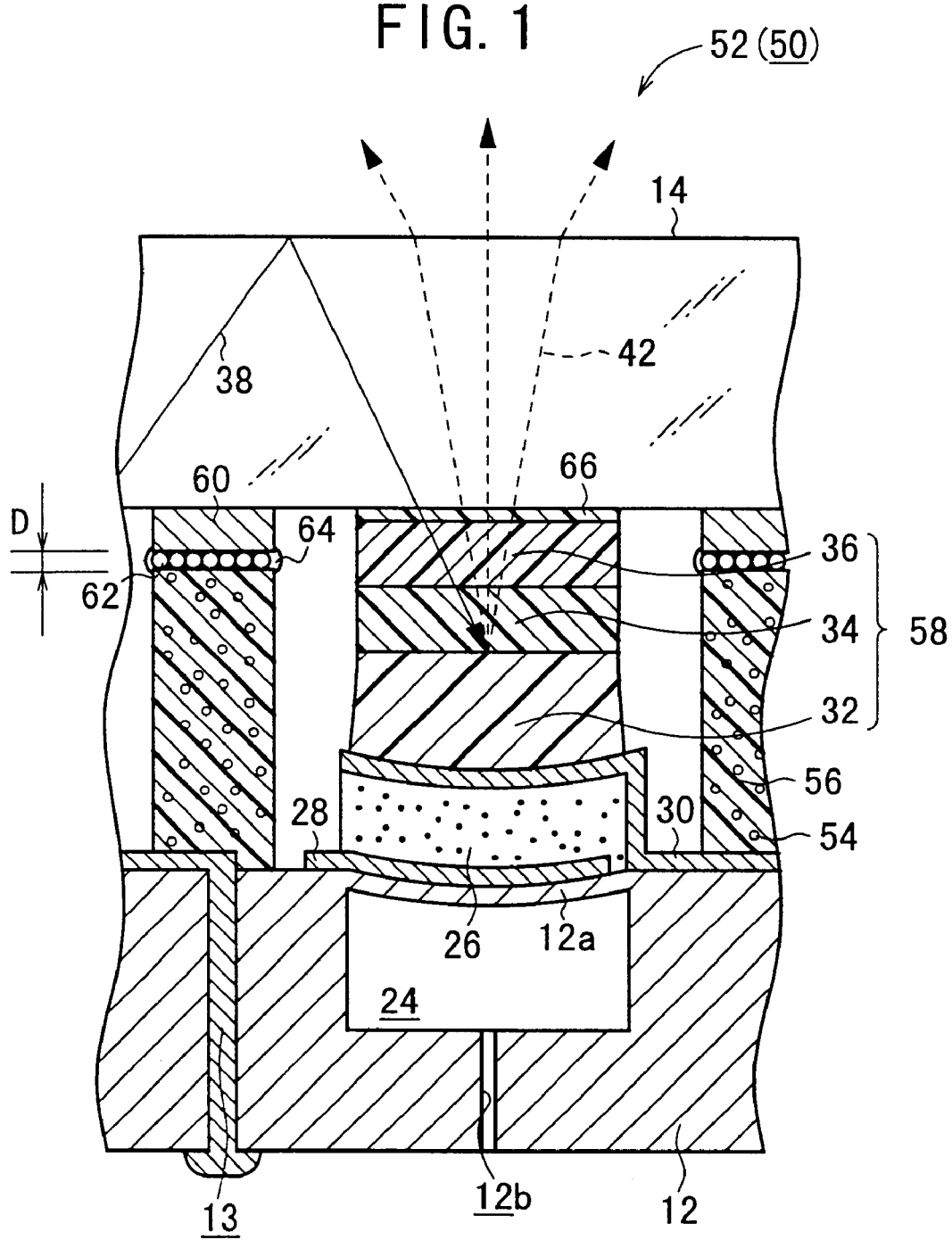
FIG. 1 shows a schematic sectional view illustrating a unit dot of a display device according to an embodiment of the present invention.

The display device according to the present invention will be exemplified by preferred embodiments below, which will be explained in detail with reference to the accompanying drawings. Constitutive components corresponding to the constitutive components shown in FIGS. 38 to 41 are designated by the same reference numerals, detailed explanation of which will be omitted.

FIG. 1 shows a schematic sectional view illustrating a unit dot 52 provided for a display device 50 according to an embodiment of the present invention. The display device 50 comprises an actuator substrate 12 which has an actuator element 18, an optical waveguide plate 14, and a hardened or cured resin which contains a filler 54. The display device 50 further comprises crosspieces 56 which are allowed to intervene between the actuator substrate 12 and the optical waveguide plate 14, and a picture element assembly 58 which is joined onto the actuator element 18.

The display device 50 includes a light-shielding layer 60 which is allowed to intervene between the crosspiece 56 and the optical waveguide plate 14. The light-shielding layer 60 is joined to the crosspiece 56 by the aid of a filler-containing adhesive 64 which contains a filler 62. An adhesion-suppressing agent 66 is applied to the upper end surface of the picture element assembly 58. Therefore, the picture element assembly 58 is constructed while including the adhesion-suppressing agent 66.

Figure 2:
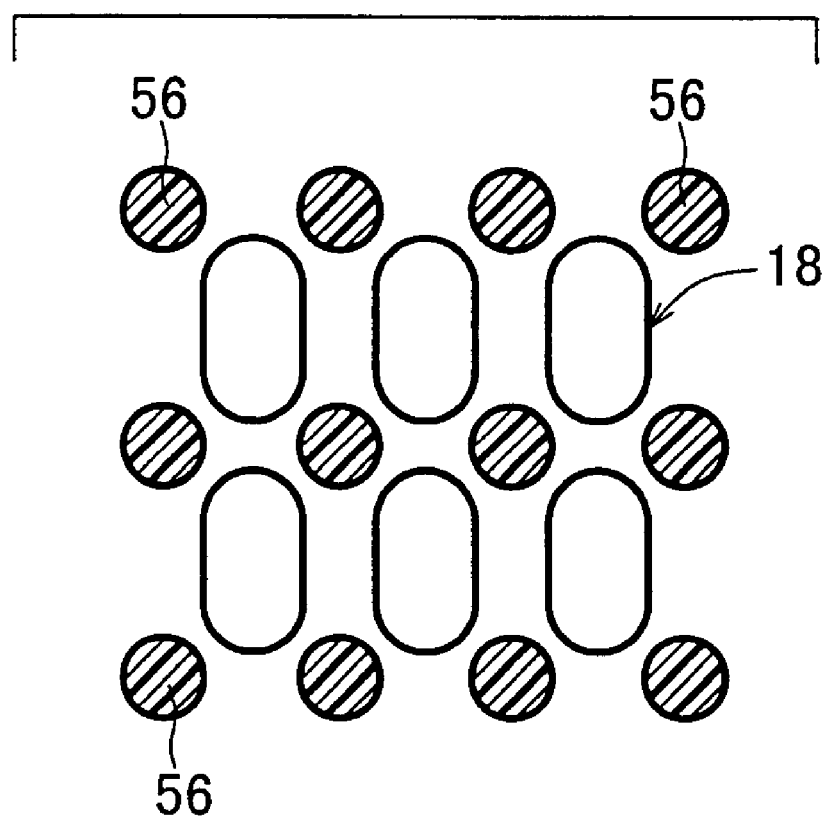
FIG. 2 shows a plan view illustrating an example of crosspiece arrangement.
Figure 3:
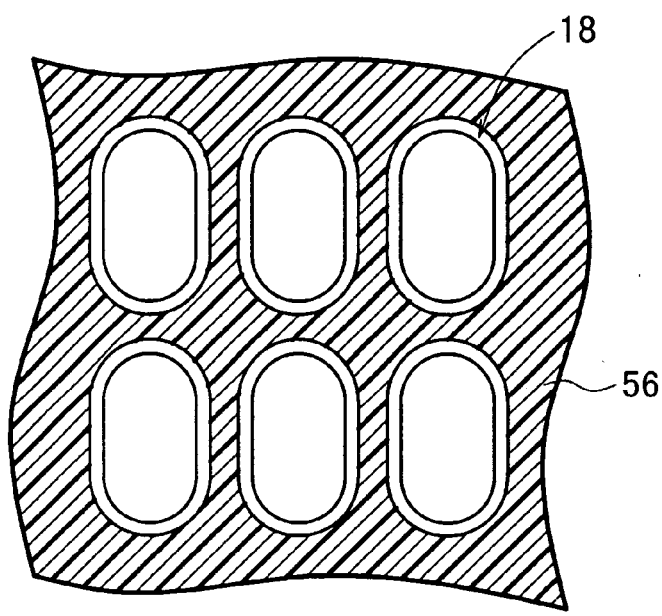
FIG. 3 shows a plan view illustrating another example of crosspiece arrangement.

As shown in FIG. 2, the crosspieces 56 are formed at the outside of four corner portions of the actuator element 18. Accordingly, the crosspieces 56 surround the actuator element 18. Alternatively, as shown in FIG. 3, a crosspiece 56 may be formed such that all portions of the actuator substrate 12 other than portions corresponding to the actuator elements 18 are covered therewith.

The construction of the crosspiece 56 conforms to the construction of the crosspiece 16 of the display device 10 described above except for the fact that the crosspiece 56 is composed of the cured resin containing the filler 54. Those usable as the cured resin include, for example, those obtained by curing thermosetting resin such as epoxy resin, photocurable resin, moisture absorptive curable resin, and cold setting resin.

The crosspiece 56, which contains the filler 54, has high hardness as compared with the crosspiece 16, and it has high heat resistance, high strength, and high dimensional stability. The amount of shrinkage of the crosspiece 56, which is accompanied by the increase in internal temperature of the display device 50, is extremely small as compared with the crosspiece 16. In other words, when the filler 54 is contained, it is possible to improve the hardness, the heat resistance, and the strength of the cured resin. Further, it is possible to extremely decrease the amount of expansion and shrinkage caused by heat.

Therefore, even when the internal temperature of the display device 50 is increased, the contact or the separation between the optical waveguide plate 14 and the picture element assembly 20 is reliably performed. Accordingly, as described later on, it is possible to allow the unit dot 52 (display device 50) to reliably effect the light emission and the light off.

Preferred examples of the filler 54 include high strength substances such as ceramics, plastic, and glass. Such a high strength substance improves the strength of the crosspiece 56.

It is preferable that the ratio of the filler 54 in the resin as a raw material for the crosspiece 56 is 0.1 to 80% by weight. If the ratio is less than 0.1% by weight, the effect to improve the hardness, the heat resistance, and the strength is inferior. If the ratio exceeds 80% by weight, the adhering ability is inferior, because the ratio of resin is low. The ratio of the filler 54 is more preferably 5 to 50% by weight.

The size of the filler is preferably 0.1 to 50 μm, depending on the dimension of the crosspiece 56. If the size is less than 0.1 μm, the effect to improve the hardness, the heat resistance, and the strength is inferior. If the size exceeds 50 μm, the strength of the crosspiece 56 is lowered in some cases.

The construction of the picture element assembly 58 conforms to the construction of the picture element assembly 20 of the unit dot 22 described above, except that the picture element assembly 58 presses the optical waveguide plate 14 in the state of no load, and that the adhesion-suppressing agent 66 is formed on the upper end surface of the picture element assembly 58. The phrase "state of no load" referred to herein implies a state in which the actuator element 18 is not energized by the driving source. The driving source is not specifically limited provided that it is used to energize the actuator element 18. The driving source includes, for example, an electric power source, a heat engine or a thermomotor, and a fluid.

That is, the picture element assembly 58 is a laminate of the white scattering element layer 32, the color filter layer 34, the transparent layer 36, and the adhesion-suppressing agent 66. The adhesion-suppressing agent 66 is formed on the upper end surface of the transparent layer 36 (see FIG. 1).

In the same manner as in the unit dot 22 described above, when the voltage is applied between the column electrode 28 and the row electrode 30, if the column electrode 28 is, for example, the positive electrode, then the actuator element 18 is continuously displaced toward the actuator substrate 12 in accordance with the level of the voltage. When the applied voltage is changed so that the difference in electric potential between the both electrodes 28, 30 is decreased, the actuator element 18 is continuously displaced toward the optical waveguide plate 14.

When the voltage is further changed to exceed zero so that the polarity of the voltage is reversed, the actuator element 18 is further displaced toward the optical waveguide plate 14. When the level (absolute value level) of the voltage of the reversed polarity is increased, the actuator element 18 is in turn displaced toward the actuator substrate 12.

When the state of no load is established, the picture element assembly 58 is urged toward the optical waveguide plate 14 in accordance with the elasticity of the thin-walled section 12a. Accordingly, the picture element assembly 58 makes pressed contact with the optical waveguide plate 14. Therefore, the light 38, which is guided through the inside of the optical waveguide plate 14, is reliably reflected by the picture element assembly 58. The light 38 behaves as the scattered light 42 which is emitted to the outside of the optical waveguide plate 14. Therefore, it is possible to allow the unit dot 52 (display device 50) to emit light at a desired luminance.

When the picture element assembly 58 contacts with the optical waveguide plate 14, or it is disposed closely to the optical waveguide plate 14 in the state of no load, then the distance therebetween is desirably not more than 30% of the distance of separation during driving, and it is not more than 1 μm as an actual distance. More preferably, the distance is not more than 10% of the distance of separation during driving, and it is not more than 0.3 μm as an actual distance. Within this range, it is possible to satisfy both of the reliability of separation and the maintenance of luminance.

The adhesion-suppressing agent 66, which is formed on the upper end surface of the picture element assembly 58 (transparent layer 36), is previously applied or added to a picture element assembly precursor which is the precursor of the picture element assembly 58. Alternatively, the adhesion-suppressing agent 66 is added after the optical waveguide plate 14 and the actuator substrate 12 are joined to one another and the picture element assembly precursor 58a is hardened. The adhesion-suppressing agent 66 suppresses the adhesion of the picture element assembly precursor to the optical waveguide plate 14 as described later on. Further, when the picture element assembly 58 abuts against the optical waveguide plate 14 upon the light emission of the display device 50, the adhesion-suppressing agent 66 prevents the both from adhesion. Further, when the adhesion-suppressing agent 66 is allowed to intervene, the gap between the picture element assembly 58 and the optical waveguide plate 14 is narrowed. Furthermore, the gap between the picture element assembly 58 and the optical waveguide plate 14, which is caused by any irregularity on the upper end surface of the picture element assembly 58, is effectively filled with the adhesion-suppressing agent 66.

When the display device 50 emits light, the picture element assembly 58 is allowed to make the pressed contact with the optical waveguide plate 14 by being urged by the actuator element 18 as described above. However, the gap between the both is narrowed by the adhesion-suppressing agent 66. Therefore, the pressed contact occurs more easily. Accordingly, the luminance of the display device 50 is improved. That is, it is easier to allow the display device 50 to emit light at a desired luminance.

Those preferably used as the adhesion-suppressing agent 66 have a refractive index of 1.30 to 1.70 in view of the fact that the light 38 is successfully allowed to come from the optical waveguide plate 14 into the picture element assembly 58 highly efficiently. Those having a refractive index of 1.38 to 1.55 are more preferred, because of the following reason. That is, such a refractive index is close to the refractive index of transparent glass and acrylic resin which can be utilized inexpensively and conveniently as the optical waveguide plate 14. Further, it is possible to successfully allow the light 38 to come from the optical waveguide plate 14 into the picture element assembly 58 highly efficiently.

Those which are excellent in ability to suppress the adhesion of the picture element assembly precursor to the optical waveguide plate 14 and which have a refractive index within the range as described above are exemplified by silicone-based substances (for example, those having liquid form, grease form, rubber form, and resin form), especially silicone oil and/or silicone grease as well as mixtures principally containing the substance as described above.

Specifically, for example, silicone oil, modified silicone oil, silicone grease, silicone oil compound, and mixtures thereof are exemplified.

Especially, those preferably used are silicone oil including dimethyl silicone oil and methyl phenyl silicone oil; modified silicone oil including methyl styryl modified silicone oil, alkyl modified silicone oil, polyether modified silicone oil, alcohol modified silicone oil, amino modified silicone oil, epoxy modified silicone oil, carboxyl modified silicone oil, and terminal reactive silicone oil; and silicone oil compound including methylhydrodiene polysiloxane and cyclic dimethyl polysiloxane, because they are excellent in ability to suppress the adhesion.

Especially, when the adhesion-suppressing agent 66, which is composed of a mixture of the respective silicone oils and silicone greases as described above, is used, the silicone grease holds the silicone oil. Accordingly, it is possible to avoid the adhesion of silicone oil to the optical waveguide plate 14 and the decrease of silicone oil due to outflow from the upper surface of the picture element assembly 58. As a result, the light 38, which is guided through the optical waveguide plate 14, is allowed to come into the picture element assembly 58 highly efficiently. Therefore, such a mixture is preferred.

The adhesion-suppressing agent 66 as described above prevents the adhesion between the optical waveguide plate 14 and the precursor of the picture element assembly 58 (picture element assembly precursor) during the production of the display device 50. Therefore, when the display device 50 is in the light off state, the picture element assembly 58 is reliably separated from the optical waveguide plate 14. Accordingly, it is possible to reliably allow the display device 50 to be in the light off state.

The adhesion-suppressing agent 66 is allowed to intervene between the upper end surface of the picture element assembly 58 and the optical waveguide plate 14, and hence the gap therebetween is narrowed. Accordingly, when the display device 50 is in the light emission state, the upper end surface of the picture element assembly 58 reliably abuts against the optical waveguide plate 14. Therefore, it is possible to allow the display device 50 to emit light at a desired luminance.

Further, owing to the adhesion-suppressing agent 66, the gradual adhesion of the picture element assembly 58 to the optical waveguide plate 14 is remarkably suppressed when the display device 50 is used. Therefore, the operation to separate the picture element assembly 58 from the optical waveguide plate 14 does not become slow as well.

The adhesion-suppressing agent 66 may be added to the picture element assembly precursor 58a. By doing so, the adhesion-suppressing agent 66 behaves as follows. That is, when the picture element assembly precursor 58a is hardened, then a part of the adhesion-suppressing agent 66 is separated from the picture element assembly 58, and it is deposited at the interface with respect to the optical waveguide plate 14. In this case, it is preferable that the adhesion-suppressing agent 66 is added in an amount of 0.01 to 50% by weight. If the amount of addition is less than 0.01% by weight, the ability to suppress the adhesion is inferior. If the amount of addition exceeds 50% by weight, cracks and/or hollow spaces occasionally appear in the picture element assembly 58 when the picture element assembly precursor is hardened. Further, the unit dot 52 is not in the light off state in some cases even when the actuator element 18 is displaced downwardly. More preferably, the adhesion-suppressing agent 66 is added in an amount of 0.1 to 10% by weight, because of the following reason.

That is, it is possible to obtain such effects that the patterning performance is further improved, and a large number of existing picture element assemblies are stabilized at the stage at which the picture element assembly pattern is formed (effect of no adhesion to the optical waveguide plate). When the adhesion-suppressing agent is added, it is more desirable that the adhesion-suppressing agent is added to at least the transparent layer which is closest to the optical waveguide plate, of the layers for constructing the picture element assembly, because of the following reason.

That is, the adhesion-suppressing agent can be effectively formed at the boundary with respect to the optical waveguide plate. When the adhesion-suppressing agent is added to only the transparent layer, the amount of addition is preferably 0.01 to 50% by weight, and more preferably 0.1 to 10% by weight with respect to the transparent layer.

The light-shielding layer 60, which is joined to the crosspiece 56 by the aid of the filler-containing adhesive 64, is composed of, for example, metal having low light-absorbing ability such as Cr, Al, Ni, and Ag; resin containing carbon black, black pigment, and/or black dye; or transparent cured resin having low light-scattering property. Therefore, any part of the light 38 guided through the optical waveguide plate 14, which comes into the light-shielding layer 60, is not reflected by the light-shielding layer 60 and the upper end surface of the crosspiece 56. That is, the light-shielding layer 60 functions as a black matrix.

The filler-containing adhesive 64, in which the filler 62 is contained, is excellent in hardness, heat resistance, and strength as compared with the adhesive 17 as described above. Preferred examples of the filler 62 include high strength substances such as ceramics, plastic, and glass. Such a high strength substance reliably supports the optical waveguide plate 14.

The ratio of the filler 62 in the filler-containing adhesive 64 is preferably 0.1 to 50% by weight. If the ratio is less than 0.1% by weight, the effect to improve the hardness, the heat resistance, and the strength is inferior. If the ratio exceeds 50% by weight, the adhering ability is inferior, because the ratio of thermosetting resin is low. The ratio of the filler 62 is more preferably 5 to 30% by weight.

The optical waveguide plate 14 and the crosspiece 56 are reliably separated from each other by a predetermined spacing distance by the aid of the filler 62. That is, when the internal temperature of the display device 50 provided with the unit dot 52 is raised, then the cured component (resin) of the filler-containing adhesive 64 is contracted, but the filler 62 is not contracted. Therefore, as shown in FIG. 1, the spacing distance D between the optical waveguide plate 14 and the crosspiece 56 always larger than the size of the filler 62. Accordingly, the optical waveguide plate 14 and the picture element assembly 20 can be reliably separated from each other, and the unit dot 52 can be reliably quenched.

As clearly understood from the fact described above, the filler 62 is preferably spherical, because of the following reason. That is, the optical waveguide plate 14 is reliably supported by the filler 62. In this case, it is desirable that the particle size is substantially uniform, because of the following reason. That is, the spacing distance D is uniformized to be a substantially constant width. Further, it is preferable that the diameter of the filler 62 is 0.1 to 10 $\mu$m. If the diameter is less than 0.1 $\mu$m, the effect to separate the optical waveguide plate 14 from the crosspiece 56 is inferior. If the diameter exceeds 50 $\mu$m, the adhesion strength of the filler-containing adhesive 64 is lowered in some cases.

The curing or hardening component (resin) of the filler-containing adhesive 64 is not specifically limited. However, preferred examples may be thermoplastic resin, thermosetting resin, photocurable resin, moisture absorptive curable resin, and cold setting resin.

Specifically, for example, acrylic resin, modified acrylic resin, epoxy resin, modified epoxy resin, silicone resin, modified silicone resin, vinyl acetate resin, ethylene-vinyl acetate copolymer resin, vinyl butylal resin, cyanoacrylate resin, urethane resin, polyimide resin, methacrylic resin, modified methacrylic resin, polyolefine resin, special silicone modified polymer, polycarbonate resin, natural rubber, and synthetic rubber are exemplified.

Especially, it is preferable to use vinyl butylal resin, acrylic resin, modified acrylic resin, epoxy resin, modified epoxy resin, and mixtures of two or more of these resins, because they are excellent in adhesion strength. Among them, it is more preferable to use epoxy resin, modified epoxy resin, and mixtures of these resins.

Figure 4:
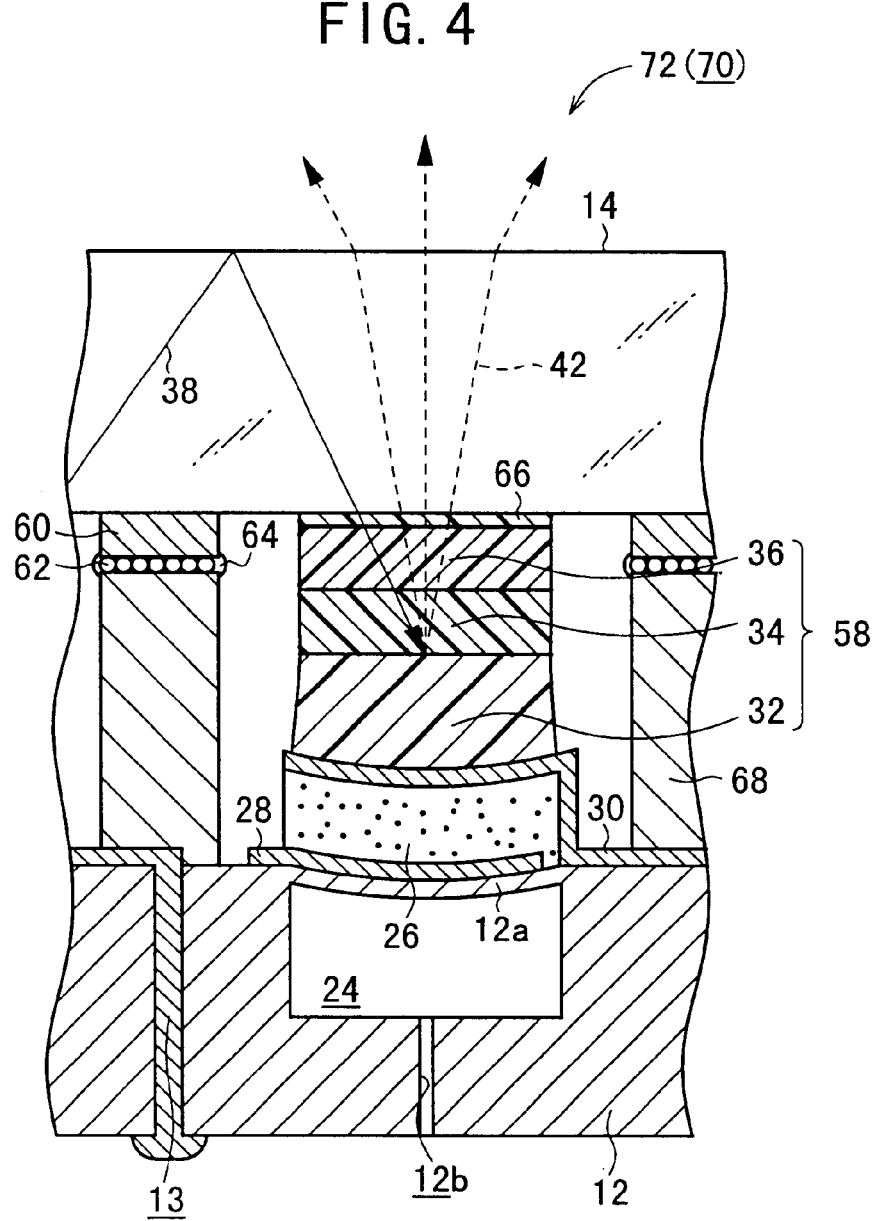
FIG. 4 shows a schematic sectional view illustrating a unit dot of a display device concerning a modified embodiment according to the embodiment of the present invention.

As shown in FIG. 4, a crosspiece may be constructed by a pillar-shaped member composed of ceramics. The crosspiece of this type will be hereinafter indicated by reference numeral 68, which will be distinguished from the crosspiece 56 composed of cured resin. A display device having the crosspiece 68 is indicated by reference numeral 70, and a unit dot thereof is indicated by reference numeral 72.

The display device 50, 70 described above can be produced, for example, in accordance with any one of production methods (hereinafter referred to as "first to sixth production methods") according to the first to sixth embodiments described below.

At first, the first production method to obtain the display device 50 will be explained. The first production method comprises a step of forming the crosspiece precursor for surrounding the actuator element 18 on any one of the optical waveguide plate 14 and the actuator element 18 of the actuator substrate 12, a step of forming the picture element assembly precursor on any one of the actuator element 18 and the optical waveguide plate 14, a step of joining the substrate 12 and the optical waveguide plate 14 to one another by the aid of the picture element assembly precursor and the crosspiece precursor or the crosspiece 56 formed by hardening the crosspiece precursor, a step of hardening the picture element assembly precursor on the actuator element 18 to form the picture element assembly 58, and a step of hardening the crosspiece precursor to form the crosspiece 56.

When the step of hardening the picture element assembly precursor is carried out, the hardening is performed in a state in which the actuator element 18 is displaced, and the picture element assembly precursor is allowed to make pressed contact with the optical waveguide plate 14.

In the first production method, any one of the step of forming the crosspiece precursor and the step of forming the picture element assembly precursor may be performed formerly. Any one of the step of hardening the crosspiece precursor and the step of hardening the picture element assembly precursor may be performed formerly as well. However, it is preferable that the step of hardening the crosspiece precursor is performed formerly in view of the fact that the picture element assembly 58 is successfully allowed to make the pressed contact with the optical waveguide plate 14 in a reliable manner, because the optical waveguide plate 14 is reliably positioned.

Figure 5:
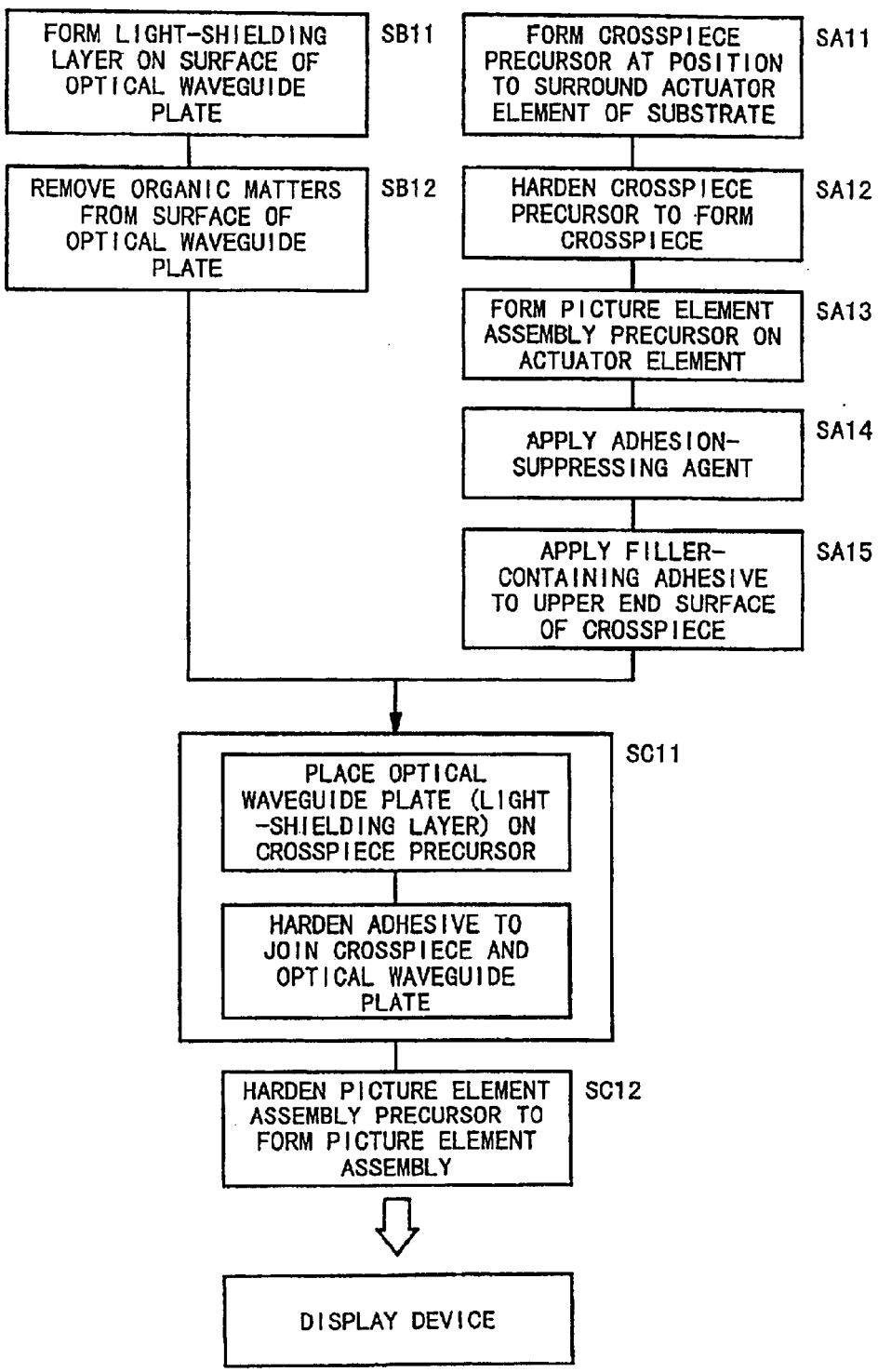
FIG. 5 shows a flow chart illustrating a first production method.

The first production method will be explained below on the basis of a flow chart shown in FIG. 5 and process charts shown in FIGS. 6 to 15, as exemplified by a specified embodiment in which the step of forming the crosspiece precursor is performed prior to the step of forming the picture element assembly precursor, both of the crosspiece precursor and the picture element assembly precursor are formed on the actuator element 18 of the actuator substrate 12, and the step of hardening the crosspiece precursor is performed prior to the step of hardening the picture element assembly precursor.

Figure 6:
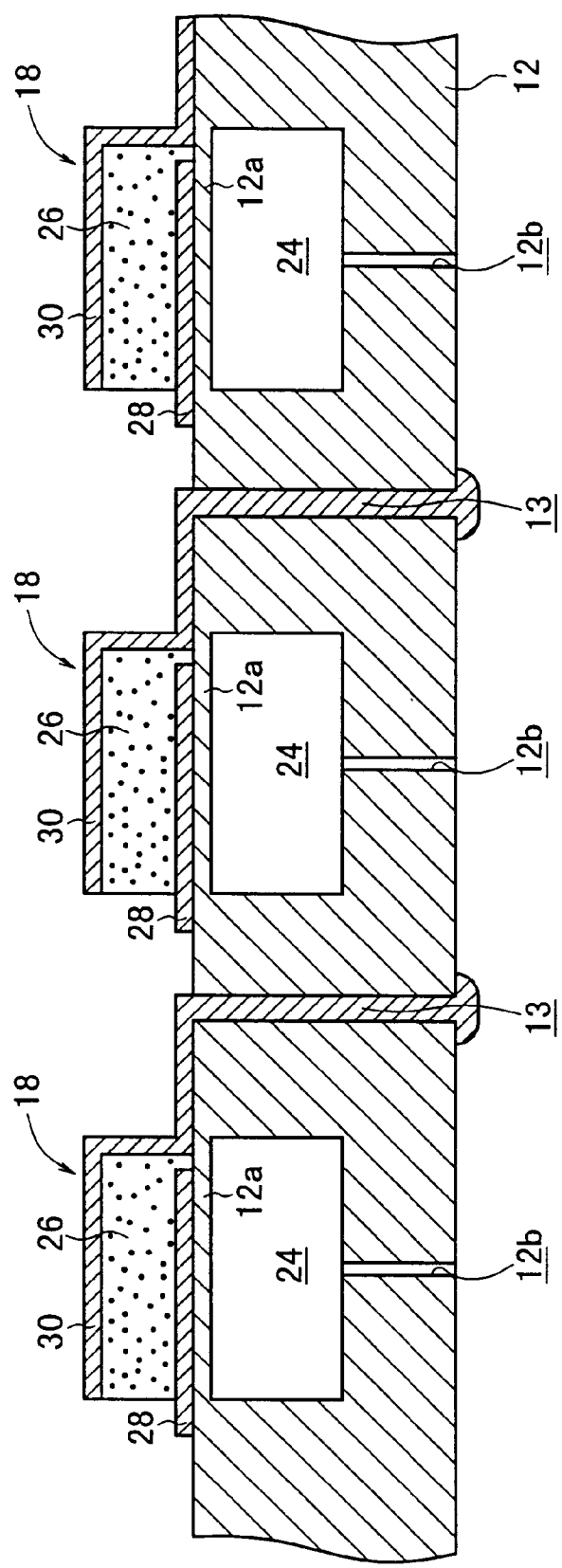
FIG. 6 illustrates a state in which an actuator element is formed on a thin-walled section of an actuator substrate.

At first, as shown in FIG. 6, the actuator element 18 is formed on the actuator substrate 12. In this embodiment, the actuator substrate 12 can be obtained by sintering and integrating a preparation in which a plurality of segment plates are placed at positions not to close through-holes 12b on a flat plate formed with the through-holes 12b extending from a first surface to a second surface, and a thin-walled flat plate is placed on the segment plates. The gap between the segment plates is formed into the hollow space 24, and the portion disposed on the hollow space 24 is formed into the thin-walled section 12a.

The through-hole 13 shown in FIG. 6 is formed by superimposing the through-holes which are previously provided through the flat plate, the segment plate, and the thin-walled flat plate respectively. Alternatively, the through-hole 13 may be formed by boring a through-hole through the substrate 12 after the sintering treatment.

Those preferably adopted for the constitutive material for the flat plate, the segment plate, and the thin-walled flat plate formed with the through-holes 12b include, for example, those having all of the high heat resistance, the high strength, and the high toughness, such as fully stabilized zirconium oxide, partially stabilized zirconium oxide, aluminum oxide, magnesium oxide, titanium oxide, spinel, and mullite. All of the flat plate, the segment plate, and the thin-walled flat plate may be made of the same material, or they may be made of mutually different materials.

The column electrode 28, which is composed of a conductive material including, for example, respective metals such as aluminum, titanium, chromium, iron, cobalt, nickel, copper, zinc, niobium, molybdenum, ruthenium, rhodium, silver, stannum, tantalum, tungsten, iridium, platinum, gold, and lead, or alloys each containing constitutive components of two or more of them, is formed on the thin-walled section 12a of the actuator substrate 12 by means of the film formation method including, for example, the photolithography method, the screen printing method, the dipping method, the application method, the electrophoresis method, the ion beam method, the sputtering method, the vacuum vapor deposition method, the ion plating method, the chemical vapor deposition (CVD) method, and the plating.

Subsequently, the shape-retaining layer 26 is formed on the column electrode 28. A material, which causes polarization or phase transition by the electric field, is selected for the constitutive material for the shape-retaining layer 26. That is, the shape-retaining layer 26 is composed of a piezoelectric/electrostrictive material or an anti-ferroelectric material.

Preferred examples of the piezoelectric/electrostrictive material include lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, lead cobalt niobate, and composite oxides composed of two or more of them. It is also preferable that, for example, lanthanum, calcium, strontium, molybdenum, tungsten, barium, niobium, zinc, nickel, and/or manganese forms solid solution in the piezoelectric/electrostrictive material as described above.

Preferred examples of the anti-ferroelectric material include, for example, lead zirconate, composite oxide of lead zirconate and lead stannate, and composite oxide of lead zirconate, lead stannate, and lead niobate. Each of the elements as described above may also form solid solution in the anti-ferroelectric material as described above.

Subsequently, the row electrode 30, which is composed of the conductive material as described above, is formed over a range from the side surface to the upper surface of the shape-retaining layer 26 by the aid of the through-hole 13 provided through the substrate 12 from the lower surface of the actuator substrate 12.

The actuator element 18 is constructed by the column electrode 28, the shape-retaining layer 26, the row electrode 30, and the thin-walled section 12a of the substrate 12 formed as described above.

Figure 7:
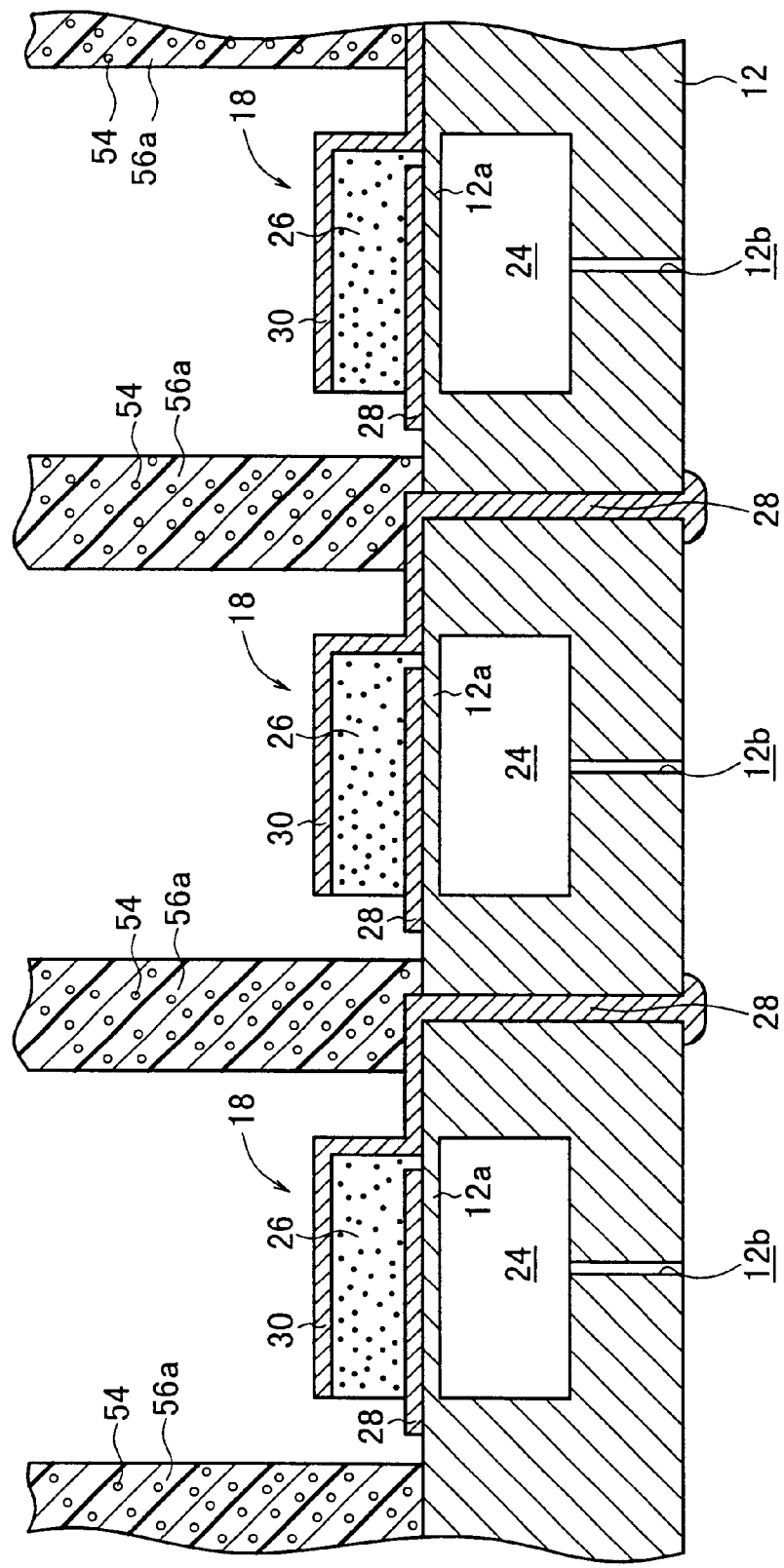
FIG. 7 illustrates a state in which a crosspiece precursor is formed on the actuator substrate.

In the step SA11 (see FIG. 5), as shown in FIGS. 2 and 7, the lengthy thick film, which is composed of, for example, thermosetting resin such as epoxy resin containing the filler 54, is formed at the outside of four corner portions of the actuator element 18. The thick film is the crosspiece precursor 56a. Of course, as shown in FIG. 3, the crosspiece precursor 56a may be formed so that all portions other than the actuator elements 18 on the substrate 12 are covered therewith.

Subsequently, in the step SA12 (see FIG. 5), the crosspiece precursor 56a is hardened to form the crosspiece 56 by means of the heat treatment. During this process, it is desirable that the crosspiece precursor 56a is hardened up to a state in which no more shrinkage occurs. Accordingly, the amount of shrinkage of the crosspiece 56 caused by the increase in internal temperature of the display device 50 is extremely small. Therefore, the time-dependent change of the luminance of the display device 50 in the light off state is remarkably suppressed.

Figure 8:
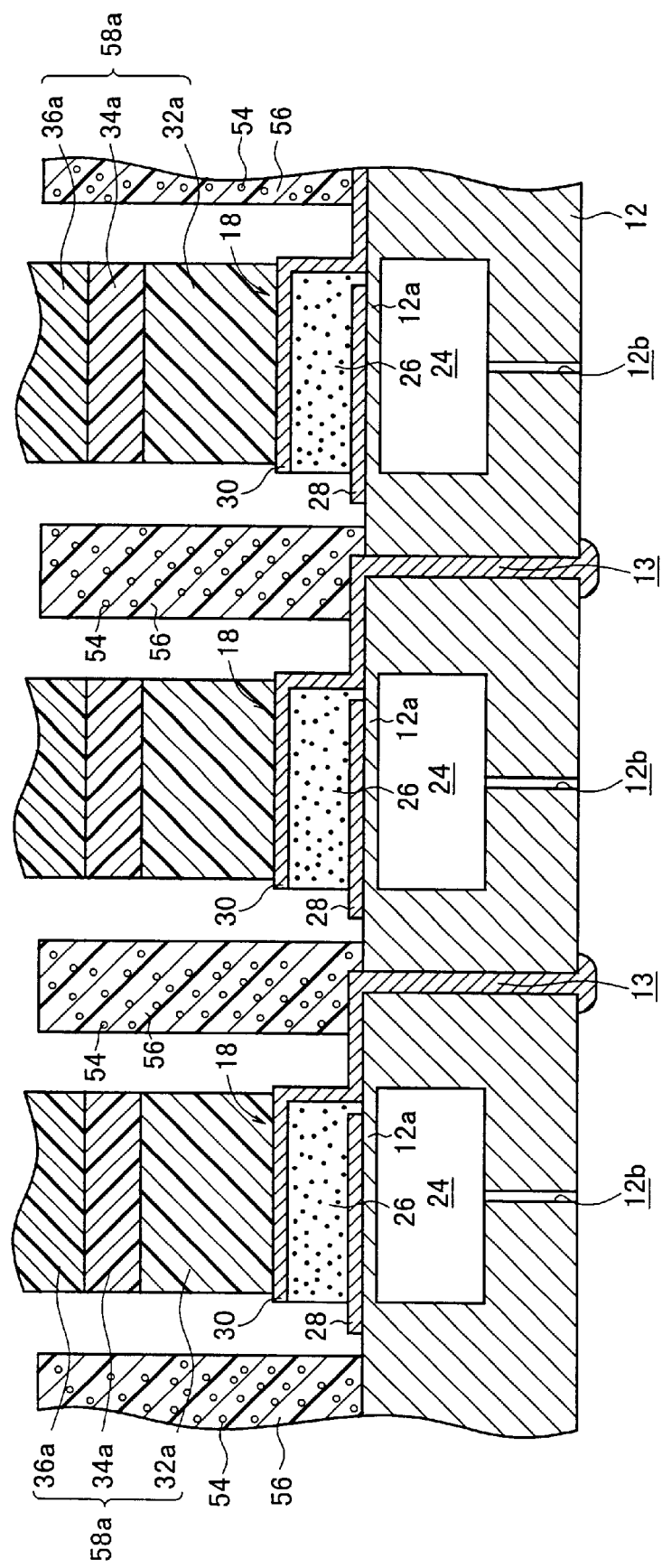
FIG. 8 illustrates a state in which a picture element assembly precursor is formed on the actuator element.

Subsequently, in the step SA13 (see FIG. 5), as shown in FIG. 8, the precursor 32a of the white scattering element layer 32, the precursor 34a of the color filter layer 34, and the precursor 36a of the transparent layer 36 are formed on the actuator element 18 in this order. Thus, the picture element assembly precursor 58a is formed. Alternatively, although not shown, the light-reflective layer composed of metal may be formed before forming the precursor 32a of the white scattering element layer 32. In this case, it is desirable that the insulating layer is further formed before forming the light-reflective layer.

The precursor 32a of the white scattering element layer 32 of the picture element assembly precursor 58a can be formed by using thermosetting resin such as epoxy resin in which titanium oxide or the like is previously dispersed.

The precursor 34a of the color filter layer 34 can be formed by using thermosetting resin such as epoxy resin in which fluorescent pigment is previously dispersed. Further, the precursor 36a of the transparent layer 36 can be formed by using thermosetting resin such as epoxy resin.

The precursor 32a of the white scattering element layer 32 and the precursor 34a of the color filter layer 34 may be hardened at this point of time. The both precursors 32a, 34a may be formed and hardened before forming the crosspiece precursor 56a.

Figure 9:
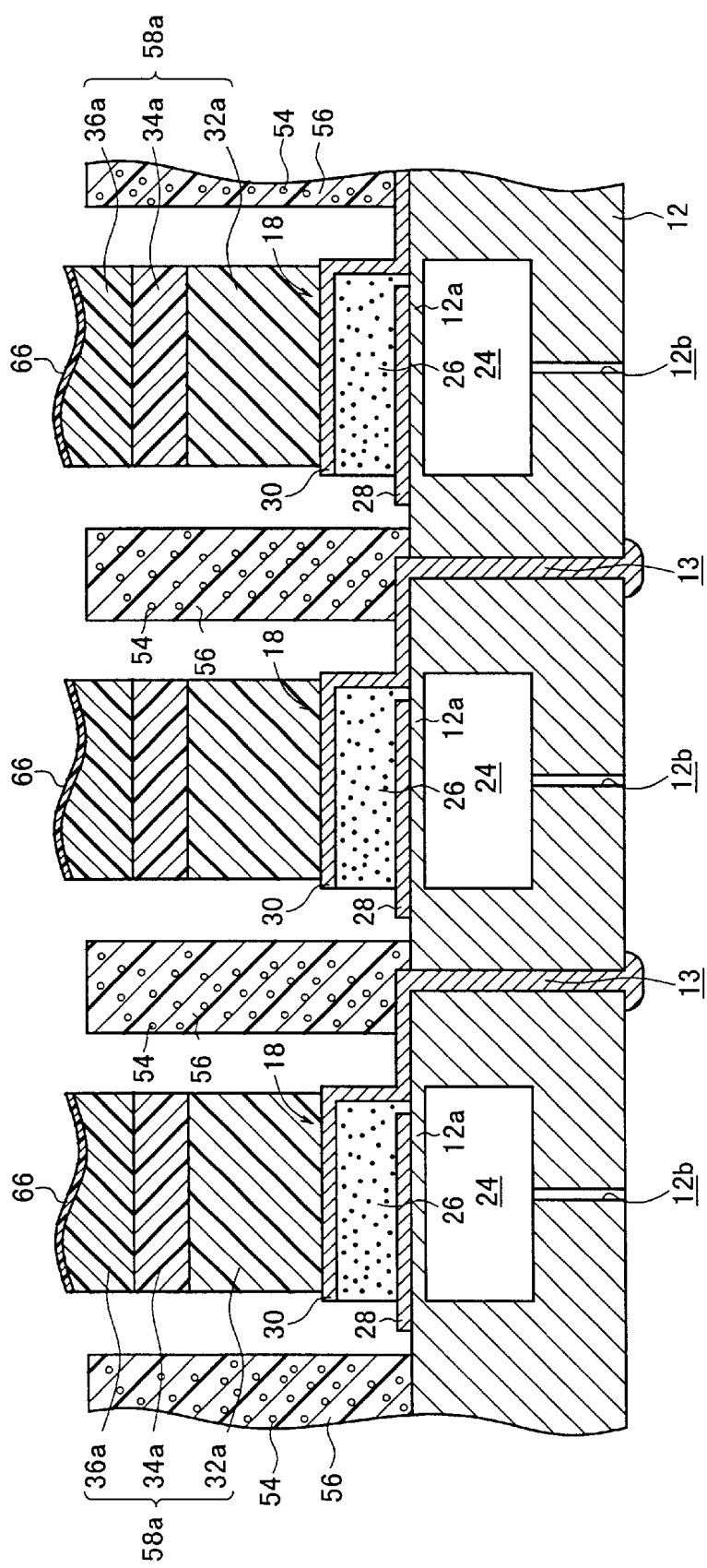
FIG. 9 illustrates a state in which an adhesion-suppressing agent is applied to an upper end surface of the picture element assembly precursor.

Subsequently, in the step SA14 (see FIG. 5), as shown in FIG. 9, the adhesion-suppressing agent 66, which is composed of, for example, the silicone-based substance as described above, is applied to the upper end surface of the precursor 36a of the transparent layer 36. Alternatively, it is also preferable that the adhesion-suppressing agent 66 is added to the precursor 36a of the transparent layer 36. Further alternatively, it is also preferable that the precursor 36a of the transparent layer 36 is formed by using resin to which the adhesion-suppressing agent 66 is previously added. This technique will be described later on.

The row electrode 30, the respective layers ranging from the precursor 26a of the shape-retaining layer 26 to the precursor 36a of the transparent layer 36, and other components can be formed by means of the film formation method as described above.

Figure 10:
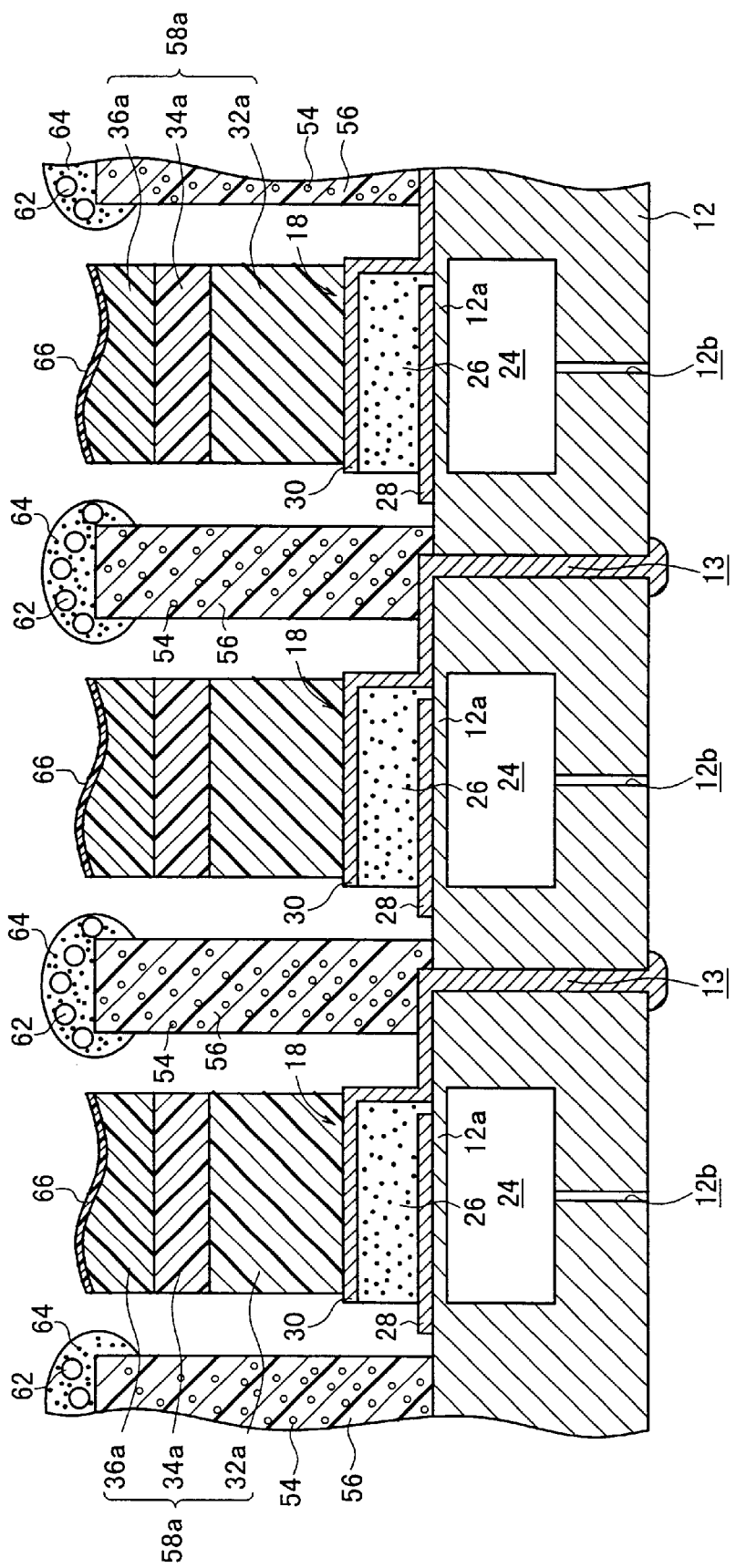
FIG. 10 illustrates a state in which a filler-containing adhesive is applied to an upper end surface of the crosspiece precursor.

Subsequently, in the step SA15 (see FIG. 5), as shown in FIG. 10, the filler-containing adhesive 64 is applied to the upper end surface of the crosspiece 56. The application method includes the film formation method as described above.

Figure 11:
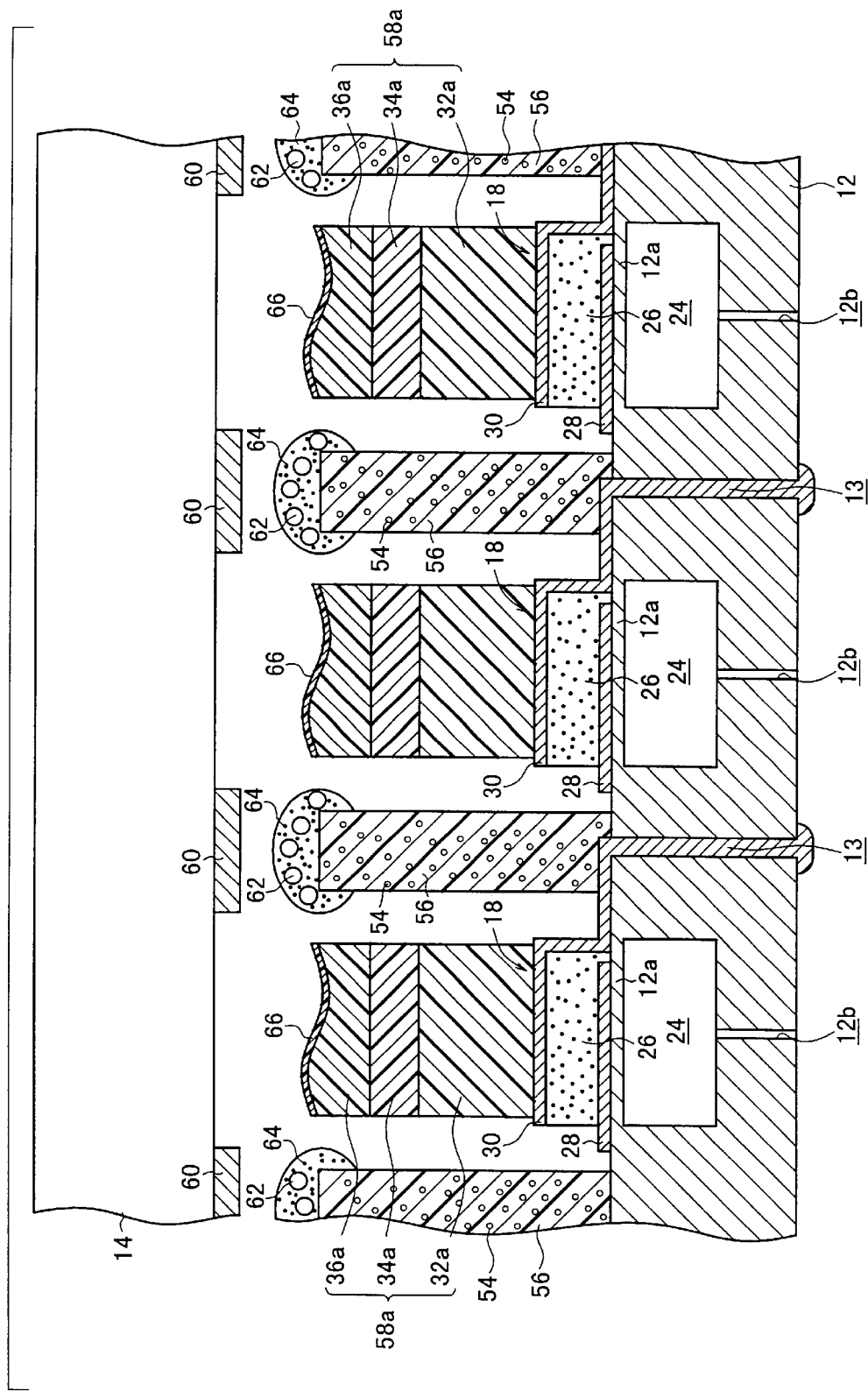
FIG. 11 illustrates a state in which an optical waveguide plate formed with light-shielding layers on its surface is placed on crosspieces.

On the other hand, as for the optical waveguide plate 14, in the step SB11 (see FIG. 5), as shown in FIG. 11, the light-shielding layer 60 is formed on the surface of the optical waveguide plate 14 in accordance with the film formation method as described above. As described above, the light-shielding layer 60 is composed of, for example, metal having low light-absorbing ability such as Cr, Al, Ni, and Ag; resin containing carbon black, black pigment, or black dye; or transparent cured resin having low light-scattering property. The light-shielding layer 60 is formed at the position to be placed on the crosspiece 56.

Unnecessary organic matters occasionally remain on the surface of the optical waveguide plate 14 after the light-shielding layer 60 is formed. For example, when the light-shielding layer 60 is formed by means of the photolithography method, any photoresist remains on the surface of the optical waveguide plate 14 in some cases. If the optical waveguide plate 14, on which unnecessary organic matters remain on the surface as described above, is placed on the picture element assembly precursor 58a, the adhesion of the picture element assembly precursor 58a to the optical waveguide plate 14 easily takes place. In such a situation, even when the actuator element 18 is displaced downwardly, the picture element assembly 58 is not separated from the optical waveguide plate 14 by a predetermined spacing distance. As a result, it is impossible to realize the complete light off state for the unit dot 52 which includes the picture element assembly 58.

Even when the light-shielding layer 60 is not formed on the optical waveguide plate 14, for example, if the optical waveguide plate 14 contacts with, for example, any equipment or any apparatus to which organic matters such as human sweat and sebaceous matter adhere, then the organic matters adhere to the optical waveguide plate 14 in some cases. In such a case, it is sometimes impossible to allow the unit dot 52 to be in the complete light off state in the same manner as described above.

Therefore, it is desirable that the unnecessary organic matters are previously removed in the step SB12 (see FIG. 5) before joining the optical waveguide plate 14 to the crosspiece 56. Specifically, the optical waveguide plate 14 is subjected to a washing treatment. Alternatively, an ashing treatment may be applied to the unnecessary organic matters remaining on the surface of the optical waveguide plate 14.

The washing treatment for the optical waveguide plate 14 is performed, for example, by immersing the optical waveguide plate 14 in an acidic solution. Alternatively, the optical waveguide plate 14 may be immersed in ultrapure water to perform ultrasonic washing. Further alternatively, the optical waveguide plate 14 may be immersed in an acidic solution to perform ultrasonic washing.

In the ashing treatment, for example, the gas phase oxygen atom is generated by means of electron collision dissociation by the aid of plasma, and then the oxygen atom is reacted with the unnecessary organic matters remaining on the surface of the optical waveguide plate 14 to form a volatile product. The volatile product is evacuated from the inside of the processing apparatus (plasma asher), and thus the organic matters are volatilized and removed.

Another example of the ashing treatment includes ozonolysis. That is, the optical waveguide plate 14 is subjected to a heat treatment in an ozone atmosphere, or far infrared light is radiated onto the optical waveguide plate 14 in an ozone atmosphere. Accordingly, the organic matters are reacted with ozone to form a volatile product. Of course, it is also preferable to simultaneously perform the heat treatment and the far infrared radiation.

It is needless to say that when the light-shielding layer 60 is composed of an organic matter, the organic matter-removing step SB 12 is performed under a condition in which the light-shielding layer 60 is not removed, and the organic matters, which remain on the end surface of the optical waveguide plate 14 opposed to the picture element assembly 58, are removed. When a material, with which no unnecessary organic matter remains, is used as the constitutive material for the light-shielding layer 60, it is a matter of course that the organic matter-removing step SB 12 may be omitted.

Although not shown, the adhesion-suppressing agent 66 may be applied to the end surface of the optical waveguide plate 14 opposed to the picture element assembly precursor 58a. The adhesion-suppressing agent 66 is applied uniformly onto the optical waveguide plate 14 from which the organic matters have been removed. Therefore, when the display device 50 is allowed to be in the light off state, the optical waveguide plate 14 and the picture element assembly 58 are reliably separated from each other. Additionally, the adhesion of the both is further avoided upon the abutment of the optical waveguide plate 14 and the picture element assembly 58. The gap between the both is further narrowed by the aid of the adhesion-suppressing agent 66.

Subsequently, in the step SC11 (see FIG. 5), the crosspiece 56 and the optical waveguide plate 14 from which the unnecessary organic matters have been removed are joined to one another by the aid of the filler-containing adhesive 64. That is, the optical waveguide plate 14 is placed on the crosspieces 56 and the picture element assembly precursors 58a so that the respective light-shielding layers 60 are superimposed on the respective crosspieces 56 (see FIG. 11). As a result of the placement, the picture element assembly precursor 58a and the light-shielding layer 60 and the crosspiece 56 to which the filler-containing adhesive 64 is applied are allowed to intervene between the actuator substrate 12 and the optical waveguide plate 14.

In this state, the display device 50 is pressed from both of the upper surface of the optical waveguide plate 14 and the lower surface of the substrate 12 to bond the filler-containing adhesive 64 to the optical waveguide plate 14. The pressing method, which is adopted in this process, is not specifically limited. However, those preferably adoptable include, for example, the pressing with the weight, the CIP (cold isostatic press) method, the flip chip bonder-based pressurization, the constant value control and the low pressure press method, and the vacuum packaging method.

Figure 12:
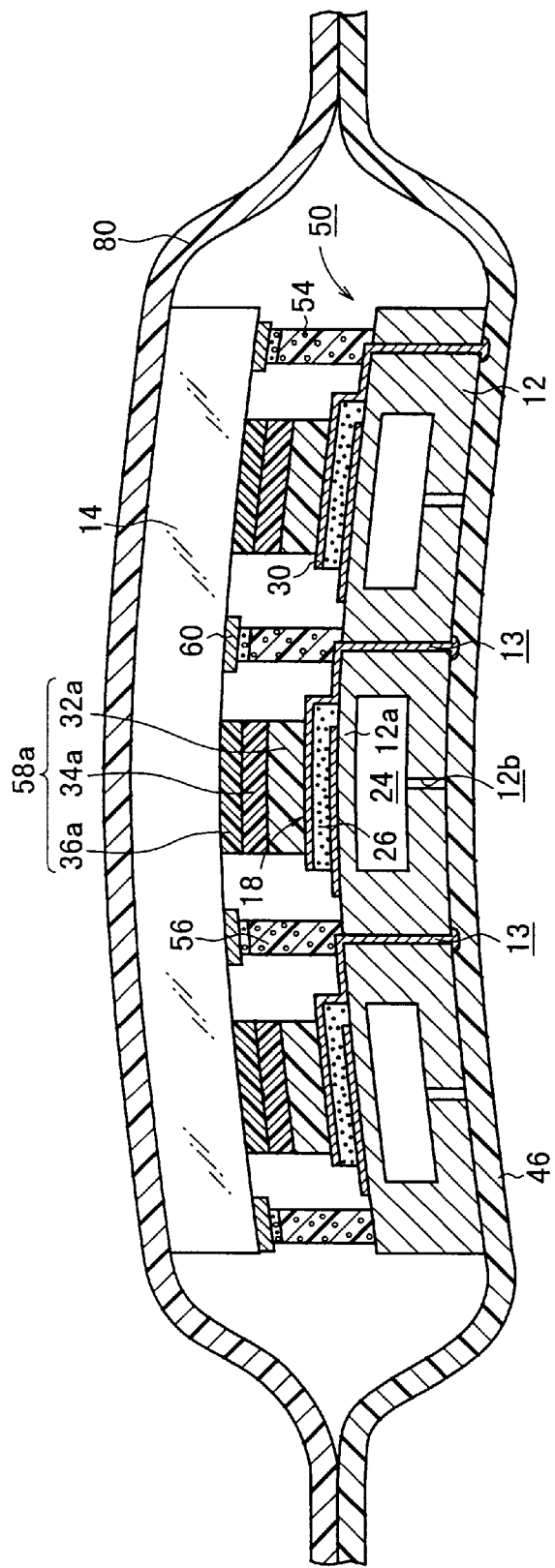
FIG. 12 illustrates a state in which the device is pressed from the upper surface of the optical waveguide plate and the lower surface of the actuator substrate in accordance with the vacuum packaging method.

The vacuum packaging method is a method as shown in FIG. 12. That is, an intermediate product of the display device 50, which is in a state in which the optical waveguide plate 14 is allowed to abut against the crosspiece 56 with the light-shielding layer 60 intervening therebetween, is placed in a vacuum packaging bag 80. Subsequently, the interior of the vacuum packaging bag is evacuated in vacuum. During the vacuum evacuation, the upper surface of the optical waveguide plate 14 and the lower surface of the substrate 12 are pressed by the vacuum packaging bag 80. Accordingly, the crosspiece 56 is bonded to the optical waveguide plate 14 by the aid of the filler-containing adhesive 64. As described above, the adhesion-suppressing agent 66 is added or applied to the picture element assembly precursor 58a. Therefore, the picture element assembly precursor 58a is not bonded when the crosspiece 56 is bonded to the optical waveguide plate 14.

In the case of the vacuum packaging method, the actuator substrate 12 and the optical waveguide plate 14 are uniformly pressed, even when the actuator substrate 12 involves any warpage or waviness. That is, the vacuum packaging method is advantageous in that the crosspiece precursor 56a can be reliably bonded to the optical waveguide plate 14 even when the actuator substrate 12 involves any warpage or waviness. Therefore, it is possible to obtain the display device 50 in which the respective unit dots 52 have uniform luminance.

Two preferred methods as the vacuum packaging method will now be explained with reference to FIGS. 13 and 14.

Figure 13:
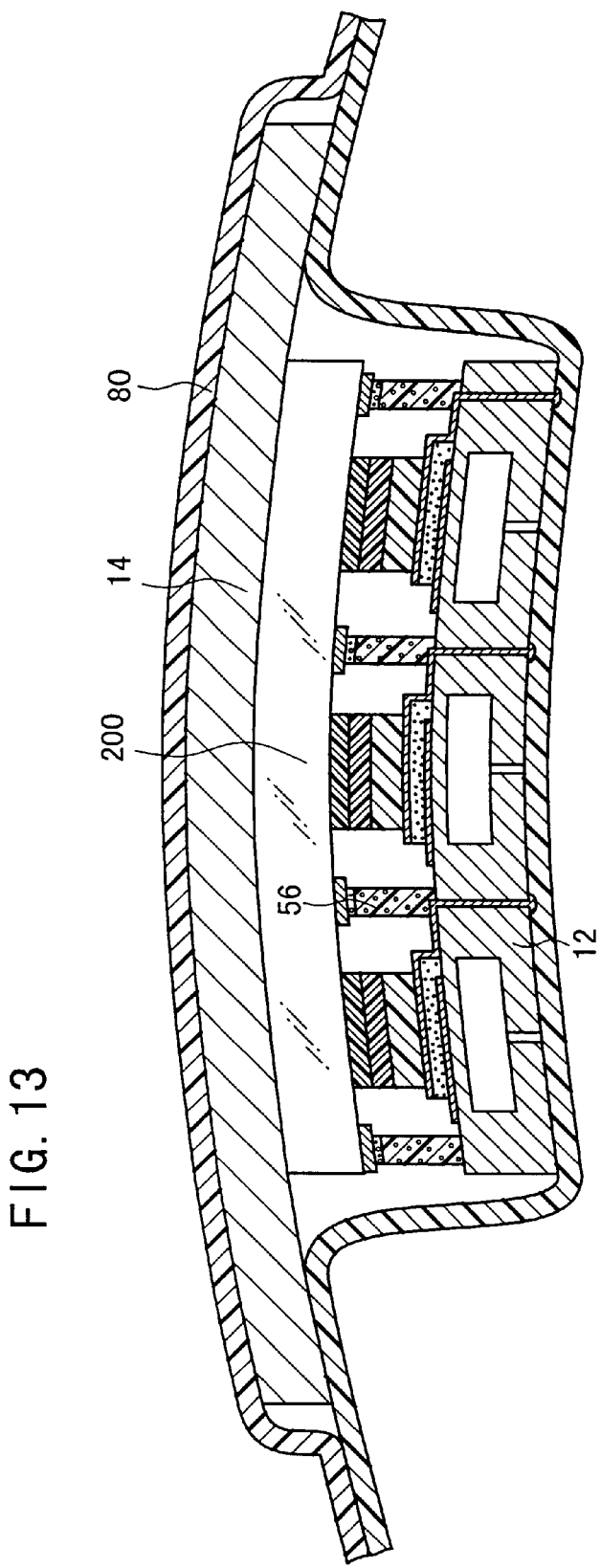
FIG. 13 illustrates a first method based on the vacuum packaging method.

At first, the first method is shown in FIG. 13. In this method, an intermediate product of the display device 50, in which the optical waveguide plate 14 is allowed to abut against the crosspiece 56 with the light-shielding layer 60 intervening therebetween, is placed in the vacuum packaging bag 80 together with a rigid plate 200. Subsequently, the interior of the vacuum packaging bag 80 is vacuum-evacuated. Accordingly, it is possible to effectively reduce the occurrence of warpage on the substrate 12 and the optical waveguide plate 14.

The rigid plate 200 may be installed on the side of the optical waveguide plate 14 as shown in FIG. 13. Alternatively, the rigid plate 200 may be installed on the side of the actuator substrate 12. Further alternatively, the rigid plates 200 may be installed on the both sides.

In a preferred embodiment, as shown in FIG. 13, the rigid plate 200 is installed on the side of the optical waveguide plate 14, because of the following reason. That is, the reduction of the warpage on the plate surface of the optical waveguide plate 14 affords a great degree of contribution to the improvement in screen quality. Further, even when the actuator substrate 12 involves any waviness, it is possible to maximally utilize such a feature of the vacuum packaging method that the pressure can be uniformly applied. If the warpage is large on the plate surface of the optical waveguide plate 14, it is feared that the following inconvenience may occur. That is, for example, the image is viewed with somewhat strain, and juncture portions between the display devices 50 are conspicuous when a large number of the display devices 50 are aligned to construct a large screen.

The material for the rigid plate 200 is not specifically limited. However, for example, quartz glass may be preferably used. The size of the rigid plate 200 is not specifically limited as well. However, it is preferable that the rigid plate 200 has a size which is approximately the same as that of the optical waveguide plate 14 or which is slightly larger than that of the optical waveguide plate 14.

Figure 14:
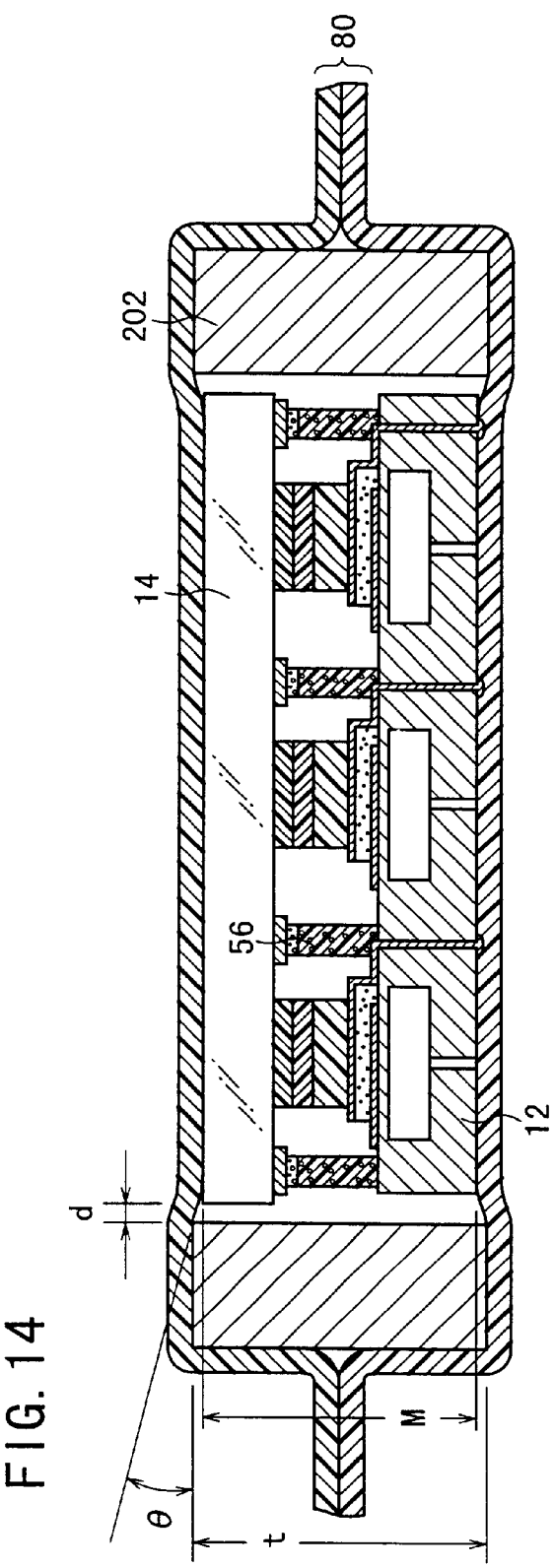
FIG. 14 illustrates a second method based on the vacuum packaging method.

Next, the second method is shown in FIG. 14. In this method, an intermediate product of the display device 50, in which the optical waveguide plate 14 is allowed to abut against the crosspiece 56 with the light-shielding layer 60 intervening therebetween, is placed in the vacuum packaging bag 80 in a state of being enclosed in a frame 202. Subsequently, the interior of the vacuum packaging bag 80 is vacuum-evacuated. Accordingly, it is possible to effectively reduce any inconvenience which would be otherwise caused by the concentration of stress in the vicinity of the ends of the actuator substrate 12 and the optical waveguide plate 14.

Without the frame 202, the stress tends to be concentrated at the ends of the optical waveguide plate 14 and the actuator substrate 12. It is feared that the strain caused thereby brings about any deterioration of the screen quality. When the frame 202 is provided so as to surround the actuator substrate 12 and the optical waveguide plate 14, then a part of the pressure is supported by the frame 202, and it is possible to mitigate the stress concentration which would be otherwise brought about at the ends of the optical waveguide plate 14 and the actuator substrate 12.

The frame 202 is arranged most effectively in a form (four-side structure) to surround the outer circumferences of the optical waveguide plate 14 and the actuator substrate 12. However, it is also preferable that a frame having a three-side structure is installed, or rod-shaped frames are installed corresponding to two sides.

Assuming that M represents the distance from the upper surface of the optical waveguide plate 14 to the lower surface of the actuator substrate 12, for example, it is preferable that the thickness t of the frame 202 has such a size that the angle θ, which is formed by the horizontal line and a line for connecting the end of the upper surface of the optical waveguide plate 14 opposed to the frame 202 and the end of the upper end surface of the frame 202 disposed on the inner circumference, satisfies $-90° < θ ≦ 80°$. Further, the distance d, which ranges from the inner surface of the frame 202 to the end of the optical waveguide plate 14 (or the end of the actuator substrate), is a distance of such a degree that the vacuum packaging bag 80 is distributed over the entire upper surface of the optical waveguide plate 14 (or the entire lower surface of the actuator substrate 12).

After the crosspiece 56 is bonded to the light-shielding layer 60, the curing or hardening component of the filler-containing adhesive 64 is hardened. For example, the hardening component is thermosetting resin, a heat treatment is performed. Owing to the hardening, the crosspiece 56 is tightly joined to the optical waveguide plate 14.

When the filler-containing adhesive 64 is hardened, it is preferable that the filler-containing adhesive 64 is hardened up to the state in which the filler-containing adhesive 64 is not further hardened. When the hardening is performed as described above, the amount of shrinkage of the filler-containing adhesive 64, which is caused by the increase in internal temperature of the display device 50, is remarkably decreased. Therefore, the time-dependent change of the luminance of the display device 50 in the light off state is further suppressed.

Finally, in the step SC12 (see FIG. 5), the picture element assembly precursor 58a on the actuator element 18 is hardened to form the picture element assembly 58. That is, all of the precursor 32a of the white scattering element layer 32, the precursor 34a of the color filter layer 34, and the precursor 36a of the transparent layer 36 are hardened to form the white scattering element layer 32, the color filter layer 34, and the transparent layer 36. Accordingly, the display device 50, which is provided with a plurality of unit dots 52, is consequently obtained.

The hardening of the hardening component of the filler-containing adhesive 64 and the step SC12 of hardening the picture element assembly precursor may be performed by placing the display device 50 in the vacuum packaging bag 80. However, it is preferable that these procedures are performed while taking the display device 50 out of the vacuum packaging bag 80, because of the following reason. That is, if the picture element assembly precursor 58a is hardened while applying the pressure from the side of the substrate 12 and the side of the optical waveguide plate 14 in the vacuum packaging bag 80, the actuator substrate 12 and the crosspiece 56 are merely slightly distorted. As a result, any dispersion occasionally occurs concerning the abutment state of the optical waveguide plate 14 and the picture element assembly 58 for each of the unit dots 52.

In such a situation, it is difficult to allow the display device 50 to emit light at a desired luminance. Of course, even when the actuator substrate 12 and the optical waveguide plate 14 are joined to one another in accordance with another method, it is desirable that the display device 50 is released from the pressing, when the crosspiece precursor 56a and the picture element assembly precursor 58a are hardened.

When there is any difference in shape of warpage or waviness between the optical waveguide plate 14 and the actuator substrate 12, it is preferable to perform the hardening in the vacuum packaging in order to reliably effect the joining operation.

Figure 15:
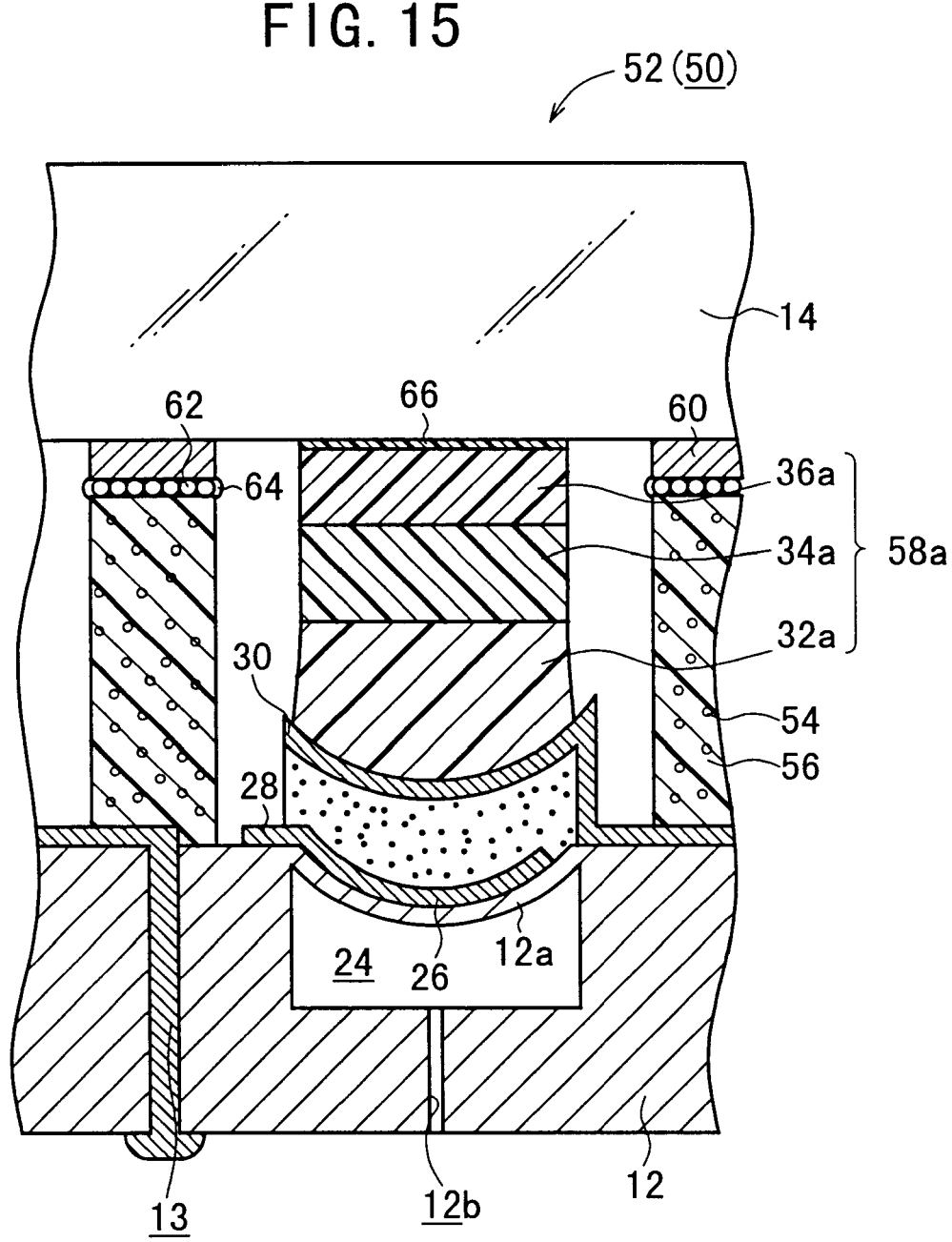
FIG. 15 illustrates a state in which the actuator element is displaced toward the actuator substrate, and the picture element assembly precursor is allowed to abut against the optical waveguide plate.

When the step SC12 of hardening the picture element assembly precursor is performed, as shown in FIG. 15, it is preferable that the picture element assembly precursor 58a is hardened in a state in which the actuator element 18 is displaced toward the actuator substrate 12, and the picture element assembly precursor 58a is allowed to abut against the optical waveguide plate 14, because of the following reason. That is, the picture element assembly 58, which is formed in such a state, undergoes the pressing force from the actuator element 18. Therefore, the picture element assembly 58 reliably makes the pressed contact with the optical waveguide plate 14 when the state of no load is established. Therefore, it is possible to allow the unit dot 52 (display device 50) to emit light at a desired luminance.

Also in this procedure, the picture element assembly 58a is prevented from adhesion to the optical waveguide plate 14, owing to the action of the adhesion-suppressing agent 66 added or applied to the picture element assembly precursor 58a. Therefore, in the obtained display device 50, the picture element assembly 58 is reliably separated from the optical waveguide plate 14. Thus, any incomplete light off state is avoided.

In order to displace the actuator element 18 while being directed toward the actuator substrate 12, the voltage may be applied between the column electrode 28 and the row electrode 30. When the voltage is applied as described above, the shape-retaining layer 26 makes bending deformation toward the actuator substrate 12. The column electrode 28, the row electrode 30, and the thin plate section 12a of the substrate 12, which follow the bending deformation, also make bending deformation in the same direction. Accordingly, the entire actuator element 18 is displaced toward the actuator substrate 12.

The displacement amount can be adjusted conveniently and precisely by setting the applied voltage. Therefore, for example, even when the rate of shrinkage before and after the hardening from the crosspiece precursor 56a to the crosspiece 56 differs depending on each of production lots, it is possible to adjust, within an appropriate range, the displacement amount of the actuator element 18 when the step SC12 of hardening the picture element assembly precursor is performed. Further, this procedure is useful when the setting of the driving voltage of the display device 50 (voltage required to change the display device 50 from the light off state to the light emission state or from the light emission state to the light off state) is optimized.

In general, the actuator element 18 has any hysteresis concerning the displacement characteristic in view of the properties such as those of the polarization and the phase transition. In this case, it is preferable to adopt a process for the voltage in which a voltage larger than the voltage used to harden the picture element assembly is once applied. It is more preferable that such a voltage is equivalent to or not less than the voltage which is used to turn OFF the light emission during the driving.

This treatment effects such that the displacement characteristic of the actuator element 18 coincides with the characteristic curve to be followed upon the actual driving. It is feared that any influence may be caused by the initial state including, for example, the residual electric charge, if a constant voltage is merely applied. However, when the voltage application method as described above, in which the hysteresis characteristic is considered, is used, it is possible to suppress the displacement amount of the actuator element 18 more precisely.

Figure 16:
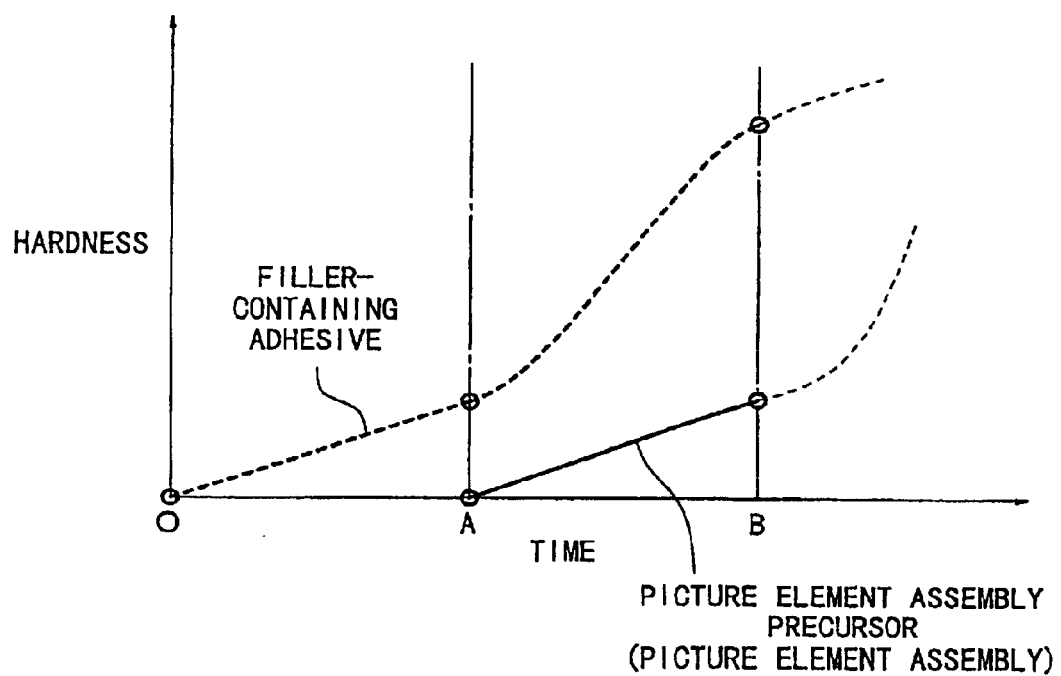
FIG. 16 shows a graph illustrating hardening states of the filler-containing adhesive and the picture element assembly precursor.

Next, the second production method will be explained with reference to FIGS. 16 to 18. The steps corresponding to those of the first production method are designated by the same nomenclatures, detailed explanation of which will be omitted.

At first, the actuator element 18 is formed on the thin-walled section 12a of the actuator substrate 12 in accordance with the first production method. That is, the column electrode 28, the shape-retaining layer 26, and the row electrode 30 are formed on the thin-walled section 12a in this order (see FIG. 6).

Subsequently, in the step SA21 (see FIG. 18), the crosspiece precursor 56a is formed on the actuator substrate 12. After that, in the step SA22 (see FIG. 18), the crosspiece precursor 56a is hardened to form the crosspiece 56.

Figure 17:
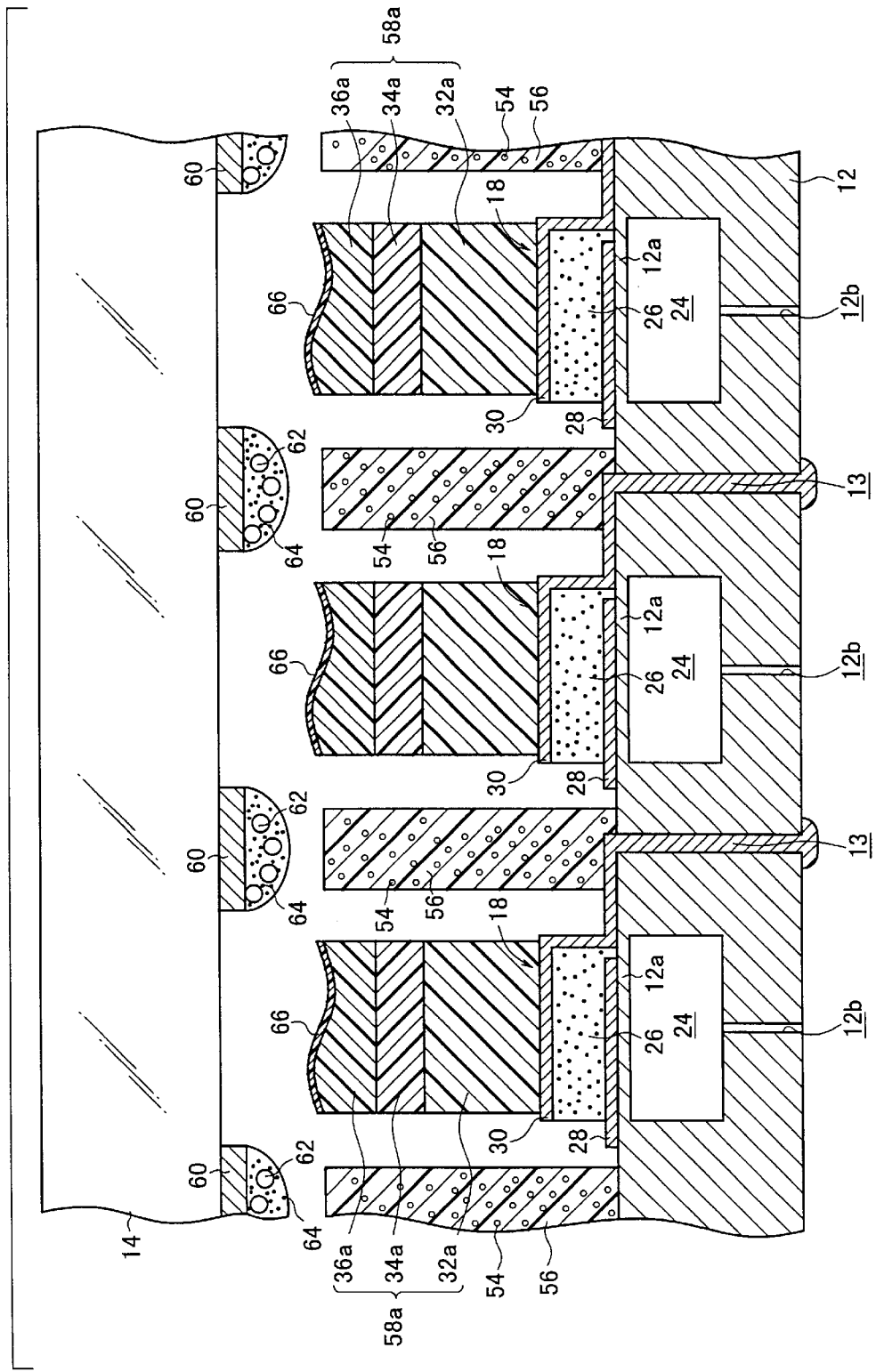
FIG. 17 illustrates a state in which the filler-containing adhesive is applied to the light-shielding layer.
Figure 18:
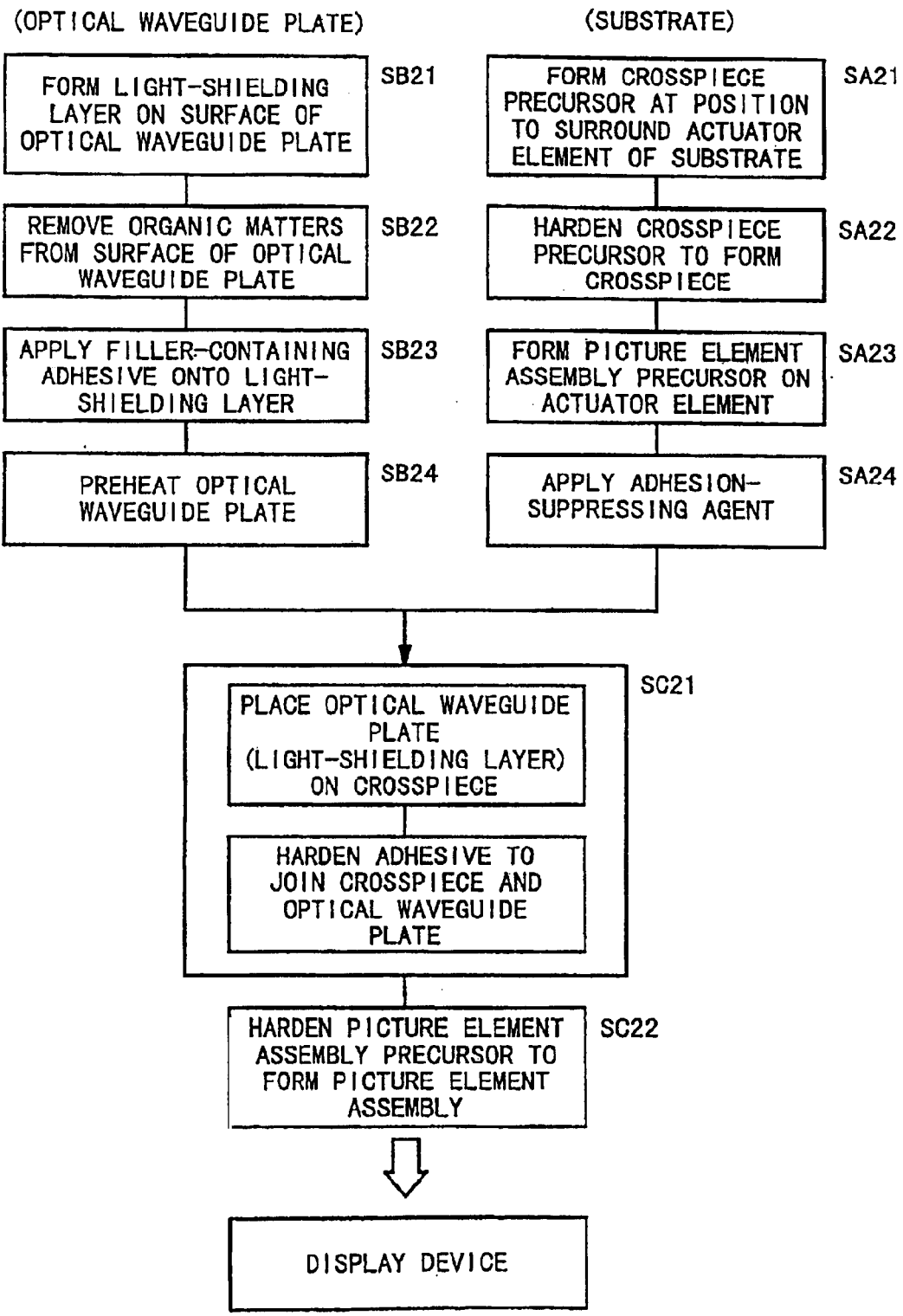
FIG. 18 shows a flow chart illustrating a second production method.

On the other hand, in the step SB21 (see FIG. 18), as shown in FIG. 17, the light-shielding layer 60 is formed on the surface of the optical waveguide plate 14 in accordance with the film formation method as described above. Subsequently, in the step SB22 (see FIG. 18), unnecessary organic matters are previously removed. After that, in the step SA23 (see FIG. 18), the filler-containing adhesive 64 is applied to the light-shielding layer 60 formed on the optical waveguide plate 14 at the point of time O shown in FIG. 16, and then in the next step SB24 (see FIG. 18), the optical waveguide plate 14 is preliminarily heated to slightly harden the filler-containing adhesive 64 thereby.

Subsequently, at the point of time (A in FIG. 16) at which the filler-containing adhesive 64 is slightly hardened, the picture element assembly precursor 58a is formed on the actuator element 18 of the actuator substrate 12 in the step SA23 (see FIG. 18). After that, in the step SA24 (see FIG. 18), as shown in FIG. 17, the adhesion-suppressing agent 66, which is composed of, for example, the silicone-based substance as described above, is applied to the upper end surface of the precursor 36a of the transparent layer 36.

Subsequently, in the step SC21 (see FIG. 18), as shown in FIG. 17, the optical waveguide plate 14 and the crosspiece 56 are overlapped with each other so that the light-shielding layer 60 is placed on the crosspiece 56. The actuator substrate 12 and the optical waveguide plate 14 are joined to one another by the aid of the crosspiece 56 and the picture element assembly precursor 58a, for example, in accordance with the vacuum packaging method as described above.

After that, the entire display device 50 is heated to further harden the filler-containing adhesive 64, and the hardening is started for the picture element assembly precursor 58a. In this case, the hardening of the picture element assembly precursor 58a is not completed yet at the point of time (B in FIG. 16) at which the hardening of the filler-containing adhesive 64 is approximately completed. Therefore, the step SC22 of hardening the picture element assembly precursor is performed while displacing the actuator element 18 in this state. Thus, it is possible to obtain the display device 50.

The formation and the hardening of the crosspiece 56 may be performed a plurality of times, if necessary. It is also preferable to use a technique in which the crosspiece 56, which has been already hardened, is used as a spacer so that the crosspiece section, which is to be formed in the second time operation or followings, is figured, for example, by means of the vacuum packaging. Accordingly, the heights of the top heads of the crosspieces 56 can be aligned approximately uniformly.

The following procedure makes it possible to harden the picture element assembly precursor 58*a* after the crosspiece precursor 56*a*, even when the step SA22 of forming the picture element assembly precursor is performed prior to the step SA21 of forming the crosspiece precursor.

That is, at first, the picture element assembly precursor 58*a* is formed by using a resin having a hardening speed lower than that of a resin to be used as the raw material for the crosspiece precursor 56*a*. For example, two-part setting resins, which have mutually different component composition ratios, are prepared. The rein, which has a faster hardening speed, is used as the raw material for the crosspiece precursor 56*a*. The resin, which has a slower hardening speed, is used as the raw material for the picture element assembly precursor 58*a*.

Secondly, a resin, which is hardened at a temperature lower than that of the raw material resin for the picture element assembly precursor 58*a*, is selected for the raw material resin for the crosspiece precursor 56*a*. The crosspiece precursor 56*a* is hardened to form the crosspiece 56 by performing the heating at a low temperature. The picture element assembly precursor 58*a* is hardened to form the picture element assembly 58 by performing the heating at a high temperature.

Thirdly, a resin, which is softened at a temperature higher than that of the raw material resin for the picture element assembly precursor 58*a*, is selected for the raw material resin for the crosspiece precursor 56*a*.

Fourthly, for example, a thermosetting resin is selected for the raw material resin for the crosspiece precursor 56*a*, and a photocurable resin is selected for the raw material resin for the picture element assembly precursor 58*a*. The crosspiece precursor 56*a* is hardened to form the crosspiece 56 by performing the heating, and then the picture element assembly precursor 58*a* is hardened to form the picture element assembly 58 by radiating the light. Of course, it is also preferable that two or more methods, which are selected from the methods described above, are combined to execute the procedure.

The picture element assembly precursor 58*a* may be formed on the optical waveguide plate 14. In this case, in the joining step SC21, the picture element assembly precursor 58*a* may be placed and joined on the actuator element 18.

Figure 19:
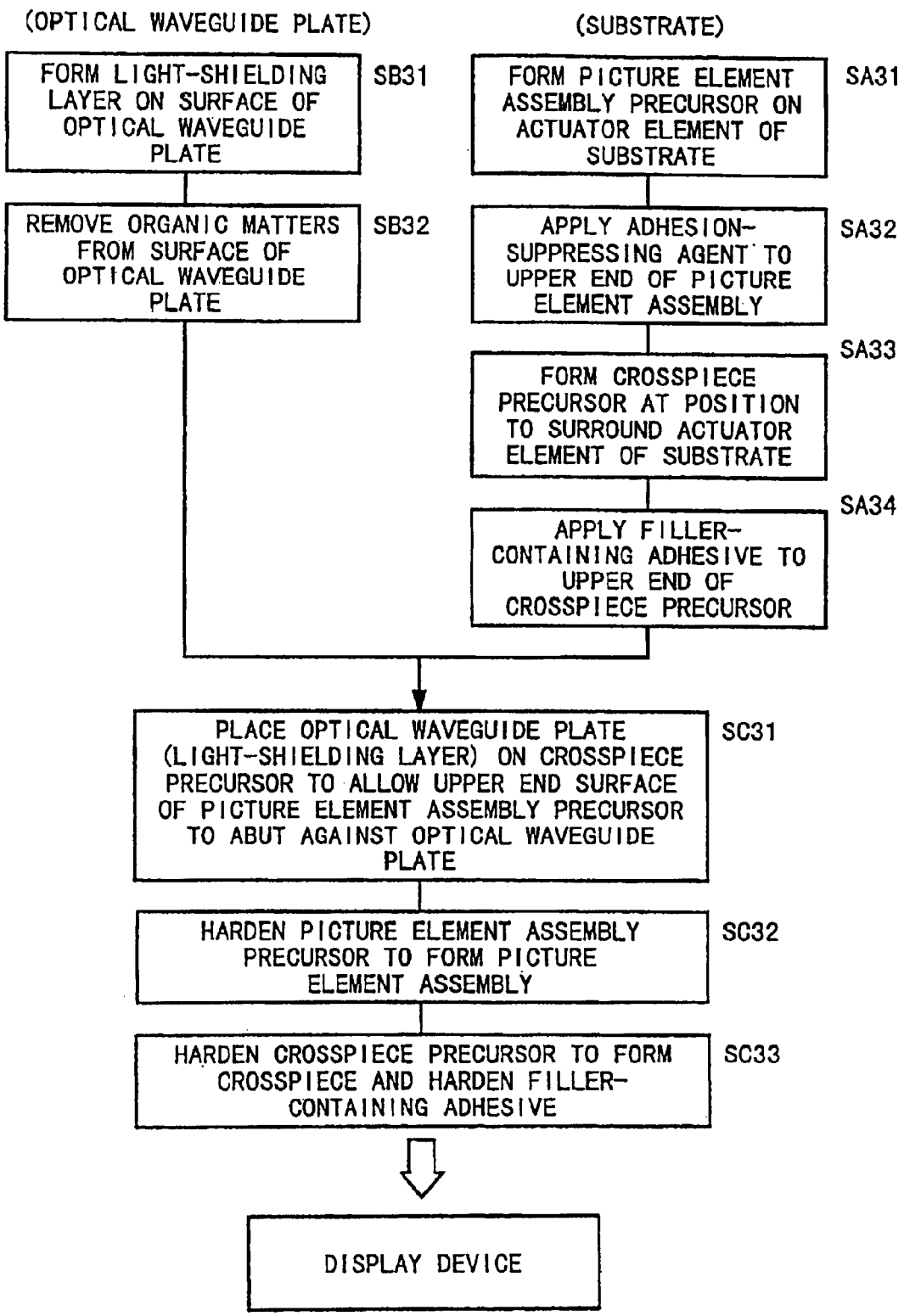
FIG. 19 shows a flow chart illustrating a third production method.

Next, the third production method will be explained with reference to a flow chart shown in FIG. 19. The steps corresponding to those of the first production method are designated by the same nomenclatures, detailed explanation of which will be omitted.

At first, the actuator element 18 is formed on the thin-walled section 12*a* of the actuator substrate 12 in accordance with the first production method. That is, the column electrode 28, the shape-retaining layer 26, and the row electrode 30 are formed on the thin-walled section 12*a* in this order (see FIG. 6).

Subsequently, in the step SA31 (see FIG. 19), the picture element assembly precursor 58*a* is formed on the actuator element 18. In the step SA32, the adhesion-suppressing agent 66 is applied to the upper end surface of the picture element assembly precursor 58*a*. Alternatively, as described above, the adhesion-suppressing agent 66 may be added to the precursor 36*a* of the transparent layer 36. Further alternatively, the precursor 36*a* of the transparent layer 36 may be formed by using the resin previously added with the adhesion-suppressing agent 66.

Subsequently, in the step SA33, the crosspiece precursor 56*a* is formed on the actuator substrate 12 so as to surround the actuator element 18. In the step SA34, the filler-containing adhesive 64 is applied to the upper end surface of the crosspiece precursor 56*a*.

Subsequently, in the step SC31, the optical waveguide plate 14, on which the light-shielding layer 60 is formed as described above and from which the unnecessary organic matters are removed as described above, is placed on the upper end surfaces of the crosspiece precursors 56*a* so that the lower surface of the optical waveguide plate 14 abuts against the upper end surfaces of the picture element assembly precursors 58*a*.

In this procedure, the light-shielding layer 60 is placed on the crosspiece precursor 56*a*. In this state, for example, the vacuum packaging method described above is used to press the display device 50 from the lower surface of the actuator substrate 12 and the upper surface of the optical waveguide plate 14. In accordance with the pressing operation, the actuator substrate 12 and the optical waveguide plate 14 are joined to one another by the aid of the crosspiece precursors 56*a* and the picture element assemblies 58.

Subsequently, in the step SC32, the picture element assembly precursor 58*a* is hardened to form the picture element assembly 58.

Subsequently, in the step SC33, the crosspiece precursor 56*a* is hardened to form the crosspiece 56, and the filler-containing adhesive 64 is hardened. In this procedure, the height of the crosspiece 56 is lowered as compared with the crosspiece precursor 56*a*, because of the following reason. That is, when the crosspiece precursor (resin) 56*a* is hardened to form the crosspiece (cured resin) 56, the shrinkage also occurs.

As a result of the shrinkage, the actuator substrate 12 and the optical waveguide plate 14 necessarily make approach to one another. As a result, the optical waveguide plate 14 is directed toward the actuator substrate 12 to press the picture element assembly 58. That is, the display device 50 is consequently obtained, in which the picture element assembly 58 makes the pressed contact with the optical waveguide plate 14 in the state of no load. In the step SC33 of hardening the crosspiece precursor, the actuator element 18 may be displaced while being directed toward the actuator substrate 12. The picture element assembly 58, which is formed in such a state, undergoes the pressing force from the actuator element 18. Therefore, the picture element assembly 58 reliably makes the pressed contact with the optical waveguide plate 14 in the state of no load.

The step SA31 of forming the picture element assembly precursor may be performed after the step SA33 of forming the crosspiece precursor.

The step SC32 of hardening the picture element assembly precursor may be performed before the joining step SC31. In this case, when the hardening is performed while placing the dimension-defining jig or the figuring glass on the picture element assembly precursor 58*a*, the picture element assembly 58 having its smooth upper end surface is obtained, which is preferred. It is more preferable that these components are pressed in accordance with the same pressurizing method as that used in the joining step SC31, after placing the dimension-defining jig or the figuring glass. Further, the crosspiece precursor 56*a* may be formed on the optical waveguide plate 14.

When the following procedure is adopted, the picture element assembly precursor 58*a* can be hardened after the crosspiece precursor 56*a*, even when the step SC32 of forming the picture element assembly precursor is performed prior to the step SA33 of forming the crosspiece precursor.

That is, at first, the picture element assembly precursor 58a is formed by using a resin having a hardening speed faster than that of a resin to be used as the raw material for the crosspiece precursor 56a. For example, two-part setting resins, which have mutually different component composition ratios, are prepared. The resin, which has a slower hardening speed, is used as the raw material for the crosspiece precursor 56a. The resin, which has a faster hardening speed, is used as the raw material for the picture element assembly precursor 58a.

Secondly, a resin, which is softened at a temperature lower than that of the raw material resin for the picture element assembly precursor 58a, is selected for the raw material resin for the crosspiece precursor 56a.

Thirdly, for example, a thermosetting resin is selected for the raw material resin for the crosspiece precursor 56a, and a photocurable resin is selected for the raw material resin for the picture element assembly precursor 58a. The picture element assembly precursor 58a is hardened to form the picture element assembly 58 by radiating the light, and then the crosspiece precursor 56a is hardened to form the crosspiece 56 by performing the heating. Of course, it is also preferable that two or more methods, which are selected from the methods described above, are combined to execute the procedure.

Figure 20:
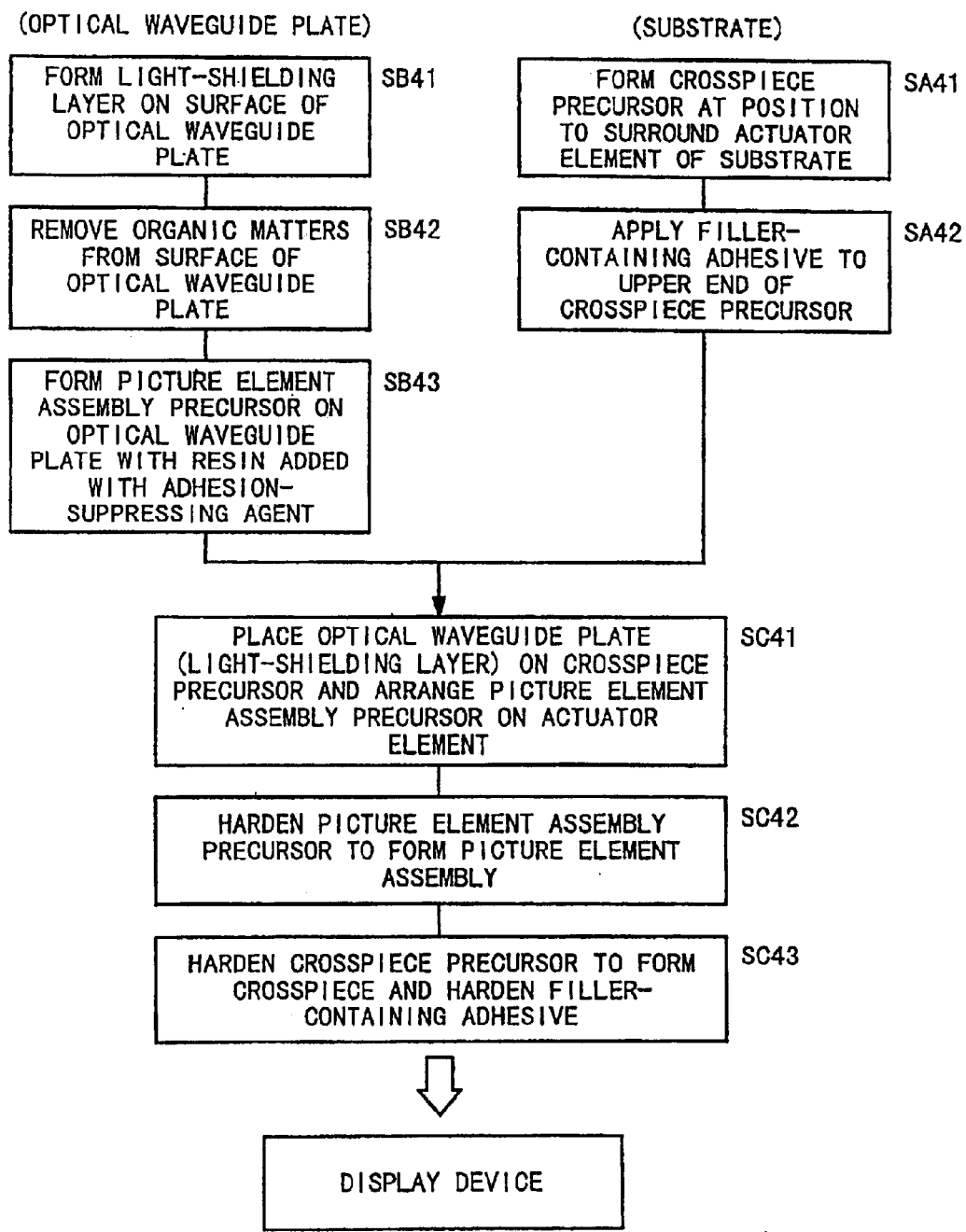
FIG. 20 shows a flow chart illustrating a fourth production method.
Figure 22:
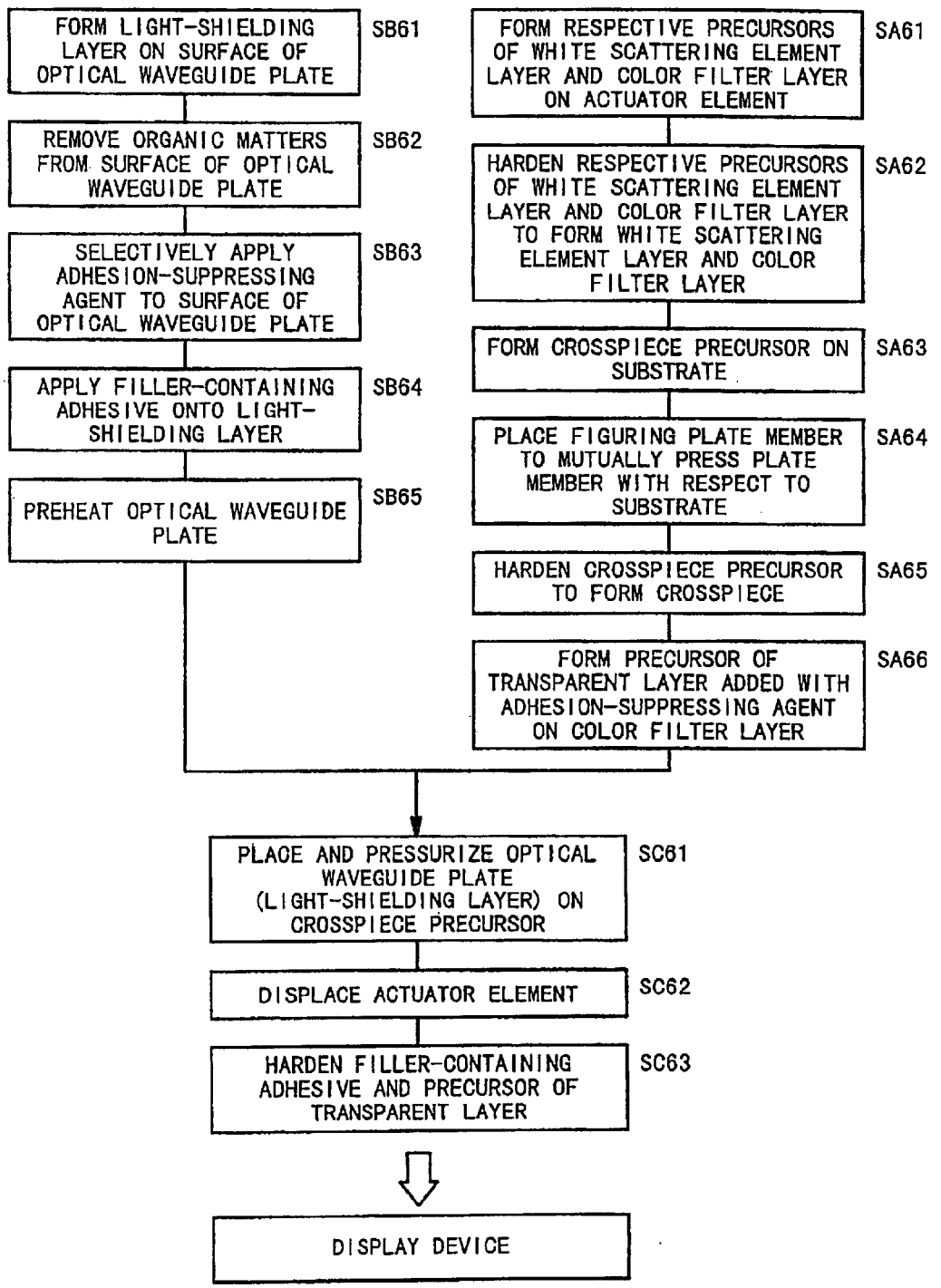
FIG. 22 shows a flow chart illustrating a sixth production method.

Next, the fourth production method will be explained with reference to a flow chart shown in FIG. 20. The steps corresponding to those of the first production method are designated by the same nomenclatures, detailed explanation of which will be omitted.

At first, the actuator element 18 is formed on the thin-walled section 12a of the actuator substrate 12 in accordance with the first production method. That is, the column electrode 28, the shape-retaining layer 26, and the row electrode 30 are formed on the thin-walled section 12a in this order (see FIG. 6).

Subsequently, the light-shielding layer 60 is formed in accordance with the step SB41. Further, the picture element assembly precursor 58a is formed in the step SB43 (see FIG. 20) on the optical waveguide plate 14 for which the unnecessary organic matters are removed from the surface in accordance with the step SB42. In this procedure, explanation will be made as exemplified by a case in which the precursor 36a of the transparent layer 36 is formed by using the resin to which the adhesion-suppressing agent 66 is previously added.

On the other hand, in the step SA41, the crosspiece precursor 56a is formed on the actuator substrate 12 so as to surround the actuator element 18. In the step SA42, the filler-containing adhesive 64 is applied to the upper end surface of the crosspiece precursor 56a.

Subsequently, in the step SC41, the optical waveguide plate 14 is placed on the upper end surfaces of the crosspiece precursors 56a so that the lower surface of the optical waveguide plate 14 abuts against the upper end surfaces of the picture element assembly precursors 58a, and the picture element assembly precursors 58a are arranged on the actuator elements 18. As a result of the placement, the substrate 12 and the optical waveguide plate 14 are joined to one another by the aid of the crosspiece precursors 56a and the picture element assembly precursors 58a.

In this state, in the step SC42, the picture element assembly precursor 58a is hardened to form the picture element assembly 58. In this procedure, the adhesion-suppressing agent 66 is previously added to the picture element assembly precursor 58a as described above. Therefore, the adhering force of the picture element assembly precursor 58a with respect to the optical waveguide plate 14 is weak. Accordingly, the picture element assembly 58 is tightly joined to the side of the actuator element 18.

Subsequently, in the step SC43, the crosspiece precursor 56a is hardened to form the crosspiece 56, and the filler-containing adhesive 64 is hardened. The resin, which is the hardening component of the crosspiece precursor 56a, is contracted in accordance with the hardening. Therefore, the actuator substrate 12 and the optical waveguide plate 14 make approach to one another. The optical waveguide plate 14 is directed toward the actuator substrate 12 to press the picture element assembly 58. That is, the display device 50 is consequently obtained, in which the picture element assembly 58 makes the pressed contact with the optical waveguide plate 14 in the state of no load. The crosspiece precursor 56a may be formed on the optical waveguide plate 14.

In the third and fourth production methods, when the picture element assembly precursor 58a is hardened, the actuator element 18 may be displaced to allow the upper end surface of the picture element assembly precursor 58a to abut against the optical waveguide plate 14. In this procedure, the upper end surface of the picture element assembly 58 abuts against the optical waveguide plate 14 more reliably when the display device 50 emits light, which is preferred.

In the third and fourth production methods, the amount of shrinkage, which is brought about when the crosspiece precursor 56a is hardened, can be within a desired range by adjusting the amount of the filler 56 in the resin to be used as the crosspiece precursor 56a.

Next, explanation will be made for the fifth production method to obtain the display device 70 (see FIG. 4) having the crosspiece 68 made of ceramics.

The fifth production method includes the step which is carried out for forming the crosspiece 68 to surround the actuator element 18 of the substrate 12 on the actuator substrate 12. As described above, the crosspiece 68 is the pillar-shaped member or the pillar-shaped portion composed of ceramics. Therefore, the fifth production method does not require the step of hardening the crosspiece precursor. Except for the above, the fifth production method is carried out in accordance with the first production method.

The fifth production method will be explained below on the basis of a flow chart shown in FIG. 21 as specifically exemplified by a case in which the crosspiece 68 is formed with the pillar-shaped member, and the picture element assembly precursor 58a is formed on the actuator element 18 of the substrate 12. The steps corresponding to those of the first production method are designated by the same nomenclatures, detailed explanation of which will be omitted.

At first, in the step SA51, a plurality of segment plates are placed at positions at which the through-holes 12b are not closed on the flat plate formed with the through-holes 12b penetrating from the first surface to the second surface, the thin-walled flat plate is placed on the segment plates, and the pillar-shaped members are placed on the thin-walled flat plate to obtain the preparation which is sintered and integrated into one unit to produce the actuator substrate 12. The gap between the segment plates is formed into the hollow space 24. The portion on the hollow space 24 is formed into the thin-walled section 12a. The pillar-shaped members, which are placed so as to surround the thin plate section 12a, are formed into the crosspieces 68.

Those preferably adopted as the constitutive material for the crosspiece 68 include those having all of the high heat resistance, the high strength, and the high toughness, such as fully stabilized zirconium oxide, partially stabilized zirconium oxide, aluminum oxide, magnesium oxide, titanium oxide, spinel, and mullite, in the same manner as for the flat plate formed with the through-hole 12b, the segment plate, and the thin-walled flat plate. The constitutive material for the crosspiece 68 may be the same as, or different from those for the flat plate, the segment plate, and the thin-walled flat plate. After the crosspiece 68 is formed as described above, the actuator element 18 is formed on the thin-walled section 12a of the substrate 12 in accordance with the first production method. That is, the column electrode 28, the shape-retaining layer 26, and the row electrode 30 are formed on the thin-walled section 12a in this order.

Subsequently, in the step SA52, the picture element assembly precursor 58a is formed in accordance with the first production method.

Subsequently, in the step SA53, the adhesion-suppressing agent 66 is applied or added to the picture element assembly precursor 58a. Alternatively, the precursor 36a of the transparent layer 36 may be formed by using the resin which is previously added with the adhesion-suppressing agent 66.

Subsequently, in the step SA54, the filler-containing adhesive 64 is applied to the upper end surface of the crosspiece 68.

Subsequently, in the step SC51, the crosspiece 68 and the optical waveguide plate 14 on which the light-shielding layer 60 has been formed and from which the unnecessary organic matters have been removed are joined to one another by the aid of the filler-containing adhesive 64. That is, the optical waveguide plate 14 is placed on the crosspieces 68 and the picture element assembly precursors 58a so that the respective light-shielding layers 60 are superimposed on the respective crosspieces 68. As a result of the placement, the picture element assembly precursor 58a and the light-shielding layer 60 and the crosspiece 68 applied with the filler-containing adhesive 64 are allowed to intervene between the actuator substrate 12 and the optical waveguide plate 14.

In this state, the display device 70 is pressed from both of the upper surface of the optical waveguide plate 14 and the lower surface of the actuator substrate 12, for example, in accordance with the vacuum packaging method described above so that the filler-containing adhesive 64 is bonded to the optical waveguide plate 14. After that, the display device 70 is taken out of the vacuum packaging bag 80. The hardening component of the filler-containing adhesive 64 is hardened, for example, by means of the heat treatment to tightly join the crosspiece 68 to the optical waveguide plate 14. Also in this procedure, it is preferable that the filler-containing adhesive 64 is hardened up to the state in which the filler-containing adhesive 64 is not further contracted.

Finally, in the step SC52, the picture element assembly precursor 58a on the actuator element 18 is hardened by means of the heat treatment to form the picture element assembly 58. Thus, the display device 70 is consequently obtained. When the step SC52 of hardening the picture element assembly precursor is carried out, it is preferable that the picture element assembly precursor 58a is hardened in a state in which the actuator element 18 is displaced toward the substrate 12, and the picture element assembly precursor 58a is allowed to make the pressed contact with the optical waveguide plate 14, in the same manner as in the first production method.

Next, explanation will be made for the sixth production method to obtain the display device 50 (see FIG. 1) in which the height of the crosspiece 68 is formed uniformly in a necessary and sufficient state.

The sixth production method comprises the step of forming a part of the precursor of the picture element assembly 58 on the actuator element 18 of the actuator substrate 12 having the actuator element 18, and then forming a part of the picture element assembly 58 by means of hardening, the step of forming the crosspiece precursor 56a to surround the actuator element 18 on the actuator substrate 12, the step of defining the upper surface of the crosspiece precursor 56a, and then hardening the crosspiece precursor 56a to form the crosspiece 56, the step of forming another part of the precursor of the picture element assembly 58 on the part of the picture element assembly 58 on the actuator substrate 12, the step of joining the optical waveguide plate 14 and the actuator substrate 12 to one another by the aid of the crosspiece 56 and the picture element assembly precursor 58a, and the step of hardening the picture element assembly precursor 58a on the actuator element 18 to form the picture element assembly 58.

Especially, in the sixth production method, the crosspiece precursor 56a is hardened in a state in which the part of the picture element assembly 58 is allowed to abut against a figuring plate member in the step of forming the crosspiece.

A specified embodiment of the sixth production method will be explained below with reference to FIGS. 22 to 32. The steps corresponding to those of the first production method are designated by the same nomenclatures, detailed explanation of which will be omitted.

At first, the actuator element 18 is formed on the thin-walled section 12a of the actuator substrate 12 in accordance with the first production method. That is, the column electrode 28, the shape-retaining layer 26, and the row electrode 30 are formed on the thin-walled section 12a in this order (see FIG. 6).

Figure 23:
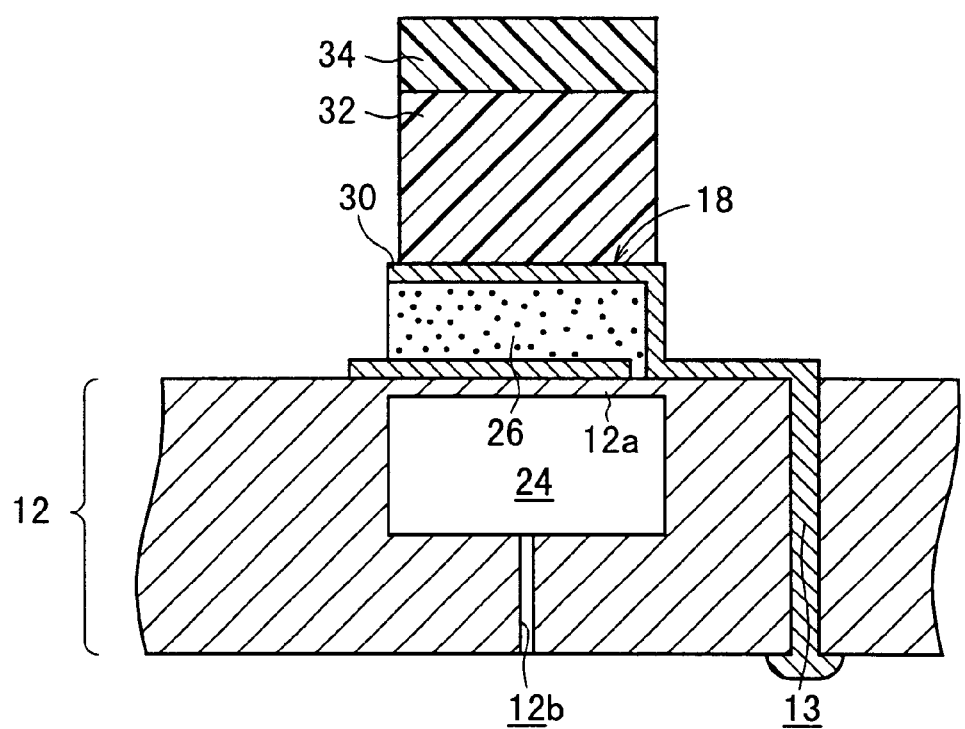
FIG. 23 illustrates a state in which a white scattering element layer and a color filter layer are formed on an actuator element.

Subsequently, in the step SA61 (see FIG. 22), the respective precursors 32a, 34a of the white scattering element layer 32 and the color filter layer 34, which are included in the respective precursors 32a, 34a, 36a of the white scattering element layer 32, the color filter layer 34, and the transparent layer 36 for constructing the picture element assembly 58, are formed on the actuator element 18 of the substrate 12. After that, in the step SA62 (see FIG. 22), as shown in FIG. 23, the respective precursors 32a, 34a of the white scattering element layer 32 and the color filter layer 34 are hardened by means of the heat treatment to form the white scattering element layer 32 and the color filter layer 34.

Figure 24:
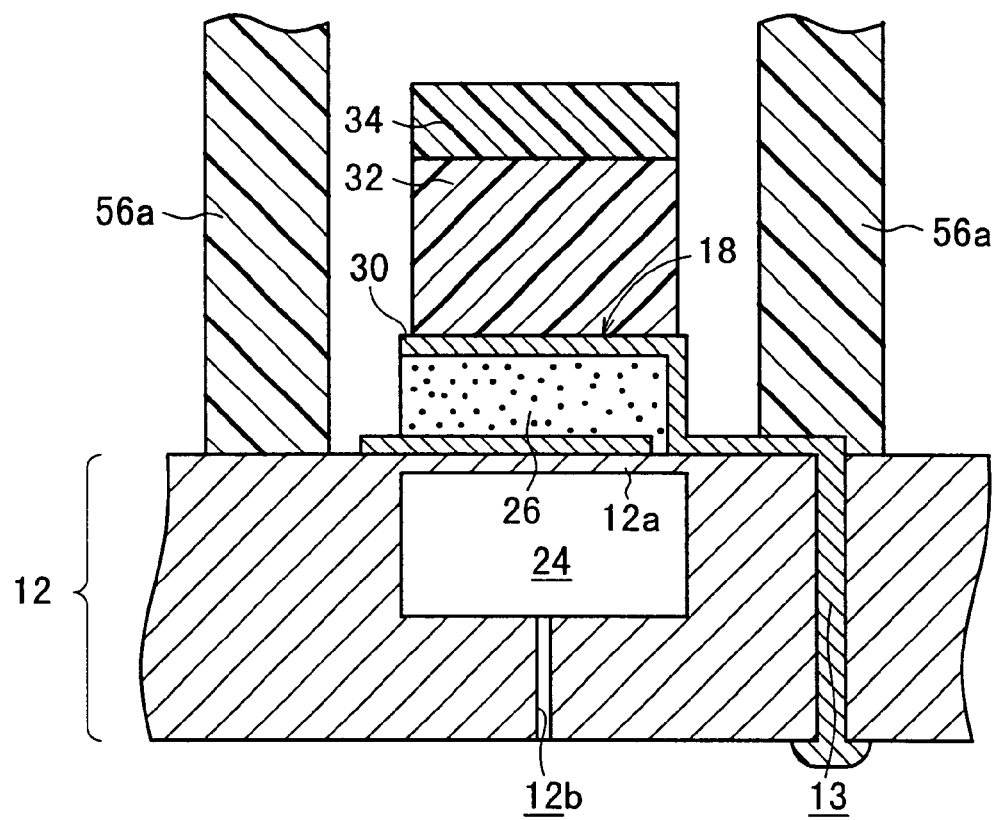
FIG. 24 illustrates a state in which a crosspiece precursor is formed on an actuator substrate.

Subsequently, in the step SA63 (see FIG. 22), as shown in FIG. 24, the crosspiece precursor 56a is formed on the actuator substrate 12.

Figure 25:
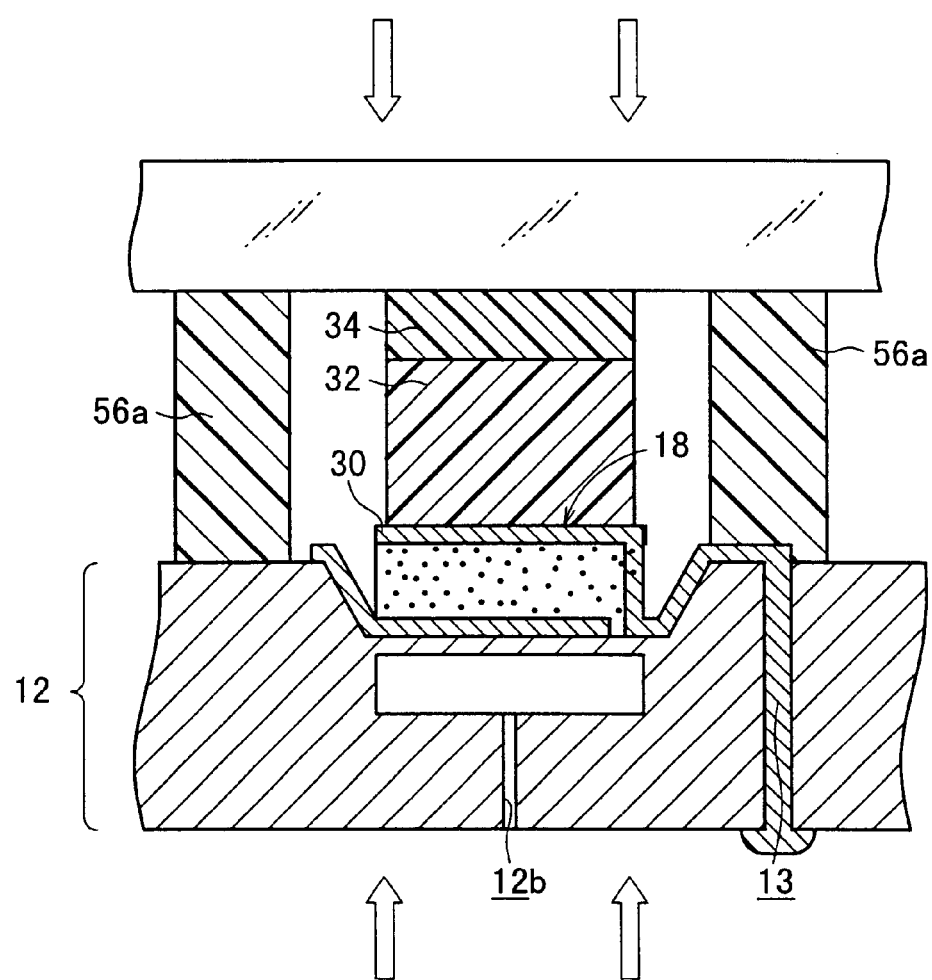
FIG. 25 illustrates a state in which the height of the crosspiece precursor is defined with a figuring plate member.

After that, in the step SA64 (see FIG. 22), as shown in FIG. 25, a figuring plate member 210 is placed on the upper surface of the crosspiece precursor 56a, and the plate member 210 is pressurized toward the actuator substrate 12. Those adaptable as the pressurizing method include a variety of techniques as described above. However, the vacuum packaging method is preferably adapted. At the stage of the pressurization, it is also preferable that the voltage is applied between the column electrode 28 and the row electrode 30 to displace the actuator element 18 toward the substrate 12.

Owing to the figuring step, the portion ranging to the color filter layer 34 serves as a spacer to define the height of the crosspiece precursor 56a.

Subsequently, in the step SA65 (see FIG. 22), the crosspiece precursor 56a is hardened to form the crosspiece 56 by means of the heat treatment.

Figure 26:
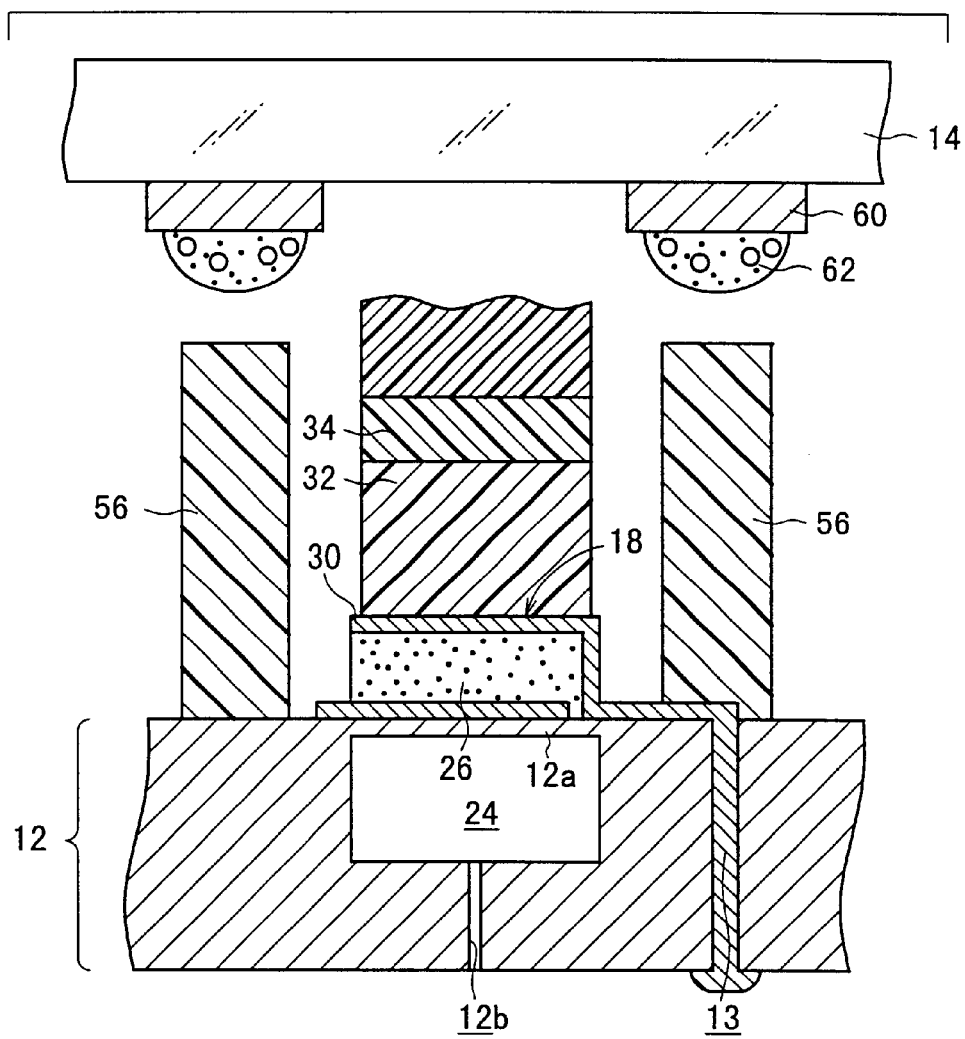
FIG. 26 illustrates a state in which a transparent layer precursor (added with an adhesion-suppressing agent) is formed on the color filter layer, and a light-shielding layer and a filler-containing adhesive are formed on a surface of an optical waveguide plate.

Subsequently, in the step SA66 (see FIG. 22), as shown in FIG. 26, the precursor 36a of the transparent layer 36, to which the adhesion-suppressing agent 66 is previously added, is formed on the color filter layer 34.

Figure 28:
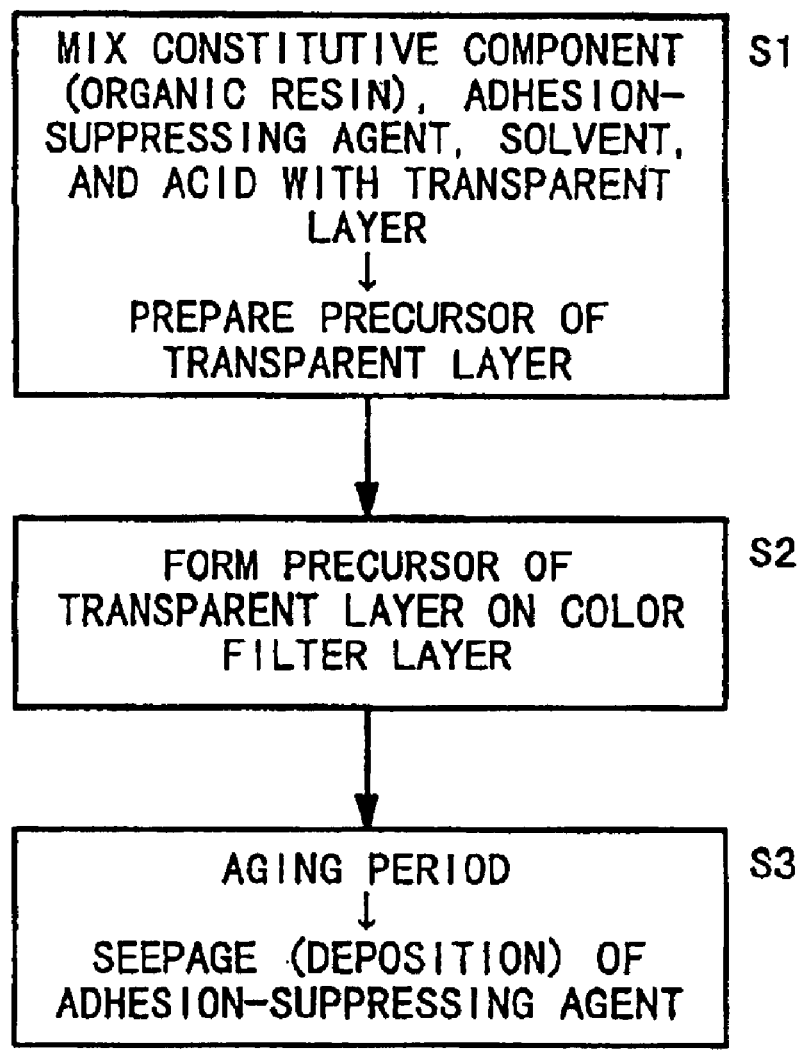
FIG. 28 shows a process chart illustrating a technique for adding the adhesion-suppressing agent to the transparent layer precursor.

Explanation will now be made with reference to FIG. 28 for the technique for adding the adhesion-suppressing agent 66 to the precursor 36a of the transparent layer 36.

At first, in the step S1, a paste of the precursor 36a of the transparent layer 36 is prepared, which comprises, for example, an organic resin such as epoxy resin as the constitutive material for the transparent layer 36, the adhesion-suppressing agent 66, and other additives.

One, which is not easily mixed, in a single substance, with the organic resin as the constitutive material for the transparent layer 36, is selected as the adhesion-suppressing agent 66. The paste is prepared, in which the adhesion-suppressing agent 66 is uniformly dispersed or dissolved in the precursor 36a of the transparent layer 36, by performing agitation and mixing with a grinding mixer or the like, or by adding such a material as another additive that the adhesion-suppressing agent 66 and the organic resin are mixed with each other by adding, for example, solvent and/or acid, owing to the presence of the solvent and/or the acid.

For example, when epoxy resin is used as the organic resin as the constitutive material for the transparent layer 36, then those preferably used as the adhesion-suppressing agent 66 include, for example, silicone oil and silicone grease, those used as the solvent include, for example, xylene, toluene, and ethanol as well as those based on alcohol, ester, hydrocarbon, and polyvalent alcohol, and those preferably used as the acid include, for example, sulfuric acid, dimethyl sulfate, and diethyl sulfate.

Subsequently, in the step S2, the precursor 36a of the transparent layer 36 is formed on the color filter layer 34, for example, by means of the screen printing method (see FIG. 26).

After that, in the step S3 (aging period until the step SC63 of hardening the picture element assembly precursor as described later on), the preparation is left to stand, or the solvent or the like is evaporated when the solvent or the like is added for the purpose of mixing the adhesion-suppressing agent 66 and the organic resin. As a result, the adhesion-suppressing agent 66 is allowed to seep (deposit) on the surface of the precursor 36a of the transparent layer 36, owing to the mutual incompatibility between the adhesion-suppressing agent 66 and the organic resin as the constitutive material for the transparent layer 36. The vibration is preferably applied during the aging, as a means for effectively causing the seepage. That is, it is effective to vibrate the picture element assembly precursor 58a by applying the voltage to the actuator element 18 to vibrate the actuator element 18 itself. Further, it is also effective to apply the vibration in the step after superimposing the optical waveguide plate 14. It is also effective to vibrate the actuator substrate 12 by using a vibrator or the like.

Accordingly, in the step SC63 described later on, the adhesion is suppressed between the transparent layer 36 and the optical waveguide plate 14 when the filler-containing adhesive 64 is hardened, and it is easy to cause the separation between the optical waveguide plate 14 and the transparent layer 36 after the hardening.

On the other hand, as for the optical waveguide plate 14, in the step SB61 (see FIG. 22), as shown in FIG. 26, the light-shielding layer 60 is formed on the surface of the optical waveguide plate 14 in accordance with the film formation method as described above.

Subsequently, in the step SB62 (see FIG. 22), unnecessary organic matters are removed. When the organic matters are removed, for example, the washing treatment for the optical waveguide plate 14 and the ashing treatment for the organic matters are preferably used as described above.

After that, if necessary, in the next step SB63, the adhesion-suppressing agent 66 is selectively applied to the portions of the optical waveguide plate 14 opposed to the picture element assemblies 58. Those usable as the adhesion-suppressing agent 66 include, for example, rain X (produced by PENNZOIL-QUAKER STATE) and KS-9001 (produced by Shin-Etsu Silicone).

Subsequently, in the step SB64 (see FIG. 22), the filler-containing adhesive 64 is applied to the light-shielding layer 60 formed on the optical waveguide plate 14. After that, in the next step SB65 (see FIG. 22), the optical waveguide plate 14 is preliminarily heated to slightly harden the filler-containing adhesive 64 thereby.

Figure 27:
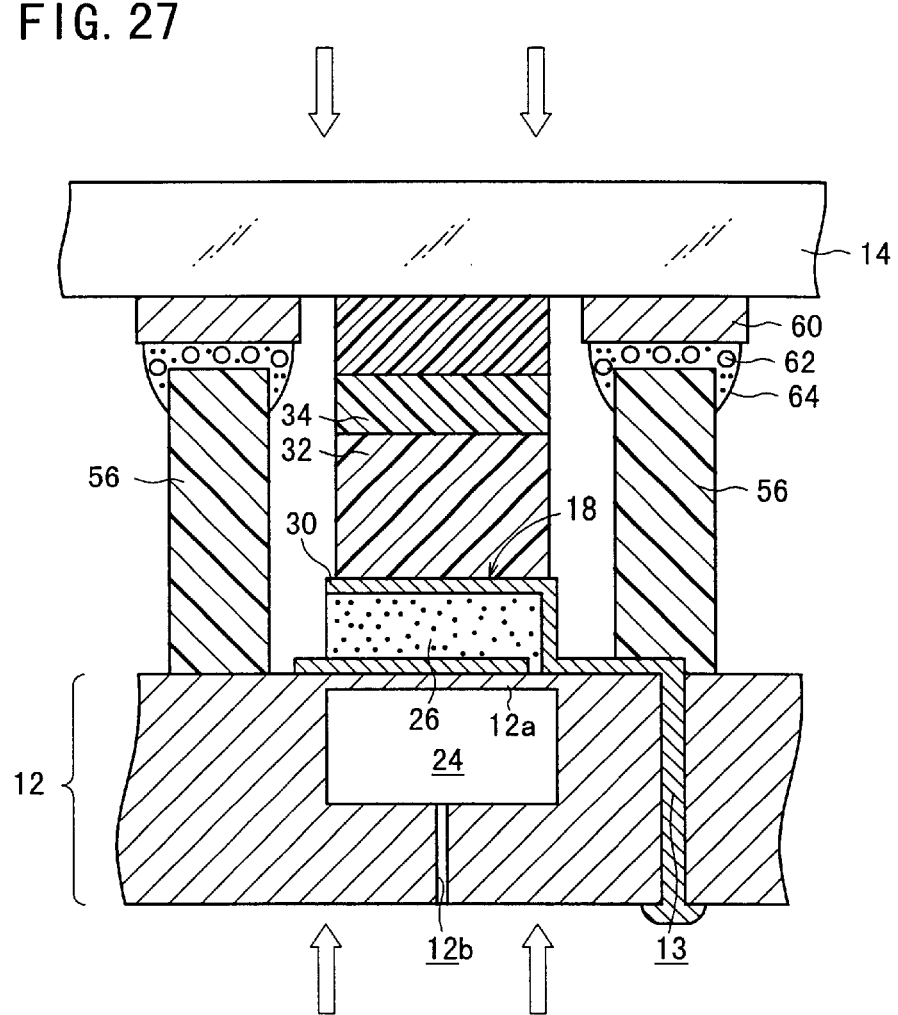
FIG. 27 illustrates a state in which the optical waveguide plate is joined onto crosspieces.

Subsequently, in the step SC61 (see FIG. 22), as shown in FIG. 27, the optical waveguide plate 14 and the crosspiece 56 are superimposed with each other so that the light-shielding layer 60 is placed on the crosspiece 56. The actuator substrate 12 and the optical waveguide plate 14 are joined to one another by the aid of the crosspiece 56 and the picture element assembly precursor 58a, for example, by means of the vacuum packaging method described above.

After that, in the step SC62 (see FIG. 22), the voltage is applied to the actuator element 18 to displace the actuator element 18 toward the actuator substrate 12.

After that, in the step SC63 (see FIG. 22), the filler-containing adhesive 64 is further hardened, and the precursor 36a of the transparent layer 36 is hardened to form the transparent layer 36. Thus, the display device 50 is constructed.

When the step SC62 is carried out, it is preferable that the precursor 36a of the transparent layer 36 is hardened in a state in which the actuator element 18 is displaced toward the actuator substrate 12, and the precursor 36a of the transparent layer 36 is allowed to abut against the optical waveguide plate 14. The step SC61 to the step SC63 may be carried out in the vacuum packaging.

Figure 29:
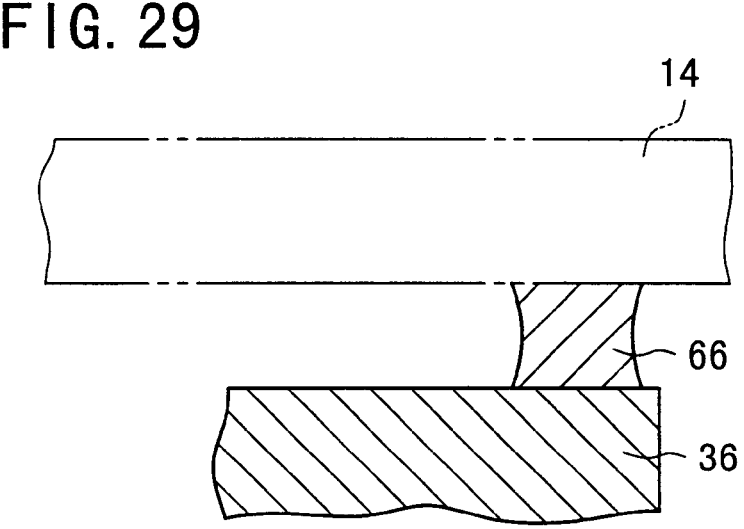
FIG. 29 illustrates a state in which the space between the transparent layer and the optical waveguide plate is bridged by the adhesion-suppressing agent.

As for the display device 50, if the amount of seepage of the adhesion-suppressing agent 66 added to the transparent layer 36 is large, it is feared that when the transparent layer 36 is separated, the adhesion-suppressing agent 66 is locally in a bridging state at a portion at which the spacing distance between the optical waveguide plate 14 and the upper end surface of the transparent layer 36 is narrow, for example, as shown in FIG. 29, and the white defect is caused on the image display.

The following countermeasure is available for this defect. That is, at least the upper end surface of the transparent layer 36 is washed with a highly volatile liquid to thereby once remove the adhesion-suppressing agent 66 which has been added in the previous step and which has seeped to the upper end surface of the transparent layer 36. After that, another type of the adhesion-suppressing agent 66, which is suitable to separate the hardened transparent layer 36, is applied in an appropriate amount to the upper end surface of the transparent layer 36. When the application is performed as described above, it is easy to control the material quality and the amount of the adhesion-suppressing agent 66. Therefore, it is possible to form, on the upper end surface of the transparent layer 36, the adhesion-suppressing agent 66 of the type and in the amount preferable to exhibit the adhesion-suppressing function. Those usable as the highly volatile liquid include, for example, siloxane and fluorinert.

A method is preferably used for the washing, in which the highly volatile liquid is injected and washed out through the gap between the optical waveguide plate 14 and the actuator substrate 12, followed by being volatilized in a vacuum environment. A method is preferably used as the method for applying the adhesion-suppressing agent 66, in which the adhesion-suppressing agent 66 is mixed or dissolved in a solvent such as a highly volatile liquid, and an obtained preparation is injected.

Other washing method to be used include a method which utilizes the centrifugal force of a spinner or the like, and a method in which air is blown to scatter the unnecessary part of the adhesion-suppressing agent 66 and the washing liquid.

Further, the following countermeasure is also available. That is, when the upper surface of the transparent layer 36 is a rough surface, the seeped adhesion-suppressing agent 66 consequently stays in recesses. Even when the seepage amount is large, the bridging phenomenon as described above does not occur. Further, the gap with respect to the optical waveguide plate 14, which is formed by irregularities on the upper end surface of the transparent layer 36, is effectively filled with the adhesion-suppressing agent 66. Therefore, when the display device 50 is in the light emission state, the upper end surface of the transparent layer 36 reliably abuts against the optical waveguide plate 14. Thus, it is easier to allow the display device 50 to emit light at a desired luminance.

The following technique is preferably adopted to allow the surface of the transparent layer 36 to be the rough surface. That is, in the step S1 shown in FIG. 28 described above, when the organic resin as the constitutive material for the transparent layer 36 is mixed with the adhesion-suppressing agent and another additive, a grease having a high viscosity is also allowed to co-exist (incorporated).

Figure 30A:
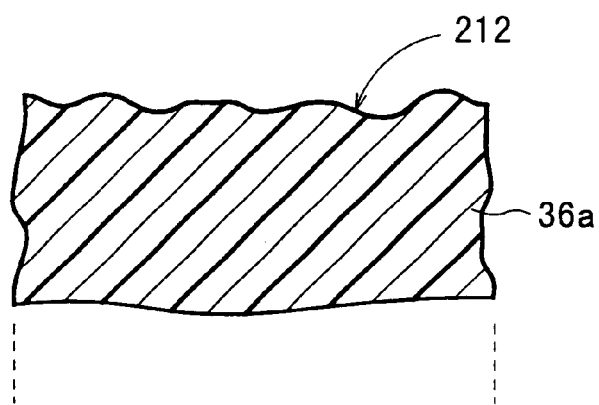
FIG. 30A shows a sectional view illustrating a state in which the upper end surface of the transparent layer is made into a rough surface.
Figure 30B:
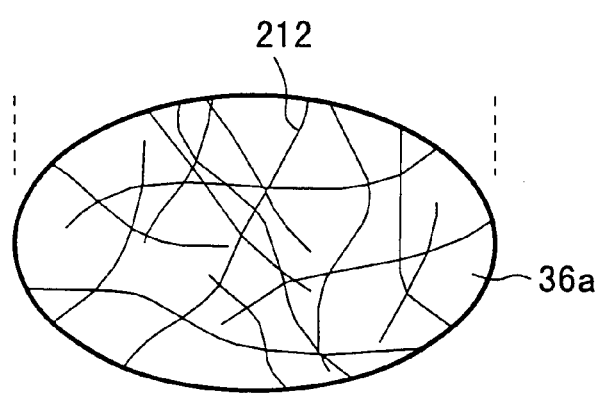
FIG. 30B shows a top view illustrating the upper end surface of the transparent layer.

Accordingly, during the aging period (step S3) thereafter, the high viscosity grease consequently float at an upper portion of the precursor 36a of the transparent layer 36. As shown in FIGS. 30A and 30B, wrinkle-shaped irregularities 212 are easily formed on the upper end surface of the precursor 36a. Owing to the foregoing countermeasures, it is possible to avoid any white defect or the like on the image display.

In the first to sixth production methods described above, the optical waveguide plate 14 and the crosspiece 56, 68 may be joined to one another without forming the light-shielding layer 60.

The substrate 12 or the optical waveguide plate 14 may be bonded to the crosspiece precursor 56a without using the filler-containing adhesive 64, and then the crosspiece precursor 56a may be hardened to thereby join the crosspiece precursor 56a and the substrate 12 or the optical waveguide plate 14 to one another.

Figure 31:
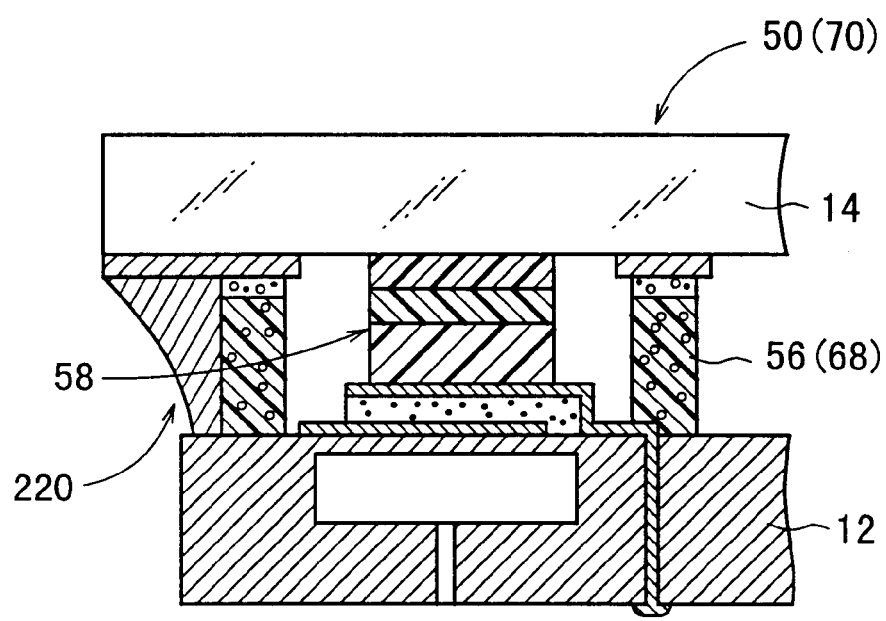
FIG. 31 shows, with partial omission, a sectional view illustrating a state in which a seal member is provided at the outer circumference of the display device.

As shown in FIG. 31, it is preferable that the outer circumference of the display device 50 (or the display device 70) is sealed with a seal member 220. Accordingly, it is possible to protect the interior of the display device 50 (or the display device 70) from the external environment. Especially, it is possible to avoid any invasion of steam, oil, and chemical agents.

The material for the seal member 220 is preferably a resin material. Of course, a filler or the like may be added thereto. The color of the seal member 220 is preferably black, because of the following reason. That is, it is possible to decrease the scattered light.

Figure 32:
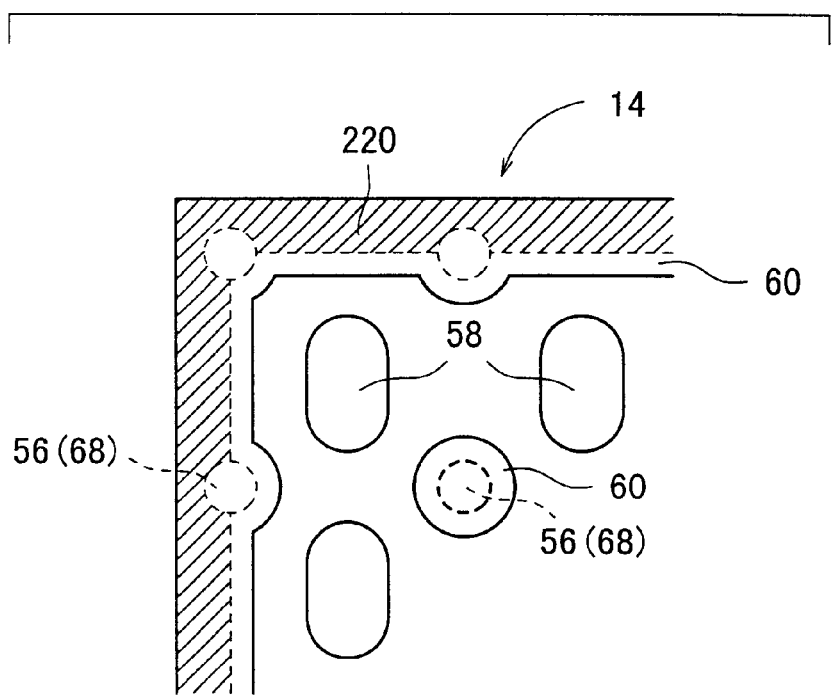
FIG. 32 shows, with partial omission, a top view illustrating a state in which a seal member is provided at the outer circumference of the display device.

As shown in FIG. 32, it is preferable that the seal member 220 is isolated from the optical waveguide plate 14 by the aid of the light-shielding layer 60, because of the following reason. That is, if the seal member 220 makes direct contact with the optical waveguide plate 14, the light is scattered.

Figure 33:
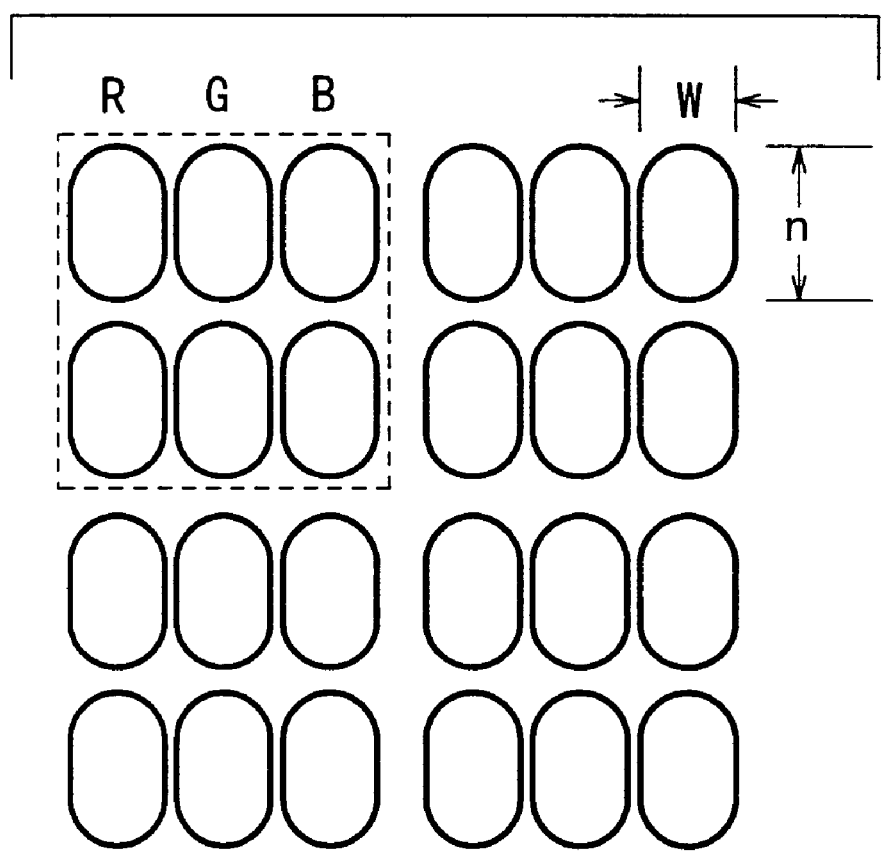
FIG. 33 shows a plan view illustrating a picture element arrangement according to a first specified embodiment.

Next, several preferred specified embodiments will be explained below concerning the arrangement of the picture elements. At first, a picture element arrangement according to the first specified embodiment is shown, for example, in FIG. 33. The planar configuration of one actuator element 18 (or the picture element assembly 58) is an elliptic configuration with its major axis directed in the vertical direction. In this embodiment, one picture element (pixel) 90 is constructed by six actuator elements 18 (or picture element assemblies 58) in total comprising three actuator elements 18 (or picture element assemblies 58) which are aligned in the horizontal direction and two actuator elements 18 (or picture element assemblies 58) which are aligned in the vertical direction. FIG. 33 is illustrative of a case in which the color filter layers 34 are arranged in an order of red (R), green (G), and blue (B) from the left to the right.

Figure 34:
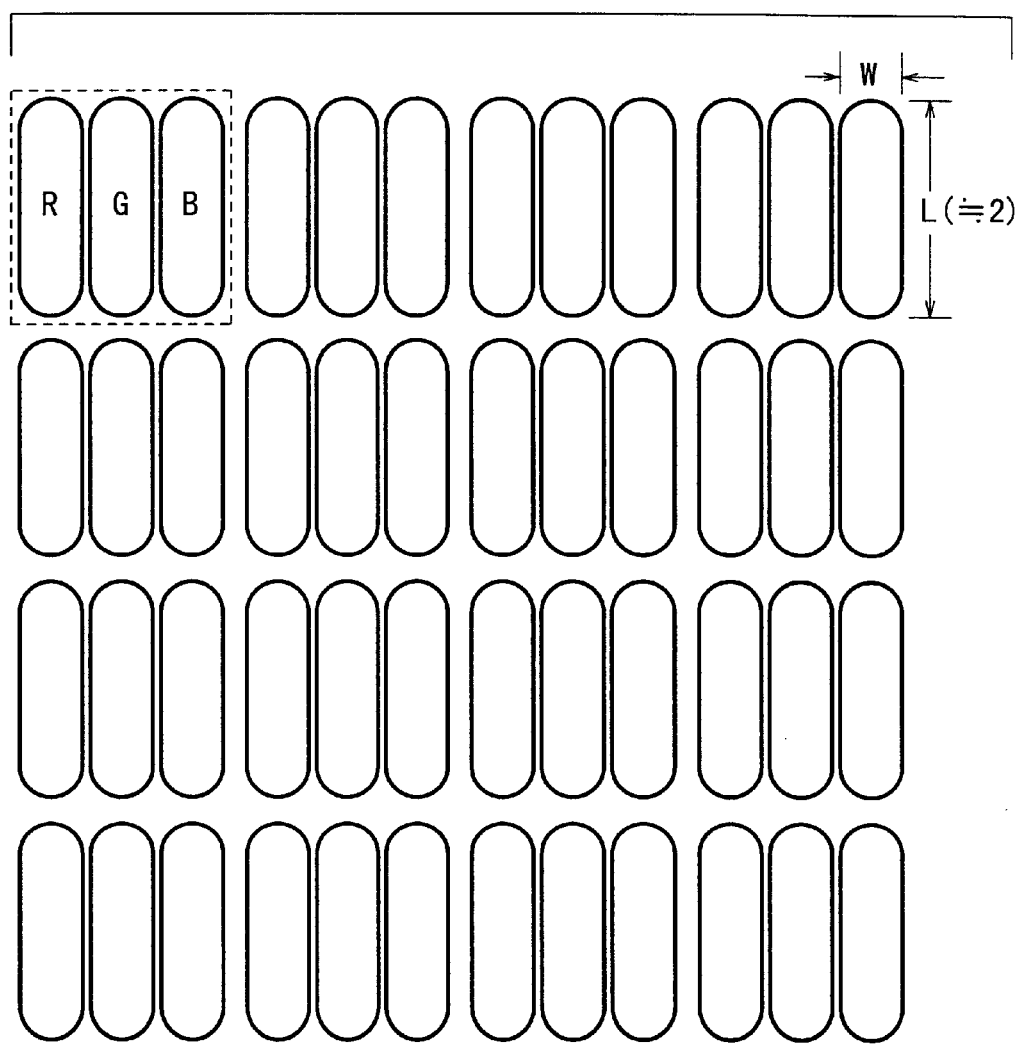
FIG. 34 shows a plan view illustrating a picture element arrangement according to a second specified embodiment.

As shown in FIG. 34, the picture element arrangement according to the second specified embodiment resides in an example in which one picture element (pixel) 90 is constructed by three actuator elements 18 (or picture element assemblies 58) which are aligned in the horizontal direction. The planar configuration of one actuator element 18 (or picture element assembly 58) is different from that of the picture element arrangement according to the first specified embodiment. The planar configuration of one actuator element 18 (or picture element assembly 58) is an elliptic configuration with its major axis directed in the vertical direction. Especially, the length L of the major axis is about twice the length n of the major axis of one actuator element 18 (or picture element assembly 58) of the picture element arrangement according to the first specified embodiment. This embodiment is advantageous in that the numerical aperture can be further increased, and the efficiency of use of light can be enhanced. FIG. 34 is illustrative of a case in which the color filter layers 34 are arranged in an order of red (R), green (G), and blue (B) from the left to the right.

Figure 35:
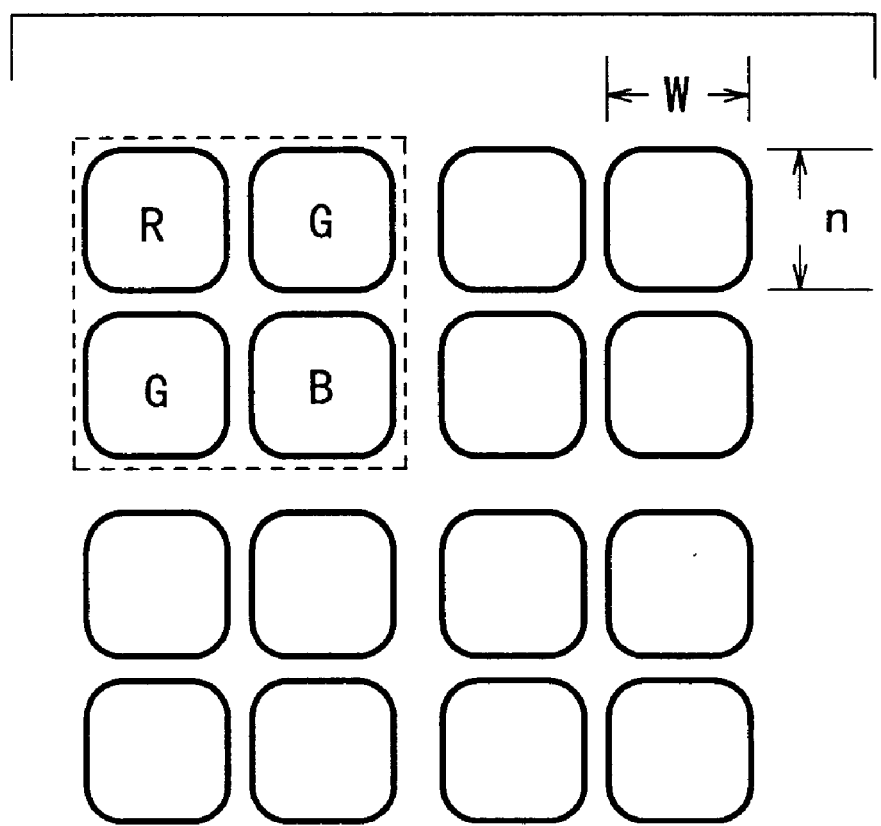
FIG. 35 shows a plan view illustrating a picture element arrangement according to a third specified embodiment.

As shown in FIG. 35, the picture element arrangement according to the third specified embodiment resides in an example in which one picture element (pixel) 90 comprises four actuator elements 18 (or picture element assemblies 58) in total including two actuator elements 18 (or picture element assemblies 58) which are aligned in the horizontal direction, and two actuator elements 18 (or picture element assemblies 58) which are aligned in the vertical direction.

In this embodiment, the planar configuration of one actuator element 18 (or picture element assembly 58) is substantially a rectangular configuration with chamfered four corners.

In consideration of the relationship between the displacement amount and the planar configuration of one actuator element 18, the larger the length (width W) in the horizontal direction is, the larger the displacement amount is, provided that the length n in the vertical direction is constant. The third specified embodiment is illustrative of a case in which the length W in the horizontal direction is maximized to be approximately the same as the length n in the vertical direction, in order to maximize the displacement amount of the actuator element 18. FIG. 35 is illustrative of a case in which the color filter layers 34 are arranged such that two ones are arranged in a checkered arrangement for green (G), and the remaining ones are arranged for red (R) and blue (B).

Figure 36:
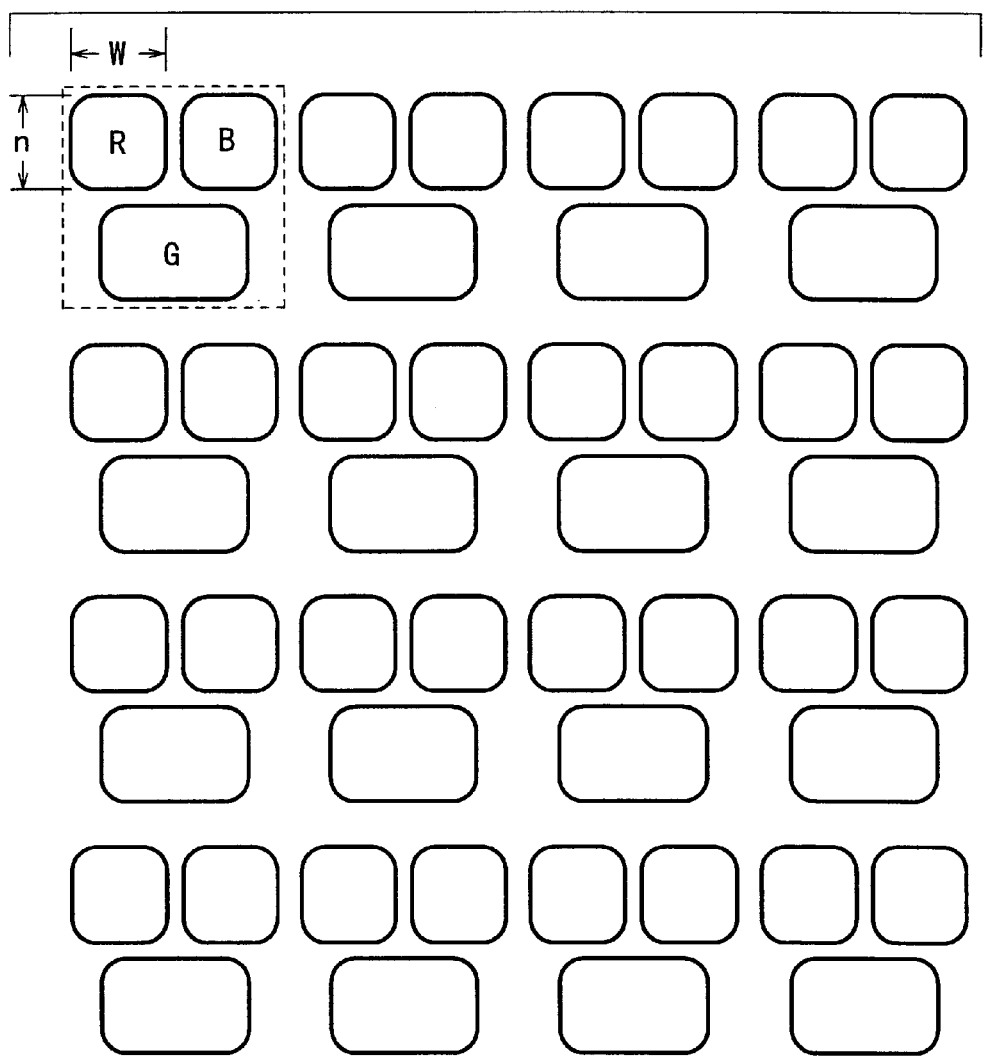
FIG. 36 shows a plan view illustrating a picture element arrangement according to a fourth specified embodiment.

As shown in FIG. 36, the picture element arrangement according to the fourth specified embodiment resides in an example in which one picture element (pixel) 90 is constructed by three actuator elements 18 (or picture element assemblies 58) to give an arrangement form such that lines, which connect respective central positions of the three actuator elements 18 (or picture element assemblies 58) for constructing one picture element 90, form an inverse triangular configuration.

Especially, in this embodiment, the planar configuration of each of the two actuator elements 18 (or picture element assemblies 58) of the three actuator elements 18 (or picture element assemblies 58) for constructing one picture element 90 has a rectangular configuration (square configuration) in which the length n in the vertical direction is approximately the same as the length W in the horizontal direction. The planar configuration of the remaining one actuator element 18 (or picture element assembly 58) is a rectangular configuration (oblong configuration) in which the length m in the horizontal direction is approximately twice the length n in the vertical direction.

According to the picture element arrangement concerning the fourth specified embodiment, the numerical aperture can be made large, and the efficiency of use of light can be improved, as compared with the picture element arrangement concerning the third specified embodiment. FIG. 36 is illustrative of a case in which the color filter layers 34 are arranged such that one having the oblong configuration is arranged for green (G), and the remaining ones are arranged for red (R) and blue (B).

In the picture element arrangements according to the first to fourth specified embodiments, the wiring space may be provided, if necessary. The color arrangement for the color filter layers 34 may be determined in consideration of characteristics.

Figure 37:
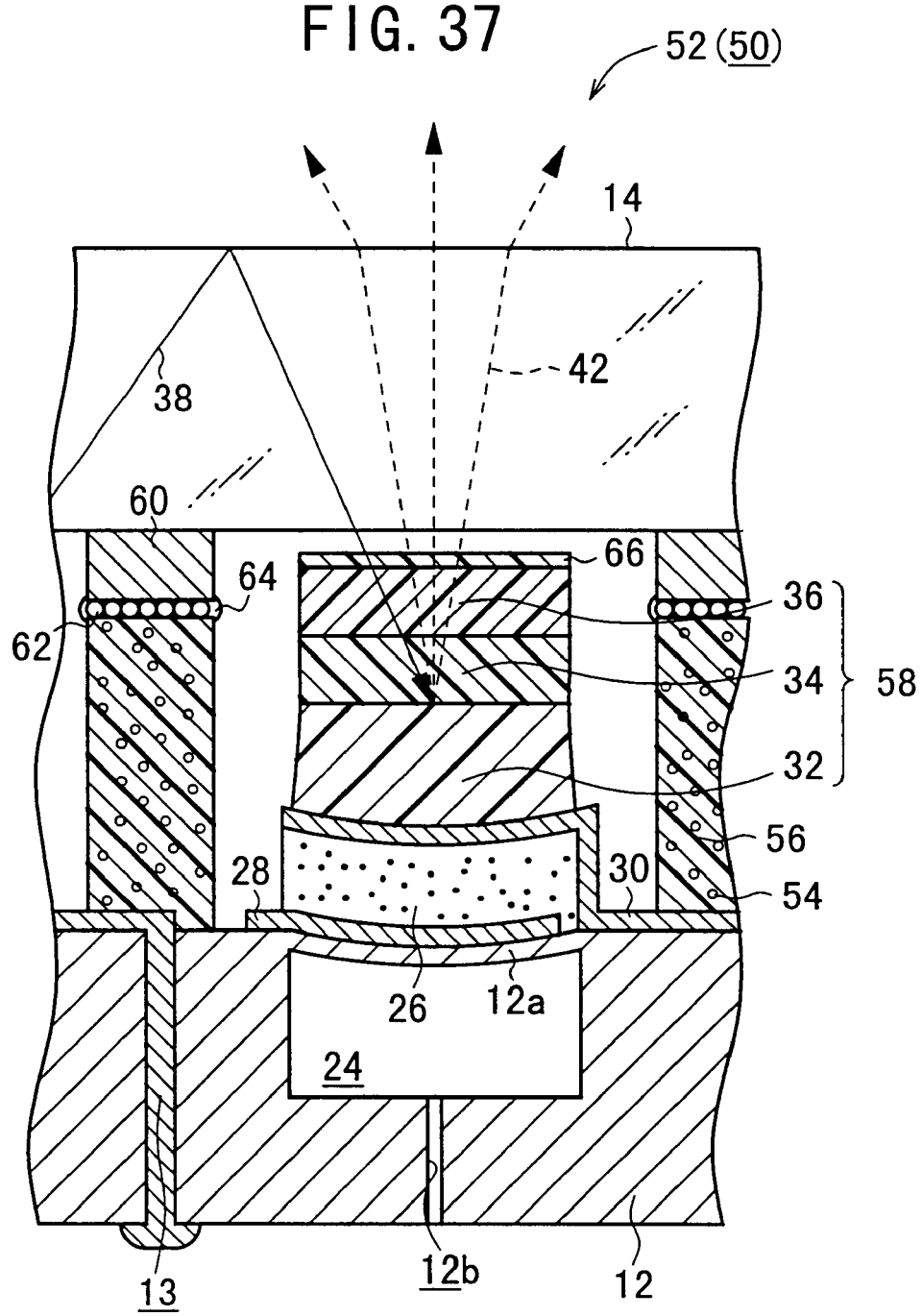
FIG. 37 illustrates a form in which a minute gap is formed between a picture element assembly and an optical waveguide plate.
Figure 38:
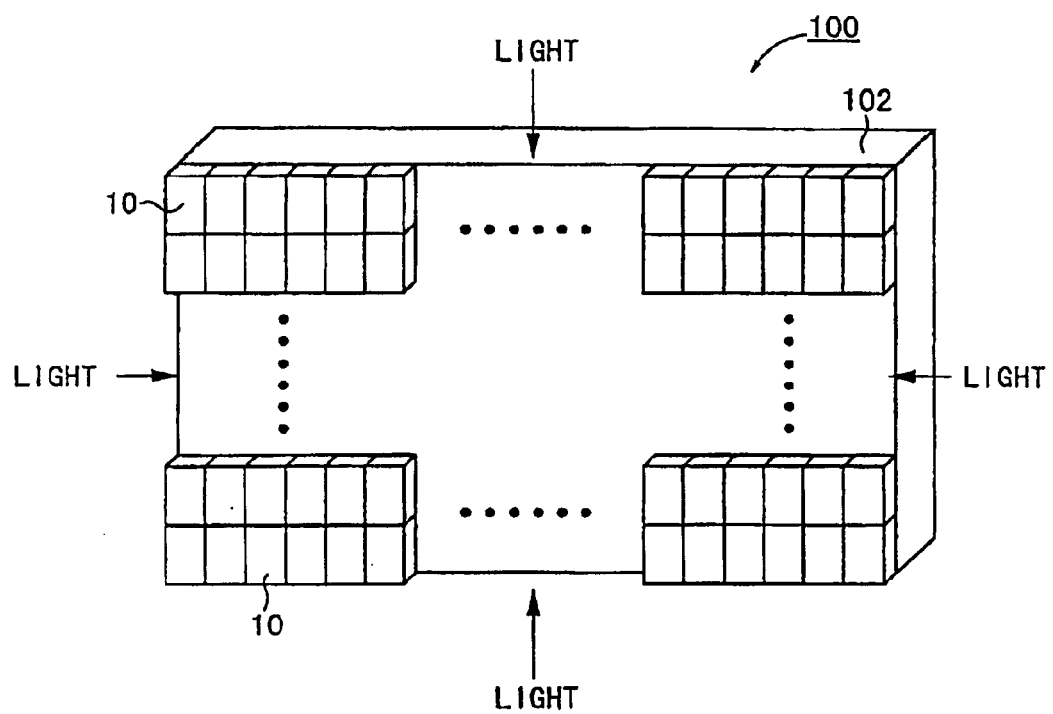
FIG. 38 shows a schematic view illustrating an entire large screen display comprising a plurality of display devices arranged on an optical waveguide plate.
Figure 39:
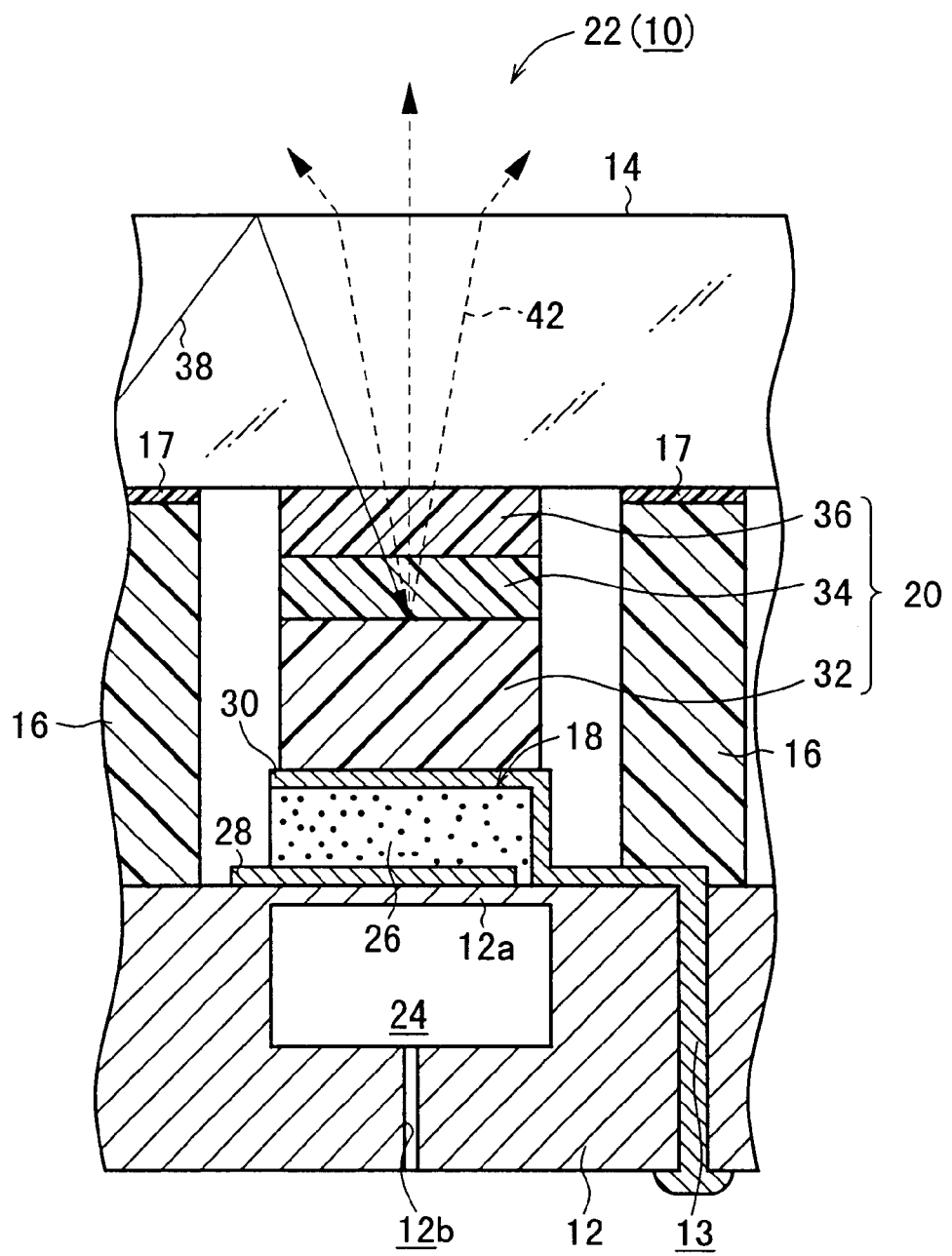
FIG. 39 shows a schematic sectional view illustrating a display device concerning the related technique.
Figure 40:
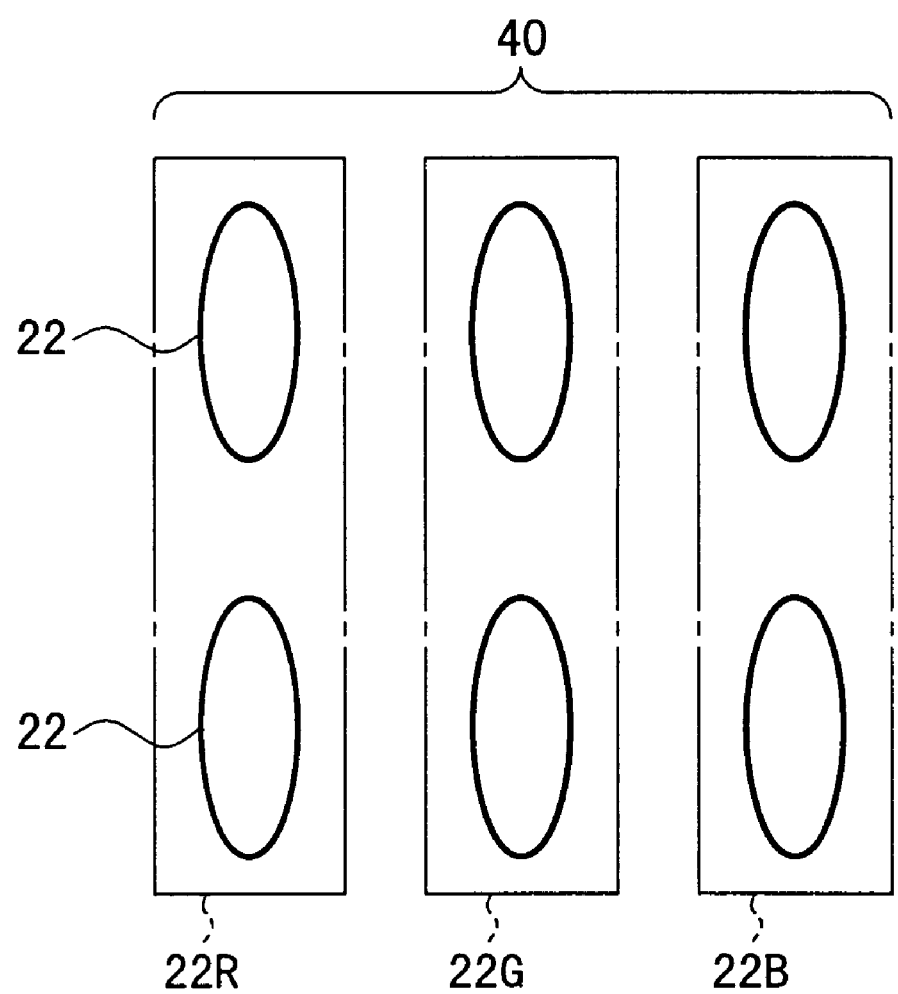
FIG. 40 shows a schematic arrangement of picture elements composed of red dots, green dots, and blue dots.
Figure 41:
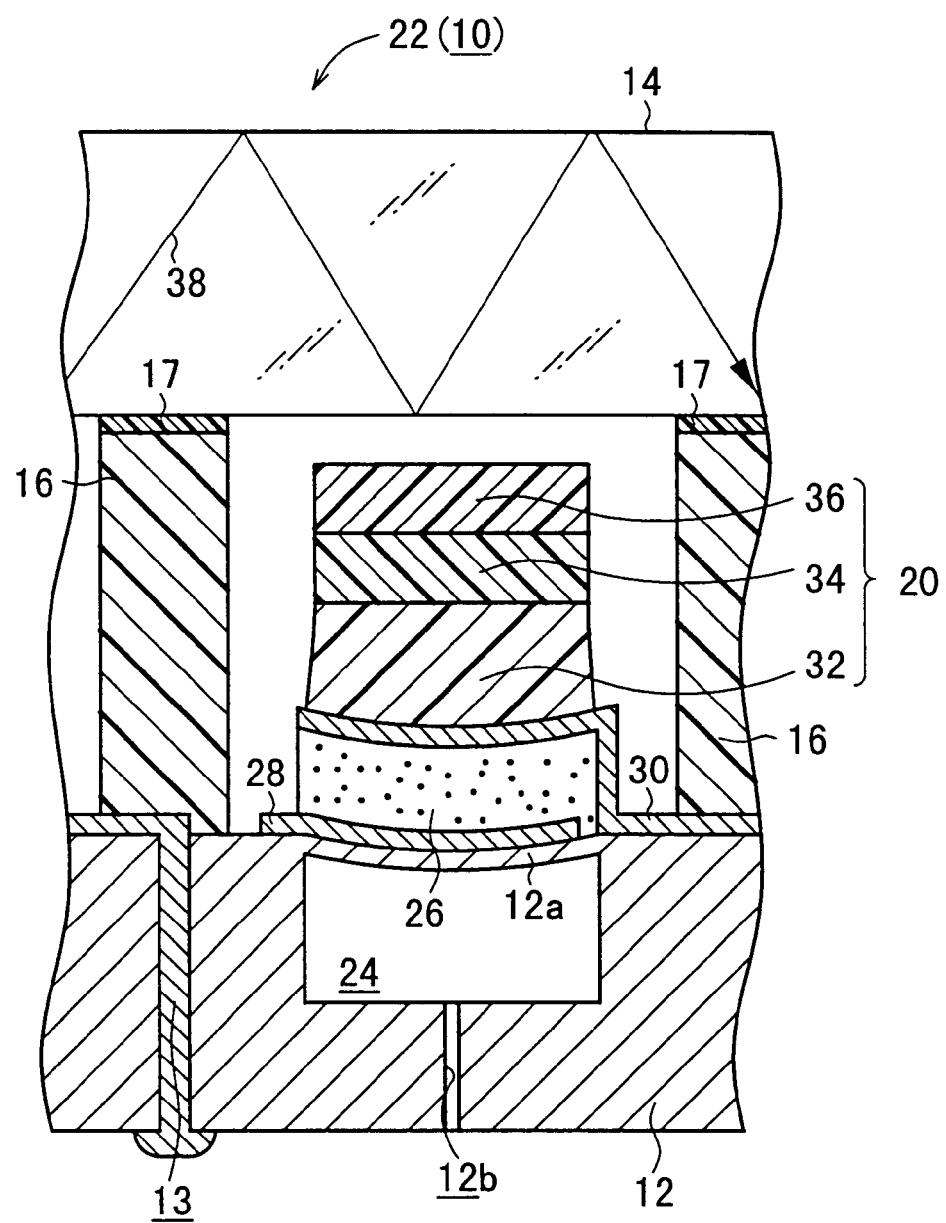
FIG. 41 shows a schematic sectional view illustrating a state in which an actuator element is displaced toward a substrate by applying a voltage between a column electrode and a row electrode of the display device shown in FIG. 39, and a picture element assembly is separated from the optical waveguide plate.

The embodiments described above are illustrative of the case in which the picture element assembly 58 presses the optical waveguide plate 14 in the state of no load, and the adhesion-suppressing agent 66 (including the case of seepage) is allowed to intervene on the surface of the picture element assembly 58 opposed to the optical waveguide plate 14. Alternatively, another form is available, in which the transparent layer 36 disposed under the adhesion-suppressing agent 66 does not make pressed contact with the optical waveguide plate 14, and the adhesion-suppressing agent 66 contacts with the optical waveguide plate 14. Further alternatively, as shown in FIG. 37, still another form is available, in which a minute gap 92 is formed between the optical waveguide plate 14 and the adhesion-suppressing agent 66 (including the case of seepage) existing at the uppermost layer of the picture element assembly 58.

It is a matter of course that the display device and the method for producing the same according to the present invention is not limited to the embodiments described above, which may be embodied in other various forms without deviating from the gist or essential characteristics of the present invention.

What is claimed is:

1. A display device comprising a substrate having an actuator element, an optical waveguide plate, a crosspiece intervening between said optical waveguide plate and said substrate and surrounding said actuator element, and a picture element assembly joined onto said actuator element, wherein said picture element assembly has an adhesion-suppressing agent on at least a portion opposed to said optical waveguide plate, and said adhesion-suppressing agent has a refractive index of 1.30 to 1.70.

2. The display device according to claim 1, wherein said adhesion-suppressing agent is applied onto at least said portion of said picture element opposed to said optical waveguide plate.

3. The display device according to claim 1, wherein said adhesion-suppressing agent is added to a constitutive material of said picture assembly.

4. The display device according to claim 3, wherein said adhesion-suppressing agent is added in an amount of 0.01 to 50% by weight.

5. The display device according to claim 3, wherein said adhesion-suppressing agent seeps out onto at least said portion of said picture element assembly opposed to said optical waveguide plate.

6. The display device according to claim 1, wherein said adhesion-suppressing agent is a silicone-based substance.

7. The display device according to claim 6, wherein said silicone-based substance is any one of a silicone oil and a silicone grease or a mixture principally containing at least any one thereof.

8. The display device according to claim 1, wherein said adhesion-suppressing agent is applied to at least a portion of said optical waveguide plate opposed to said picture element assembly.

9. A method for producing a display device comprising a substrate having an actuator element, an optical waveguide plate, a crosspiece intervening between said optical waveguide plate and said substrate and surrounding said actuator element, and a picture element assembly joined onto said actuator element, said method comprising:

a step of preparing a precursor by adding an adhesion-suppressing agent and other additives to a constitutive material for said picture element assembly;

a step of patterning said precursor; and a step of allowing said adhesion-suppressing agent to seep out onto at least a portion of said picture element assembly opposed to said optical waveguide plate by aging said precursor.

10. A method for producing said display device according to claim 9, wherein said step of allowing said adhesion-suppressing agent to seep out is performed by applying vibration.

11. A method for producing a display device comprising a substrate having an actuator element, an optical waveguide plate, a crosspiece intervening between said optical waveguide plate and said substrate and surrounding said actuator element, and a picture element assembly joined onto said actuator element, said method comprising:

a step of washing an adhesion-suppressing agent seeped out from said picture element assembly and/or a step of applying said adhesion-suppressing agent onto at least a portion of said picture element assembly opposed to said optical waveguide plate.

12. A method for producing said display device according to claim 11, wherein said washing step is performed by washing said adhesion-suppressing agent with a highly volatile liquid.

13. The method for producing said display device according to claim 11, wherein said step of applying said adhesion-suppressing agent is performed by injecting a mixture liquid obtained by mixing or dissolving said adhesion-suppressing agent in a solvent such as a highly volatile liquid.

14. A display device comprising a substrate having an actuator element, an optical waveguide plate, a crosspiece intervening between said optical waveguide plate and said substrate and surrounding said actuator element, and a picture element assembly joined onto said actuator element wherein an adhesion-suppressing agent covers substantially the entire portion of said picture element assembly facing said optical waveguide plate.

\* \* \* \* \*